United States Patent
Hara et al.

(10) Patent No.: US 11,390,723 B2
(45) Date of Patent: Jul. 19, 2022

(54) CELLULOSE-ALUMINUM-DISPERSING POLYETHYLENE RESIN COMPOSITE MATERIAL, PELLET AND FORMED BODY USING SAME, AND PRODUCTION METHOD THEREFOR

(71) Applicant: FURUKAWA ELECTRIC CO., LTD., Tokyo (JP)

(72) Inventors: Hidekazu Hara, Tokyo (JP); Yuka Sawada, Tokyo (JP); Jirou Hiroishi, Tokyo (JP); Masami Tazuke, Tokyo (JP); Toshihiro Suzuki, Tokyo (JP); Shingo Mitsugi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 347 days.

(21) Appl. No.: 16/466,226

(22) PCT Filed: Aug. 23, 2017

(86) PCT No.: PCT/JP2017/030217
§ 371 (c)(1),
(2) Date: Jun. 3, 2019

(87) PCT Pub. No.: WO2018/105174
PCT Pub. Date: Jun. 14, 2018

(65) Prior Publication Data
US 2020/0062921 A1 Feb. 27, 2020

(30) Foreign Application Priority Data

Dec. 5, 2016 (JP) ............................. JP2016-236284

(51) Int. Cl.
*C08J 3/12* (2006.01)
*C08J 11/08* (2006.01)
*C08J 3/20* (2006.01)
*C08L 23/06* (2006.01)

(52) U.S. Cl.
CPC ............... *C08J 11/08* (2013.01); *C08J 3/12* (2013.01); *C08J 3/20* (2013.01); *C08L 23/06* (2013.01); *C08J 2323/06* (2013.01); *C08J 2401/02* (2013.01); *C08J 2467/02* (2013.01); *C08J 2477/06* (2013.01); *C08L 2205/025* (2013.01); *C08L 2205/03* (2013.01); *C08L 2205/035* (2013.01); *C08L 2205/16* (2013.01)

(58) Field of Classification Search
None
See application file for complete search history.

(56) References Cited

U.S. PATENT DOCUMENTS

| 4,332,748 A | 6/1982 | Fremont |
|---|---|---|
| 5,100,603 A | 3/1992 | Neefe |
| 5,120,776 A | 6/1992 | Raj et al. |
| 5,331,087 A | 7/1994 | Menges |
| 5,390,860 A | 2/1995 | Ali et al. |
| 5,759,680 A | 6/1998 | Brooks et al. |
| 2005/0084671 A1 | 4/2005 | Medoff et al. |
| 2007/0113705 A1 | 5/2007 | Szente et al. |
| 2009/0211303 A1 | 8/2009 | Digiovanni et al. |
| 2014/0227605 A1 | 8/2014 | Nakamura et al. |
| 2014/0336309 A1 | 11/2014 | Sakata et al. |
| 2016/0002461 A1 | 1/2016 | Tsujii et al. |
| 2017/0080603 A1 | 3/2017 | Lovis et al. |
| 2017/0101489 A1 | 4/2017 | Gahleitner et al. |
| 2020/0010654 A1 | 1/2020 | Kim et al. |
| 2020/0062921 A1 | 2/2020 | Hara et al. |
| 2020/0079920 A1 | 3/2020 | Sawada et al. |
| 2020/0172684 A1 | 6/2020 | Hiroishi et al. |

FOREIGN PATENT DOCUMENTS

| CN | 1278209 A | 12/2000 |
|---|---|---|
| CN | 1281390 A | 1/2001 |
| CN | 1637208 A | 7/2005 |
| CN | 1789557 A | 6/2006 |
| CN | 101054779 A | 10/2007 |
| CN | 102421852 A | 4/2012 |
| CN | 103144214 A | 6/2013 |
| CN | 103781831 A | 5/2014 |
| CN | 105025477 A | 11/2015 |
| CN | 105263708 A | 1/2016 |
| CN | 107708950 A | 2/2018 |
| CN | 110023399 A | 7/2019 |
| CN | 110023400 A | 7/2019 |

(Continued)

OTHER PUBLICATIONS

Extended European Search Report for European Application No. 17877541.7, dated Apr. 8, 2020.
International Search Report for International Application No. PCT/JP2017/030214, dated Oct. 17, 2017.
International Search Report for International Application No. PCT/JP2017/030216, dated Nov. 7, 2017.

(Continued)

*Primary Examiner* — Terressa Boykin
(74) *Attorney, Agent, or Firm* — Birch, Stewart, Kolasch & Birch, LLP

(57) ABSTRACT

A cellulose-aluminum-dispersing polyethylene resin composite material, in which a cellulose fiber and aluminum are dispersed into a polyethylene resin, wherein a proportion of the cellulose fiber is 1 part by mass or more and 70 parts by mass or less in a total content of 100 parts by mass of the polyethylene resin, and the cellulose fiber, and wherein water absorption ratio of the composite material satisfies the following formula:

(Water absorption ratio)<(cellulose effective mass ratio)$^2$×0.01;  [Formula]:

a pellet and a formed body using the composite material, and a method of producing these.

37 Claims, 1 Drawing Sheet

(56) References Cited

FOREIGN PATENT DOCUMENTS

| | | | |
|---|---|---|---|
| CN | 110248993 | A | 9/2019 |
| EP | 2 123 418 | A1 | 11/2009 |
| EP | 2 296 858 | A | 3/2011 |
| EP | 2 463 071 | A1 | 6/2012 |
| EP | 2682421 | A1 | 1/2014 |
| EP | 2 811 489 | A1 | 12/2014 |
| EP | 3 441 425 | A1 | 2/2019 |
| EP | 3549980 | A1 | 10/2019 |
| EP | 3 604 424 | A | 2/2020 |
| JP | 5-50427 | A | 3/1993 |
| JP | 6-65883 | A | 3/1994 |
| JP | 6-73231 | A | 3/1994 |
| JP | 6-76644 | A | 3/1994 |
| JP | 6-173182 | A | 6/1994 |
| JP | 7-224192 | A | 8/1995 |
| JP | 2000-62746 | A | 2/2000 |
| JP | 2001-192508 | A | 7/2001 |
| JP | 6210582 | B2 | 10/2001 |
| JP | 2004-58254 | A | 2/2004 |
| JP | 2004-358423 | A | 12/2004 |
| JP | 2006-347031 | A | 12/2006 |
| JP | 2007-45863 | A | 2/2007 |
| JP | 2007-98211 | A | 4/2007 |
| JP | 2007-260941 | A | 10/2007 |
| JP | 2009-274318 | A | 11/2009 |
| JP | 2010-269544 | A | 12/2010 |
| JP | 2011-93990 | A | 5/2011 |
| JP | 4680000 | B2 | 5/2011 |
| JP | 2011-116838 | A | 6/2011 |
| JP | 2011-190322 | A | 9/2011 |
| JP | 2011-219571 | A | 11/2011 |
| JP | 4846405 | B2 | 12/2011 |
| JP | 2012-82364 | A | 4/2012 |
| JP | 4950939 | B2 | 6/2012 |
| JP | 2013-18916 | A | 1/2013 |
| JP | 2013-35272 | A | 2/2013 |
| JP | 2013-161590 | A | 8/2013 |
| JP | 2014-15512 | A | 1/2014 |
| JP | 2015-183153 | A | 10/2015 |
| JP | 2015-209439 | A | 11/2015 |
| JP | 2016-20096 | A | 2/2016 |
| JP | 2016-94538 | A | 5/2016 |
| JP | 2017-128716 | A | 7/2017 |
| JP | 2017-128717 | A | 7/2017 |
| JP | 2017-145392 | A | 8/2017 |
| JP | 2017-145393 | A | 8/2017 |
| JP | 6210583 | B2 | 10/2017 |
| PL | 201466 | B1 | 4/2009 |
| RU | 2526067 | C1 | 8/2014 |
| WO | WO 98/47681 | A1 | 10/1998 |
| WO | WO 99/11453 | A1 | 3/1999 |
| WO | WO 99/19081 | A1 | 4/1999 |
| WO | WO 00/78127 | A1 | 12/2000 |
| WO | WO 2006/048332 | A1 | 5/2006 |
| WO | WO 2007/130201 | A1 | 11/2007 |
| WO | WO 2009/141796 | A1 | 11/2009 |
| WO | WO 2014/153076 | A1 | 9/2014 |
| WO | WO 2016/199942 | A1 | 12/2016 |
| WO | WO 2013/105173 | A | 6/2018 |
| WO | WO 2018/105174 | A1 | 6/2018 |
| WO | WO 2018/180469 | A1 | 10/2018 |

OTHER PUBLICATIONS

Japanese Office Action for Japanese Application No. 2017-004664, dated Aug. 15, 2017, with English translation.
Japanese Office Action for Japanese Application No. 2017-004664, dated Feb. 14, 2017, with English translation.
Japanese Office Action for Japanese Application No. 2017-004665, dated Aug. 15, 2017, with English translation.
Japanese Office Action for Japanese Application No. 2017-004665, dated Feb. 14, 2017, with English translation.
Japanese Office Action for Japanese Application No. 2019-537491, dated Mar. 2, 2021, with English translation.
Jeremic, "Polyethylene," Ullmann's Encyclopedia of Industrial Chemistry, 2014, pp. 1-42.
U.S. Office Action for U.S. Appl. No. 16/466,276, dated Oct. 26, 2020.
International Search Report for PCT/JP2017/030217 dated Nov. 7, 2017.
Extended European Search Report for European Application No. 17844598.7, dated Dec. 6, 2019.
Chinese Office Action and Search Report for Chinese Application No. 201780074788.2, dated May 21, 2021, with English translation.
Chinese Office Action and Search Report, dated May 31, 2012, for Chinese Application No. 201780074783.X, with English translations.
Extended European Search Report for European Application No. 17922752.5, dated Mar. 1, 2021.
Sanchez-Cadena et al., "Hot-pressed boards based on recycled high-density polyethylene tetrapack: Mechanical properties and fracture behavior," Journal of Reinforced Plastics and Composites, vol. 32, No. 23, 2013, pp. 1779-1792.
Chinese Office Action and Search Report, dated Jun. 2, 2021, for Chinese Application No. 201780094025.4, with English translations.
Chinese Office Action and Search Report for Chinese Application No. 201880053610.4, dated Dec. 28, 2021, with an English translation.
Chinese Office Action and Search Report for Chinese Application No. 201880057926.0, dated Dec. 9, 2021, with an English translation.
Chinese Office Action and Search Report for Chinese Application No. 201880058045.0, dated Dec. 21, 2021, with an English translation.
Data Sheet of Moplen EP500V, 2021, 2 pages total.
Deng et al., "Aquatic Product Marketing," Zhongyuan Farmers Press, 2016, p. 60, 2 pages total.
El-Sabbagh et al., "Flowability and Fiber Content Homogeneity of Natural Fiber Polypropylene Composites in Injection Molding," Proceedings of the Regional Conference Graz 2015—Polymer Processing Society FPS, 2015, pp. 060010-1-060010-5, 5 pages total.
Japanese Office Action for Japanese Application No. 2019-537695, dated Dec. 14, 2021, with an English translation.
Japanese Office Action for Japanese Application No. 2019-537696, dated Dec. 14, 2021, with an English translation.
Japanese Office Action for Japanese Application No. 2019-537697, dated Dec. 14, 2021, with an English translation.
U.S. Office Action for U.S. Appl. No. 16/466,276, dated Sep. 8, 2021.
Chinese Office Action and Search Report for Chinese Application No. 201780094074.8, dated Jun. 3, 2021, with English translation.
Extended European Search Report for European Application No. 17922753.3, dated Mar. 1, 2021.
Extended European Search Report for European Application No. 18847322.7, dated Apr. 12. 2021.
Extended European Search Report for European Application No. 18848639.3, dated Apr. 13, 2021.
Extended European Search Report for European Application No. 18849169.0, dated Apr. 21, 2021.
International Preliminary Report on Patentability and English Translation of Written Opinion of the International Searching Authority dated Feb. 25, 2020, for PCT/JP2018/031250.
International Search Report for PCT/JP2017/030215 (PCT/ISA/210) dated Oct. 17, 2017.
International Search Report for PCT/JP2018/031251 dated Nov. 20, 2018.
International Search Report issued in PCT/JP2018/031249 (PCT/ISA/210), dated Nov. 13, 2018.
International Search Report issued in PCT/JP2018/031250 (PCT/ISA/210), dated Nov. 27, 2018.
Japanese Office Acton for Japanese Application No. 2019-537492, dated Mar. 9, 2021, with English translation.
Machine Translation of JP-2004-58254-A, dated Feb. 26, 2004.
Machine Translation of JP-2007-045863, dated Feb. 22, 2007.

(56) References Cited

OTHER PUBLICATIONS

Machine Translation of JP-2007-260941, dated Oct. 11, 2007.
Machine Translation of JP-2009-274318-A, dated Nov. 26, 2009.
Machine Translation of JP-2011-190322, dated Sep. 29, 2011.
Machine Translation of JP-2011-128716-A, dated Jul. 27, 2017.
U.S. Corrected Notice of Allowance for U.S. Appl. No. 16/797,654, dated Feb. 11, 2022.
U.S. Notice of Allowance for U.S. Appl. No. 16/797,654, dated Jan. 10, 2022.
U.S. Notice of Allowance for U.S. Appl. No. 16/797,654, dated Jan. 27, 2022.
U.S. Notice of Allowance for U.S. Appl. No. 16/797,654, dated Sep. 7, 2021.
U.S. Office Action for U.S. Appl. No. 16/466,276, dated Apr. 13, 2021.
U.S. Office Action for U.S. Appl. No. 16/641,192, dated Nov. 19, 2021.
U.S. Office Action for U.S. Appl. No. 16/797,654, dated May 3, 2021.
U.S. Office Action for U.S. Appl. No. 16/797,691, dated Nov. 16, 2021.
U.S. Office Action for U.S. Appl. No. 16/797,938, dated Dec. 10, 2021.
Written Opinion of the International Searching Authority (Form PCT/ISA/237) for International Appl. No. PCT/JP2018/031249, dated Nov. 13, 2018, with an English translation.
Written Opinion of the International Searching Authority (form PCT/ISA/237), dated Nov. 20, 2018, for international Appl. Na PCT/JP2018/031261, with an English translation.
Chinese Office Action for Chinese Application No. 201780074783.X, dated Mar. 30, 2022, with English translation.
U.S. Notice of Allowance for U.S. Appl. No. 16/641,192, dated Mar. 16, 2022.
U.S. Notice of Allowance for U.S. Appl. No. 16/797,938, dated May 31, 2022.
U.S. Office Action for U.S. Appl. No. 16/466,276, dated Mar. 24, 2022.

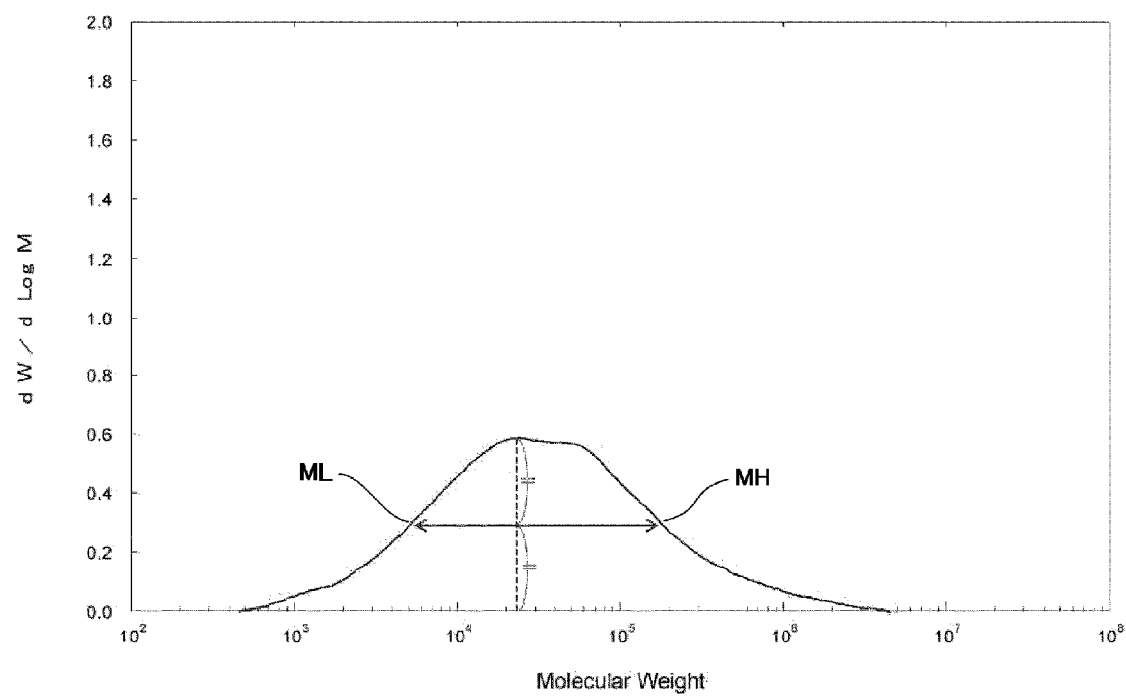

CELLULOSE-ALUMINUM-DISPERSING POLYETHYLENE RESIN COMPOSITE MATERIAL, PELLET AND FORMED BODY USING SAME, AND PRODUCTION METHOD THEREFOR

TECHNICAL FIELD

The present invention relates to a polyethylene resin composite material formed by dispersing a cellulose fiber and aluminum, and to a pellet and a formed body using the same, and a production method therefor.

BACKGROUND ART

As a form of laminated paper forming a beverage container made of paper, such as a milk carton, the form of a laminate having paper, a polyethylene thin film layer and an aluminum thin film layer has been widely put in practical use. This laminated paper takes a layer structure of polyethylene thin film layer/paper/polyethylene thin film layer/aluminum thin film layer/polyethylene thin film layer, for example. In recycling such laminated paper, it is necessary to perform separation treatment to a paper portion (pulp) and other portions (the polyethylene thin film, the aluminum thin film).

As a method of separation treatment, a method of stripping off the paper portion from the laminated paper by agitating the laminated paper in water for a long time in a device called a pulper is general. The thus-separated paper portion is applied as a raw material of recycled paper. On the other hand, with regard to the polyethylene thin film piece formed by partially stripping off the paper portion from the laminated paper (this polyethylene thin film is a mixture (this mixture is referred to as a "cellulose-aluminum-adhering polyethylene thin film piece".) containing a thin film piece formed by nonuniformly adhering, to the polyethylene thin film to which the aluminum thin film is stuck, a paper component (cellulose fiber) which is unable to be completely removed, and a thin film piece formed by nonuniformly adhering, to the polyethylene thin film to which the aluminum thin film is not stuck, the paper component which is unable to be completely removed), there are problems as described below in recycling thereof.

The above-described cellulose-aluminum-adhering polyethylene thin film piece is in a state in which a large number of paper components (paper pieces formed of the cellulose fiber) are nonuniformly adhered on the surface thereof, and sizes and shapes are all different, and further the cellulose fiber adhered thereto absorbs a large amount of water by the separation treatment of the paper by the above-described pulper. If such a cellulose-aluminum-adhering polyethylene thin film piece in the state of containing a large amount of moisture is attempted to be recycled, sufficient drying treatment is required, and a large quantity of energy is consumed. Moreover, a fluctuation in the size and the shape of the raw material is large, and the thin film piece further contains aluminum, or the like. Therefore it is not easy to recycle the cellulose-aluminum-adhering polyethylene thin film piece as one body in itself. Therefore, the cellulose-aluminum-adhering polyethylene thin film piece is ordinarily directly landfilled and disposed of or recycled as a fuel under actual circumstances.

Several technologies relating to recycling of laminated paper or a cellulose-containing resin material have been reported.

JP-A-2000-62746 ("JP-A" means unexamined published Japanese patent application) (Patent Literature 1) discloses a mold-molding technology on recycling a used beverage container formed of laminated paper to produce a packaging tray, and describes the technology in which a cellulose fiber-adhering polyethylene thin film piece separated from the laminated paper by using a pulper is dried and pulverized, and then the resulting material is molded into a plate form by using a primary molding machine, and is further mold-molded, as secondary molding, into a predetermined shape such as an egg packaging tray by a high-temperature molding machine.

Moreover, Japanese patent No. 4680000 (Patent Literature 2) describes, as a recycling technology on a used beverage container formed of laminated paper, a method in which the laminated paper is directly pulverized into small pieces without separating the paper into a paper portion and a polyethylene thin film portion to produce a paper-containing resin composition by kneading the small pieces together with polypropylene and the like by a twin screw extruder, and further a flow improver is added thereto, and the resulting material is subjected to injection molding.

Moreover, Japanese patent No. 4950939 (Patent Literature 3) discloses a technology on combining a used PPC sheet with a used PET material such as a used beverage container, and the like, and recycling the resulting material, and describes a method in which the PPC sheet is finely cut and water is contained therein, and then the resulting material is kneaded together with a finely cut PET material in the presence of water in a subcritical state to prepare a resin for injection molding.

According to the technology in this Patent Literature 3, a cellulose fiber of the PPC sheet and a melted PET material are easily mixed in a relatively uniform manner by kneading the PPC sheet and the PET material in the presence of water in the subcritical state.

Moreover, it is known that, if the cellulose fibers are uniformly dispersed into the resin, physical properties are improved, for example, flexural strength is improved in comparison with a resin single body, or the like. For example, JP-A-2011-93990 (Patent Literature 4) discloses a technology in which a non-fibrillated fibrous cellulose and a thermoplastic resin are melt kneaded by using a batch type closed kneading device to produce a resin formed body which contains the cellulose fiber and has high strength.

JP-A-2004-358423 (Patent Literature 5) describes, as a recycling technology on a used beverage container composed of aluminum and plastics laminated paper, a technology in which aluminum, or aluminum and plastics can be separated and recovered, individually. More specifically, JP-A-2004-358423 describes a recycling technology on a metal-resin composite material in which aluminum is ionized and dissolved into supercritical water or subcritical water by bringing a composite material of aluminum and a resin into contact with supercritical water or subcritical water, and then this dissolved metal is precipitated and recovered from supercritical water or subcritical water. Patent Literature 5 also describes that aluminum metahydroxide or aluminum hydroxide is produced during separation and recovery treatment.

JP-A-6-65883 (Patent literature 6) discloses a method and an apparatus for separating a paper fiber from a plastic having the paper fiber, or a plastics/metal composite material having the paper fiber by using a pulper.

EP 2296858 (Patent Literature 7) and EP 2463071 (Patent Literature 8) describe a method for applying treatment to a multi-layered laminate material composed of cellulose, a plastics material and aluminum to recycle the resulting material as a composite material mainly containing polyethylene and aluminum. More specifically, Patent Literature 7 describes a technology on obtaining a composite material by introducing a material obtained by pulping a multi-layered laminate material composed of cellulose, a plastics material and aluminum into a water tank, and then centrifuging, shredding and drying the resulting material to reduce the content of a moisture and the cellulose to a level less than 2%, and further compacting and granulating the resulting material by extrusion molding. Moreover, Patent Literature 8 discloses a technology on obtaining a plastic composite member by pulverizing remaining tetra-pak wastes (containing LDPE, aluminum and cellulose) after a most part of cellulose is removed and applying washing treatment thereto by hot air without using water to reduce the cellulose content to a level of about 2%, and further reducing the size, adding an additive, granulating and injection/compression molding the resulting material.

JP-A-6-173182 (Patent Literature 9) discloses a reprocessing method for a beverage package carton, and a thermoplastic resin material containing a thermoplastic resin, a cellulose fiber and aluminum.

CITATION LIST

Patent Literatures

Patent Literature 1: JP-A-2000-62746
Patent Literature 2: Japanese Patent No. 4680000
Patent Literature 3: Japanese Patent No. 4950939
Patent Literature 4: JP-A-2011-93990
Patent Literature 5: JP-A-2004-358423
Patent Literature 6: JP-A-6-65883
Patent Literature 7: EP 2296858
Patent Literature 8: EP 2463071
Patent Literature 9: JP-A-6-173182

SUMMARY OF INVENTION

Technical Problem

However, according to the technology described in Patent Literature 1, a packaging tray is produced simply by mold-molding without performing kneading in a melted state, and the technology is not an art in which melt-kneading is performed in the presence of water as described later. Therefore, paper wastes containing polyethylene are finely pulverized, and mold-molding is performed in Patent Literature 1. However, there is no melt-kneading step, and therefore a bias is caused in a distribution of celluloses. Further, in mold-molding, the material is merely heated and fused without remelting the material, and an amount of fused portions of thin film pieces with each other is small, and there is a problem in which a dispersion state of cellulose fibers cannot be uniformized, and strength of the fused portion of the obtained formed body is low. Moreover, such a formed body is in a state in which a large number of cellulose fibers are exposed from the resin. Therefore has characteristics which are easy to absorb water and hard to dry, and an application thereof is limited.

Moreover, according to the technology described in Patent Literature 2, the material is pulverized into a fine particle diameter of 0.5 mm to 2.5 mm without stripping off a paper portion from laminated paper, and polypropylene or modified polypropylene is added thereto, the resulting material is kneaded by a twin screw extruder to obtain a paper-containing resin composition, and further a mixture containing a flow improver is added thereto and injection molding is performed. That is, the technology described in Patent Literature 2 is not an art in which a moisture-containing cellulose fiber-adhering polyethylene thin film piece obtained from waste paper of the laminated paper is melted and kneaded in the presence of water. Further, Patent Literature 2 describes a paper-containing resin composition containing conifer bleached chemical pulp. However, the resin used in this composition is polypropylene or a modified polypropylene resin, and is not polyethylene. Further, the technology described in Patent Literature 2 has a problem in which an amount of the cellulose contained in the paper-containing resin composition is relatively large, and good flowability cannot be obtained during kneading as it is, and when the formed body is prepared, fluctuation of material strength or production of a portion in which sufficient strength is not obtained is caused. In order to solve the problem, Patent Literature 2 describes addition of polypropylene or a flow improver as the raw material separately, but describes nothing on using polyethylene.

Moreover, Patent Literature 3 refers to an invention relating to a production method for a resin for injection molding by allowing water to contain in a PPC sheet being a used discharging paper discharged from an office, and then dewatering the PPC sheet, mixing the resulting material with a PET resin or a PP resin, and performing subcritical or supercritical treatment.

The invention described in Patent Literature 3 is an art of simply preparing container recycle resins such as PPC waste paper and a PET resin, separately, and performing mixing treatment and recycling the resulting material, and is not an art of recycling a thin film piece which is obtained by removing a paper component by applying pulper treatment to a beverage container made of paper, and is in a state in which a large amount of water is contained, and sizes and shapes are all various, and cellulose is nonuniformly adhered to the resin.

In the technology described in Patent Literature 3, a large number of cellulose fibers composing the PPC sheet are complicatedly entangled, and it is difficult to sufficiently defibrate the fibers into a loose state. Therefore a material obtained by finely cutting the PPC sheet is used.

Moreover, water absorption behavior from a cut surface is dominant in the PPC sheet. Therefore unless the PPC sheet is finely cut and water-containing and dewatering treatments are performed in order to increase a surface area of the cut surface, defibration of the cellulose fiber by the subcritical or supercritical treatment does not sufficiently progress. When this cutting is not sufficiently performed, unfibrated paper pieces (aggregate of cellulose fibers) remain in the produced resin for injection molding in no small part, and there is a problem which may cause reduction of strength of the resin for injection molding and reduction of water absorption properties.

Further, in the technology described in Patent Literature 4, in charging a thermoplastic resin and fibrous cellulose as a separate material into an agitation chamber of a batch melt-kneading device to melt knead the thermoplastic resin and the fibrous cellulose, while the fibrous cellulose is not melted, the thermoplastic resin is melted. That is, in the technology described in Patent Literature 4, the raw material to be used is a so-called pure article suitable for obtaining an objective resin composition, and the technology is not an art in which a material for recycling the thin film piece in a state in which a large amount of water is contained, and the sizes and the shapes are all various, and the cellulose is nonuniformly adhered to the resin, as mentioned above.

Moreover, when the thermoplastic resin and the fibrous cellulose which are different in physical properties are separately charged thereinto and mixed therein, it is difficult to form an integrated resin composition in which the fibrous cellulose is dispersed into the thermoplastic resin in a sufficiently uniform state. That is, an aggregate of fibrous cellulose is easily produced, and strength of a resin formed body is liable to be reduced. Therefore, Patent Literature 4 describes use of the fibrous cellulose having an aspect ratio of 5 to 500.

Then, the above-mentioned technologies described in Patent Literatures 1 to 4 refer to the technology relating to the laminated paper or the cellulose-containing resin material, and describe nothing on recycling the laminated paper containing the aluminum layer, and nothing on the cellulose-aluminum-dispersing polyethylene resin composite material.

Moreover, the technologies described in Patent Literatures 5 and 6 refer to a separation and recovery technology of aluminum or the paper fiber as mentioned above, and describe nothing on directly recycling the cellulose-aluminum-adhering polyethylene thin film piece as one body.

Patent Literatures 7 and 8 each disclose the method for recycling, as a composite material mainly containing polyethylene and aluminum, by applying predetermined treatment to a multi-layered laminate material composed of cellulose, a plastics material, and aluminum and removing the cellulose. However, both Patent Literatures 7 and 8 refer to an art of separating and removing the cellulose fiber with a high level to obtain the polyethylene-aluminum composite material containing 2% or less of cellulose fiber content. The cellulose fiber is separated and removed therefrom with a high level, and therefore there is a problem of requiring a labor hour and a cost for the treatment. Further, the art includes a step of substantially drying and cutting the material before extrusion processing. Therefore there is a problem of requiring a cost and a labor hour also from this point. Moreover, a main body of polyethylene used in the multi-layered laminate material of the paper beverage container is low density polyethylene. Therefore the composite material obtained by sufficiently removing the cellulose fiber results in a material having poor strength. Accordingly, this composite material lacks in general versatility, and the application is restrictive. Patent Literatures 7 and 8 each describe nothing on the melt-kneading of the multi-layered laminate material of the paper beverage container to produce the cellulose fiber-dispersing resin composite material containing aluminum.

Moreover, Patent Literature 9 describes that the beverage package carton or the like is used as a raw material to obtain the thermoplastic material containing the thermoplastic resin, the cellulose fiber and aluminum. However, in the preparation thereof, the treatment such as size reduction, disintegration, separation, aggregation and re-granulation is required to require a cost and a labor time as well. Patent Literature 9 describes that the characteristics change depending on a content of the cellulose fiber, but specifically describes nothing on the characteristics.

Thus, the above-described Patent Literatures 1 to 9 describe nothing on the technology of directly providing the cellulose-aluminum-adhering polyethylene thin film piece in the state in which the paper component is contained and water is absorbed for an integrally simple treatment step, and recycling the resulting material.

The present invention relates to a recycling technology on a cellulose-aluminum-adhering polyethylene thin film piece. More specifically, the present invention is contemplated for providing a cellulose-aluminum-dispersing polyethylene resin composite material that is formed by dispersing a specific amount of a cellulose fiber and aluminum into a polyethylene resin in a sufficiently uniform state, and is useful as a raw material of a resin product, in which an increase of water absorption ratio can be suppressed while the composite material contains a predetermined amount of cellulose, and a pellet and a formed body using this composite material.

Moreover, the present invention is contemplated for providing a method of producing a cellulose-aluminum-dispersing polyethylene resin composite material that is useful as a raw material of a resin product and has predetermined water absorption ratio relative to a predetermined cellulose effective mass ratio by integrally treating, in a simple treatment step, a cellulose-aluminum-adhering polyethylene thin film piece that is obtained from a beverage pack or a food pack formed of polyethylene laminated paper having paper, a polyethylene thin film layer and an aluminum thin film layer.

Moreover, the present invention is contemplated for providing a method of recycling a cellulose-aluminum-adhering polyethylene thin film piece that is obtained from a beverage pack or a food pack formed of polyethylene laminated paper having paper, a polyethylene thin film layer and an aluminum thin film layer, into a cellulose-aluminum-dispersing polyethylene resin composite material that is useful as a raw material of a resin product, by integrally treating, in a simple treatment step.

Solution to Problem

The present inventors found that a composite material (cellulose-aluminum-dispersing polyethylene resin composite material) in which a cellulose fiber and finely pulverized aluminum are sufficiently uniformly dispersed into a polyethylene resin, and integrated therein can be obtained with excellent energy efficiency by using, as a raw material, the above-described cellulose-aluminum-adhering polyethylene thin film piece as obtained by agitating a beverage pack or a food pack formed of polyethylene laminated paper having paper, a polyethylene thin film layer and an aluminum thin film layer in water to strip off and remove a paper portion, and by melt-kneading this raw material, while moisture is removed, in the presence of water. And the present inventors found that, although the composite material obtained contains a predetermined amount of cellulose, an increase of water absorption ratio can be suppressed and the composite material has preferable physical properties as the raw material of the resin product.

That is, the present inventors found that, as mentioned above, the cellulose fiber and aluminum and the polyethylene resin are integrated by the melt-kneading, in the presence of water, the above-described cellulose-aluminum-adhering polyethylene thin film piece which has so far had a high hurdle for practical use of recycling as a resin raw material, and the increase of water absorption ratio can be suppressed and the composite material useful as the raw material of the resin product is obtained.

The present inventors continued to conduct further examination based on these findings, and have completed the present invention.

That is, the above-described problem has been solved by the following means.

[1]

A cellulose-aluminum-dispersing polyethylene resin composite material, in which a cellulose fiber and aluminum are dispersed into a polyethylene resin, wherein a proportion of the cellulose fiber is 1 part by mass or more and 70 parts by mass or less in a total content of 100 parts by mass of the polyethylene resin, and the cellulose fiber and, wherein water absorption ratio [%] of the composite material satisfies the following formula [Formula C];

$$\text{(water absorption ratio [\%])} < \text{(cellulose effective mass ratio [\%])}^2 \times 0.01, \quad \text{[Formula C]}$$

[2]

The cellulose-aluminum-dispersing polyethylene resin composite material described in the above item [1], wherein a proportion of the cellulose fiber is 5 parts by mass or more and less than 50 parts by mass in the total content of 100 parts by mass of the polyethylene resin and the cellulose fiber.

[3]

The cellulose-aluminum-dispersing polyethylene resin composite material described in the above item [1], wherein a proportion of the cellulose fiber is 25 parts by mass or more and less than 50 parts by mass in the total content of 100 parts by mass of the polyethylene resin and the cellulose fiber.

[4]

The cellulose-aluminum-dispersing polyethylene resin composite material described in the above item [1], wherein a proportion of the cellulose fiber is 25 parts by mass or more and less than 50 parts by mass in the total content of 100 parts by mass of the polyethylene resin and the cellulose fiber, and wherein tensile strength of a formed body obtained by forming the composite material is 20 MPa or more.

[5]

The cellulose-aluminum-dispersing polyethylene resin composite material described in the above item [1], wherein a proportion of the cellulose fiber is 25 parts by mass or more and less than 50 parts by mass in the total content of 100 parts by mass of the polyethylene resin and the cellulose fiber, and wherein tensile strength of a formed body obtained by forming the composite material is 25 MPa or more.

[6]

The cellulose-aluminum-dispersing polyethylene resin composite material described in the above item [1], wherein a proportion of the cellulose fiber is 1 part by mass or more and less than 15 parts by mass in the total content of 100 parts by mass of the polyethylene resin and the cellulose fiber, and wherein flexural strength of a formed body obtained by forming the composite material is 8 to 20 MPa.

[7]

The cellulose-aluminum-dispersing polyethylene resin composite material described in the above item [1], wherein a proportion of the cellulose fiber is 15 parts by mass or more and less than 50 parts by mass in the total content of 100 parts by mass of the polyethylene resin and the cellulose fiber, and wherein flexural strength of a formed body obtained by forming the composite material is 15 to 40 MPa.

[8]

The cellulose-aluminum-dispersing polyethylene resin composite material described in the above item [1], wherein a content of the aluminum is 1 part by mass or more and 40 parts by mass or less based on the total content of 100 parts by mass of the polyethylene resin and the cellulose fiber.

[9]

The cellulose-aluminum-dispersing polyethylene resin composite material described in the above item [1], wherein a content of the aluminum is 5 parts by mass or more and 30 mass part or less based on the total content of 100 parts by mass of the polyethylene resin and the cellulose fiber.

[10]

The cellulose-aluminum-dispersing polyethylene resin composite material described in the above item [1], wherein the polyethylene resin satisfies a relationship:

$$1.7 > \text{half-width}(\text{Log}(MH/ML)) > 1.0$$

in a molecular weight pattern obtained by gel permeation chromatography (GPC) measurement.

[11]

The cellulose-aluminum-dispersing polyethylene resin composite material described in the above item [1], containing a cellulose fiber having a fiber length of 1 mm or more.

[12]

The cellulose-aluminum-dispersing polyethylene resin composite material described in the above item [1], wherein a proportion of the number of aluminum having an X-Y maximum length of 1 mm or more in the number of aluminum having an X-Y maximum length of 0.005 mm or more is less than 1%.

[13]

The cellulose-aluminum-dispersing polyethylene resin composite material described in the above item [1], wherein 50% by mass or more of the polyethylene resin is low density polyethylene.

[14]

The cellulose-aluminum-dispersing polyethylene resin composite material described in the above item [1], wherein 80% by mass or more of the polyethylene resin is low density polyethylene.

[15]

The cellulose-aluminum-dispersing polyethylene resin composite material described in the above item [1], containing polypropylene;

wherein a content of the polypropylene is 20 parts by mass or less based on the total content of 100 parts by mass of the polyethylene resin and the cellulose fiber.

[16]

The cellulose-aluminum-dispersing polyethylene resin composite material described in the above item [1], which satisfies the following formula, when a soluble mass ratio to hot xylene of 138° C. for the composite material is taken as Ga (%), a soluble mass ratio to hot xylene of 105° C. for the composite material is taken as Gb (%), and an cellulose effective mass ratio is taken as Gc (%), $$\{(Ga-Gb)/(Gb+Gc)\} \times 100 \leq 20,$$

where, $$Ga = \{(W0-Wa)/W0\} \times 100,$$

$$Gb = \{(W0-Wb)/W0\} \times 100,$$

where,

W0 is mass of a composite material before being immersed into hot xylene,

Wa is mass of a composite material after being immersed into hot xylene of 138° C. and then drying and removing xylene, and Wb is mass of a composite material after being immersed into hot xylene of 105° C. and then drying and removing xylene, $$Gc=\{Wc/W00\}\times100,$$

where,

Wc is an amount of mass reduction of a dry composite material while a temperature is raised from 270° C. to 390° C. in a nitrogen atmosphere, and W00 is mass of a dry composite material before a temperature is raised (at 23° C.).

[17]

The cellulose-aluminum-dispersing polyethylene resin composite material described in the above item [1], containing polyethylene terephthalate and/or nylon;

wherein the total content of the polyethylene terephthalate and/or the nylon is 10 parts by mass or less based on a total content of 100 parts by mass of the polyethylene resin and the cellulose fiber.

[18]

The cellulose-aluminum-dispersing polyethylene resin composite material described in the above item [15], wherein at least a part of the polyethylene resin and/or the polypropylene is derived from a recycled material.

[19]

The cellulose-aluminum-dispersing polyethylene resin composite material described in the above item [1], which is obtained by using, as a raw material:

(a) polyethylene laminated paper having paper, a polyethylene thin film layer and an aluminum thin film layer; and/or (b) a beverage/food pack formed of the polyethylene laminated paper.

[20]

The cellulose-aluminum-dispersing polyethylene resin composite material described in the above item [1], which is obtained by using, as a raw material, a cellulose-aluminum-adhering polyethylene thin film piece.

[21]

The cellulose-aluminum-dispersing polyethylene resin composite material described in the above item [20], wherein the cellulose-aluminum-adhering polyethylene thin film piece is obtained by stripping off and removing a paper portion from:

(a) polyethylene laminated paper having paper, a polyethylene thin film layer and an aluminum thin film layer; and/or (b) a beverage/food pack formed of the polyethylene laminated paper.

[22]

The cellulose-aluminum-dispersing polyethylene resin composite material described in the above item [1], containing an inorganic material;

wherein a content of the inorganic material is 1 part by mass or more and 100 parts by mass or less based on 100 parts by mass of the polyethylene resin.

[23]

The cellulose-aluminum-dispersing polyethylene resin composite material described in the above item [1], which has a melt flow rate (MFR) of 0.05 to 50.0 g/10 min at a temperature of 230° C. and a load of 5 kgf.

[24]

The cellulose-aluminum-dispersing polyethylene resin composite material described in the above item [1], wherein, in the composite material, water absorption ratio after the composite material is immersed into water of 23° C. for 20 days is 0.1 to 10%; and wherein, in the composite material, impact resistance after the composite material is immersed into water of 23° C. for 20 days is higher than impact resistance before the composite material is immersed thereinto.

[25]

The cellulose-aluminum-dispersing polyethylene resin composite material described in the above item [1], which has a linear expansion coefficient of $1\times10^{-4}$ or less.

[26]

The cellulose-aluminum-dispersing polyethylene resin composite material described in the above item [25], which has the linear expansion coefficient of 8×10-5 or less.

[27]

The cellulose-aluminum-dispersing polyethylene resin composite material described in the above item [1], which has a moisture content of less than 1% by mass.

[28]

A pellet, containing the cellulose-aluminum-dispersing polyethylene resin composite material described in the above item [1].

[29]

A formed body, which is formed by using the cellulose-aluminum-dispersing polyethylene resin composite material described in the above item [1].

[30]

A method of producing a cellulose-aluminum-dispersing polyethylene resin composite material, comprising at least obtaining a cellulose-aluminum-dispersing composite material formed by dispersing a cellulose fiber and aluminum into a polyethylene resin by melt-kneading, in the presence of water, a cellulose-aluminum-adhering polyethylene thin film piece, wherein the cellulose-aluminum-adhering polyethylene thin film piece is obtained from:

(a) polyethylene laminated paper having paper, a polyethylene thin film layer and an aluminum thin film layer; and/or (b) a beverage/food pack formed of the polyethylene laminated paper.

[31]

A method of producing a cellulose-aluminum-dispersing polyethylene resin composite material, comprising the steps of:

agitating, in water, polyethylene laminated paper having paper, a polyethylene thin film layer and an aluminum thin film layer, and/or a beverage/food pack formed of the polyethylene laminated paper, to obtain a cellulose-aluminum-adhering polyethylene thin film piece, in which a part of the paper is removed; and melt-kneading the cellulose-aluminum-adhering polyethylene thin film piece and water at a temperature at which polyethylene is melted and a cellulose fiber is not deteriorated, to obtain a cellulose-aluminum-dispersing polyethylene resin composite material formed by dispersing a cellulose fiber and aluminum into a polyethylene resin.

[32]

The method of producing a cellulose-aluminum-dispersing polyethylene resin composite material described in the above item [30], wherein the melt-kneading is performed by using a batch type kneading device, the cellulose-aluminum-dispersing polyethylene thin film piece and water are charged into the batch type kneading device and agitated by rotating an agitation blade projected on a rotary shaft of the device, and a temperature in the device is increased by this agitation to perform the melt-kneading.

[33]
The method of producing a cellulose-aluminum-dispersing polyethylene resin composite material described in the above item [32], wherein the melt-kneading is performed by adjusting a peripheral speed at a leading edge of the agitation blade to 20 to 50 m/sec.

[34]
The method of producing a cellulose-aluminum-dispersing polyethylene resin composite material described in the above item [30]
wherein, in the composite material, a proportion of the cellulose fiber in the total content of 100 parts by mass of the polyethylene resin and the cellulose fiber is 1 part by mass or more and 70 parts by mass or less, and
wherein, in the composite material, a content of the aluminum is 1 part by mass or more and 40 parts by mass or less based on the total content of 100 parts by mass of the polyethylene resin and the cellulose fiber.

[35]
The method of producing a cellulose-aluminum-dispersing polyethylene resin composite material described in any one of the above item [30], wherein a cellulose-aluminum-dispersing composite material formed by dispersing a cellulose fiber and aluminum into a polyethylene resin is obtained by applying volume reduction treatment to the thin film piece in a state of containing water, and melt-kneading the resulting volume reduction treatment material.

[36]
The method of producing a cellulose-aluminum-dispersing polyethylene resin composite material described in the above item [30], wherein a cellulose-aluminum-dispersing composite material formed by dispersing a cellulose fiber and aluminum into a polyethylene resin is obtained by pulverizing the thin film piece in a state of containing water, and performing the melt-kneading of the resulting pulverized material.

[37]
The method of producing a cellulose-aluminum-dispersing polyethylene resin composite material described in any one of the above item [30], wherein the melt-kneading is performed by adjusting water amount to 5 parts by mass and less than 150 parts by mass based on 100 parts by mass of the thin film piece.

[38]
The method of producing a cellulose-aluminum-dispersing polyethylene resin composite material described in the above item [30], wherein the melt-kneading is performed by mixing a cellulose material.

[39]
The method of producing a cellulose-aluminum-dispersing polyethylene resin composite material described in the above item [38], wherein paper sludge is used as the cellulose material.

[40]
The method of producing a cellulose-aluminum-dispersing polyethylene resin composite material described in the above item [38], wherein a cellulose material in a state of absorbing water is used as the cellulose material.

[41]
The method of producing a cellulose-aluminum-dispersing polyethylene resin composite material described in the above item [30], wherein the melt-kneading is performed by mixing low density polyethylene and/or high density polyethylene.

[42]
The method of producing a cellulose-aluminum-dispersing polyethylene resin composite material described in the above item [30], wherein 50% by mass or more of the polyethylene resin composing the composite material is low density polyethylene.

[43]
The method of producing a cellulose-aluminum-dispersing polyethylene resin composite material described in the above item [30], wherein 80% by mass or more of the polyethylene resin composing the composite material is low density polyethylene.

[44]
The method of producing a cellulose-aluminum-dispersing polyethylene resin composite material described in the above item [30]$_1$ wherein, in the composite material, a content of polypropylene based on the total content of 100 parts by mass of the polyethylene resin and the cellulose fiber is 20 parts by mass or less.

[45]
The method of producing a cellulose-aluminum-dispersing polyethylene resin composite material described in the above item [30], wherein, in the composite material, a total content of polyethylene terephthalate and/or nylon based on the total content of 100 parts by mass of the polyethylene resin and the cellulose fiber is 10 parts by mass or less.

[46]
The method of producing a cellulose-aluminum-dispersing polyethylene resin composite material described in the above item [30], wherein, in the composite material, the number of aluminum having an X-Y maximum length of 1 mm or more in the number of aluminum having an X-Y maximum length of 0.005 mm or more is less than 1%.

[47]
A method of recycling a beverage/food pack formed of polyethylene laminated paper having paper, a polyethylene thin layer and an aluminum thin layer, containing performing the method of producing a cellulose-aluminum-dispersing polyethylene resin composite material described in the above item [30].

[48]
A method of producing a formed body, containing the steps of:
obtaining a formed body by mixing the cellulose-aluminum-dispersing polyethylene resin composite material described in the above item [1], high density polyethylene, and/or polypropylene; and forming the mixture.

[49]
A method of producing a formed body, containing the steps of: obtaining a formed body by mixing the pellet described in the above item [28], high density polyethylene, and/or polypropylene; and forming the mixture.

In the present specification, the numerical range expressed by using the expression "to" means a range including numerical values before and after the expression "to" as the lower limit and the upper limit.

In the present invention, a term referred to as "polyethylene" means low density polyethylene and/or high density polyethylene (HDPE).

The above-described low density polyethylene means polyethylene having a density of 880 kg/m$^3$ or more and less than 940 kg/m$^3$. The above-described high density polyethylene means polyethylene having a density larger than the density of the above-described low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above-described density range.

Advantageous Effects of Invention

The cellulose-aluminum-dispersing polyethylene resin composite material, the pellet and the formed body according to the present invention can cause suppression of the increase of water absorption ratio and are useful as a raw material for a resin product.

According to the method of producing a cellulose-aluminum-dispersing polyethylene resin composite material of the present invention, a composite material that is formed by dispersing a cellulose fiber and aluminum into a polyethylene resin, and is useful as a raw material for a resin product can be efficiently obtained by directly using, as a raw material, polyethylene laminated paper having paper, a polyethylene thin film layer and an aluminum thin film layer, or a cellulose-aluminum-adhering polyethylene thin film piece obtained from a beverage/food pack formed of the polyethylene laminated paper.

According to a recycling method of the present invention, the polyethylene laminated paper having the paper, the polyethylene thin film layer and the aluminum thin film layer, or a beverage/food pack formed of the polyethylene laminated paper can be recycled into a composite material, which is useful as a raw material for a resin material, and formed by dispersing a cellulose fiber and aluminum into a polyethylene resin. That is, the cellulose-aluminum-adhering polyethylene thin film piece that has been so far difficult to be recycled as a resin raw material on technology and also on cost can be effectively used only by providing the thin film piece for a simple treatment step as it is, and wastes can be significantly reduced.

BRIEF DESCRIPTION OF THE DRAWINGS

FIG. 1 is a diagram showing one example of a half-width of a molecular weight distribution. A width shown by an arrow in FIG. 1 is the half-width.

MODE FOR CARRYING OUT THE INVENTION

Hereinafter, preferable embodiments of the present invention will be described in detail.
[Cellulose-Aluminum-Dispersing Polyethylene Resin Composite Material]

The cellulose-aluminum-dispersing polyethylene resin composite material of the present invention (hereinafter, also referred to simply as "composite material of the present invention") is formed by dispersing a cellulose fiber and aluminum into a polyethylene resin, in which a proportion of the cellulose fiber is 1 part by mass or more and 70 parts by mass or less in a total content of 100 parts by mass of the polyethylene resin and the cellulose fiber.

In the composite material of the present invention, the cellulose fiber and aluminum are dispersed in the polyethylene resin in a sufficiently uniform state, and adaptability to extrusion molding, injection molding and the like is high.

In the composite material of the present invention, water absorption ratio satisfies the following formula [Formula C]. If the water absorption ratio is excessively high, mechanical characteristics such as flexural strength during absorption of water are reduced. If a cellulose effective mass ratio mentioned later is in the range of 5 to 40%, such a case is further preferable. In addition, "water absorption ratio" (unit: %) means the water absorption ratio upon immersing, into water of 23° C. for 20 days, a formed body having a length of 100 mm, a width of 100 mm and a thickness of 1 mm shaped using the composite material, which is measured according to the method described in Examples mentioned later.

$$(\text{water absorption ratio [\%]}) < (\text{cellulose effective mass ratio [\%]})^2 \times 0.01. \qquad [\text{Formula C}]$$

Here, the cellulose effective mass ratio can be determined by performing a thermogravimetric analysis (TGA) from 23° C. to 400° C. at a heating rate of +10° C./min under a nitrogen atmosphere on a sample of a cellulose-aluminum-dispersing polyethylene resin composite material adjusted to a dry state by drying the sample at 80° C. for one hour in an ambient atmosphere in advance, and by calculating the cellulose effective mass ratio according to the following formula [Formula B].

$$(\text{Cellulose effective mass ratio [\%]}) = (\text{mass loss [mg] from 270° C. to 390° C.}) \times 100/(\text{mass [mg] of a resin composite material sample in a dry state before being provided for the thermogravimetric analysis}) \qquad [\text{Formula B}]$$

In the composite material of the present invention, even though the composite material contains the cellulose fiber having high water absorbing properties, an increase of the water absorption ratio is suppressed to a predetermined level in this composite material. This reason is not certain, but it is assumed that the water absorbing properties of the cellulose fiber are effectively masked by the polyethylene resin in such a manner that the cellulose fiber and the polyethylene resin are formed into a so-called integrated state by a form formed by uniformly dispersing the cellulose resin into the polyethylene resin, and the water absorbing properties are suppressed in combination with water repellent action of aluminum micronized and uniformly dispersed into the polyethylene resin. Moreover, in order to uniformly disperse the cellulose fiber and aluminum into the polyethylene resin, it is necessary to perform melt-kneading of the thin film piece in the presence of water as mentioned later. It is also considered, as one contributory factor of suppressing the water absorbing properties, that a part of the polyethylene resin is decomposed into low-molecular weight components in this melt-kneading, a hydrophilic group is formed on the surface thereof, and this hydrophilic group is bonded with a hydrophilic group on the surface of the cellulose fiber, resulting in reducing the hydrophilic group on the surface thereof, or that the cellulose is decomposed by action of hot water or water in a subcritical state in the melt-kneading, and the hydrophilic group is reduced, or the like.

In the composite material of the present invention, even though the composite material contains the cellulose fiber having high water absorbing properties, an increase of the water absorption is suppressed to a predetermined level in this composite material. This reason is not certain, but it is assumed that the water absorbing properties of the cellulose fiber are effectively masked by the polyethylene resin in such a manner that the cellulose fiber and the polyethylene resin are formed into a so-called integrated state by a form formed by uniformly dispersing the cellulose resin into the polyethylene resin, and the water absorbing properties are suppressed in combination with water repellent action of aluminum micronized and uniformly dispersed into the polyethylene resin.

In the composite material of the present invention, the proportion of the cellulose resin in the total content of 100 parts by mass of the polyethylene resin and the cellulose resin is adjusted to 70 parts by mass or less. If this proportion is over 70 parts by mass, it becomes hard to obtain the composite material in which the cellulose fibers are uniformly dispersed by the melt-kneading, and the water absorbing properties of the composite material obtained tend to significantly rise. From viewpoints of further suppressing the water absorbing properties and further enhancing impact resistance as mentioned later, the proportion of the cellulose fiber in the total content of 100 parts by mass of the polyethylene resin and the cellulose fiber is preferably less than 50 parts by mass.

The proportion of the cellulose fiber in the total content of 100 parts by mass of the polyethylene resin and the cellulose fiber is 1 part by mass or more. Flexural strength to be mentioned later can be further improved by adjusting this proportion to 1 part by mass or more. From this viewpoint, the proportion of the cellulose fiber in the total content of 100 parts by mass of the polyethylene resin and the cellulose fiber is preferably 5 parts by mass or more, and more preferably 15 parts by mass or more. Moreover, if a point of further improving tensile strength is also taken into consideration, the proportion is preferably 25 parts by mass or more.

In the composite material of the present invention, a content of aluminum (hereinafter, also referred to as an aluminum dispersoid) is preferably 1 part by mass or more and 40 parts by mass or less based on the total content of 100 parts by mass of the polyethylene resin and the cellulose fiber. Processability of the composite material can be further improved by adjusting the content of aluminum to a level within this range, and a lump of aluminum becomes harder to be formed during processing of the composite material. In the aluminum thin film layer of the polyethylene laminated paper, aluminum is not melted during the melt-kneading, but is gradually sheared and micronized by shear force during kneading.

In addition to the viewpoint of the above-described processability, when thermal conductivity, flame retardancy and the like are taken into consideration, in the composite material of the present invention, the content of aluminum is preferably 5 parts by mass or more and 30 parts by mass or less, and further preferably 5 parts by mass or more and 10 parts by mass or less, based on the total content of 100 parts by mass of the polyethylene resin and the cellulose fiber.

The composite material of the present invention preferably contains aluminum having an X-Y maximum length of 0.005 mm or more. A proportion of the number of aluminum dispersoids having an X-Y maximum length of 1 mm or more in the number of aluminum dispersoids having an X-Y maximum length of 0.005 mm or more is preferably less than 1%. Processability of the composite material can be further improved by adjusting this proportion to a level less than 1%, the lump of aluminum becomes harder to be formed during processing of the composite material.

The X-Y maximum length is determined by observing the surface of the composite material. In this observation surface, a longer length of an X-axis maximum length and an Y-axis maximum length is taken as the X-Y maximum length by drawing a straight line in a specific direction (X-axis direction) relative to the aluminum dispersoid to measure the maximum distance (X-axis maximum length) in which a distance connecting lines between two intersection points where the straight line intersects with an outer periphery of the aluminum dispersoid becomes maximum, and drawing another straight line in a direction (Y-axis direction) perpendicular to the specific direction to measure the maximum distance (Y-axis maximum length) connecting lines between the two intersection points where the Y-axis direction line intersects with the outer periphery of the aluminum dispersoid becomes maximum. The X-Y maximum length can be determined using image analysis software as described in Examples mentioned later.

In the aluminum dispersoid dispersed in the composite material of the present invention, an average of the X-Y maximum length of individual aluminum dispersoids is preferably 0.02 to 0.2 mm, and more preferably 0.04 to 0.1 mm. The average of the X-Y maximum length is taken as the average of the X-Y maximum length measured by using the image analysis software as mentioned later.

The cellulose fiber contained in the composite material of the present invention preferably contains a material having a fiber length of 1 mm or more. Mechanical strength such as the tensile strength and the flexural strength can be further improved by containing the cellulose fiber having the fiber length of 1 mm or more.

In the composite material of the present invention, it is preferable that the proportion of the cellulose fiber is 25 parts by mass or more and less than 50 parts by mass in the total content of 100 parts by mass of the polyethylene resin and the cellulose fiber, and the tensile strength is 20 MPa or more. In the composite material of the present invention, it is more preferable that the proportion of the cellulose fiber is 25 parts by mass or more and less than 50 parts by mass in the total content of 100 parts by mass of the polyethylene resin and the cellulose fiber, and the tensile strength is 25 MPa or more. In particular, as mentioned later, even if the polyethylene resin forming the composite material contains low density polyethylene as a main component or contains 80% by mass or more of low density polyethylene, it is preferable that the proportion of the cellulose fiber is 25 parts by mass or more and less than 50 parts by mass in the total content of 100 parts by mass of the polyethylene resin and the cellulose resin, and the tensile strength is 20 MPa or more (and further preferably 25 MPa or more). Even if the polyethylene resin forming the composite material contains low density polyethylene as the main component or contains 80% by mass or more of low density polyethylene, the composite material exhibiting the above-described desired tensile strength can be obtained by the production method of the present invention as mentioned later.

In the composite material of the present invention, it is preferable that the proportion of the cellulose fiber is 1 part by mass or more and less than 15 parts by mass in the total content of 100 parts by mass of the polyethylene resin and the cellulose fiber, and the flexural strength is 8 to 20 MPa. Moreover, in the composite material of the present invention, the proportion of the cellulose fiber may be 5 parts by mass or more and less than 15 parts by mass in the total content of 100 parts by mass of the polyethylene resin and the cellulose fiber, and the flexural strength may be 10 to 20 MPa. Moreover, in the composite material of the present invention, it can also be adjusted in such a manner that the proportion of the cellulose fiber is 15 parts by mass or more and less than 50 parts by mass in the total content of 100 parts by mass of the polyethylene resin and the cellulose fiber, and the flexural strength is 15 to 40 MPa.

The above-described flexural strength is measured by shaping the composite material into a specific shape. More specifically, the flexural strength is measured by the method in Examples to be described later.

In the composite material of the present invention, a moisture content is preferably less than 1% by mass. As mentioned later, the composite material of the present invention can be produced by the melt-kneading a resin-containing raw material in the presence of water. According to this method, water can be effectively removed as vapor while performing the melt-kneading, and the moisture content of the composite material obtained can be reduced to a level less than 1% by mass. Accordingly, in comparison with a case where removal of the moisture and the melt-kneading are performed as different processes, energy consumption (power consumption or the like) required for the removal of the moisture can be significantly suppressed.

In the composite material of the present invention, the water absorption ratio after the composite material is immersed into water of 23° C. for 20 days is preferably 0.1 to 10%. In the polyethylene resin composite material of the present invention, an increase of the water absorption ratio can be suppressed as mentioned above. Moreover, when a small amount of water is absorbed therein, the composite material preferably has physical properties of enhanced impact resistance without causing significant reduction of the flexural strength. The formed body using the composite material of the present invention can be preferably used also in outdoor use by having such physical properties.

The water absorbing properties and the impact resistance of the composite material can be measured by shaping the composite material into a specific shape. More specifically, the water absorbing properties and the impact resistance are measured by the method described in Examples to be mentioned later.

The polyethylene resin forming the composite material of the present invention preferably satisfies a relationship: 1.7>half-width (Log(MH/ML))>1.0 in a molecular weight pattern obtained by gel permeation chromatography (GPC) measurement. Flowability and injection moldability of the composite material can be further improved, by satisfying this relationship, and the impact resistance can be further enhanced. The polyethylene resin forming the composite material of the present invention further preferably satisfies a relationship: 1.7>half-width (Log(MH/ML))>1.2. Moreover, a weight average molecular weight of the polyethylene resin is preferably 100,000 to 300,000. In the weight average molecular weight is less than 100,000, the composite material is poor in impact characteristics, and if the weight average molecular weight is over 300,000, the composite material tends to be poor in the flowability.

In the composite material of the present invention, with regard to the polyethylene resin forming the composite material, the molecular weight at which the maximum peak value is exhibited is preferably in the range of 10,000 to 1,000,000, and the weight average molecular weight Mw is preferably in the range of 100,000 to 300,000, in the molecular weight pattern obtained by gel permeation chromatography measurement. The impact characteristics tend to be further enhanced by adjusting the molecular weight at which the maximum peak value is exhibited to 10,000 or more, and the weight average molecular weight to 100,000 or more. Moreover, the flowability tends to be further enhanced by adjusting the molecular weight at which the maximum peak value is exhibited to 1,000,000 or less, and the weight average molecular weight to 300,000 or less.

As mentioned later, such a molecular weight pattern of the polyethylene resin can be realized by melt-kneading the resin-containing raw material in the presence of water in the composite material of the present invention. That is, such a pattern can be realized by allowing the polyethylene resin, the cellulose fiber and aluminum to coexist in the presence of water, and performing high-speed melt-kneading thereof.

The above-described half-width of the molecular weight pattern shows spread of a spectrum (degree of the molecular weight distribution) around a peak top (maximum frequency) of a maximum peak of the molecular weight patterns in GPC. A width of a GPC spectral line in a place (a molecular weight on a high molecular weight side and a molecular weight on a low molecular weight side are referred to as MH and ML, respectively) in which intensity in the spectrum becomes a half of the peak top (maximum frequency) is taken as the half-width.

In the composite material of the present invention, a melt flow rate (MFR) at a temperature of 230° C. and a load of 5 kgf is preferably 0.05 to 50.0 g/10 min. Further satisfactory formability can be realized, and the impact resistance of the formed body obtained can be further enhanced by adjusting MFR in the above-described preferable range.

The composite material of the present invention can be processed into a pellet by melting and solidifying the composite material into an arbitrary shape and size or cutting the composite material. For example, the pellet can be obtained by extruding a pulverized material of the composite material of the present invention into a strand form by a twin screw extruder, cooling and solidifying the strand, and then cutting the resulting material. Alternatively, the pellet can be obtained by extruding the pulverized material of the composite material of the present invention and cutting the resulting material by a twin screw extruder provided with hot cutting. The size and the shape of these pellets are not particularly limited, and can be appropriately selected according to the purpose. For example, the pellet can be finished into a substantially column-shaped or disc-shaped grain having a diameter of several millimeters.

The polyethylene resin forming the composite material of the present invention preferably contains low density polyethylene as the main component, and 50% by mass or more of the polyethylene resin forming the composite material of the present invention is more preferably low density polyethylene, and 80% by mass or more of the polyethylene resin forming the composite material of the present invention is further preferably low density polyethylene.

The composite material of the present invention may contain a resin component other than the polyethylene resin. For example, the composite material may contain polypropylene. In this case, a content of polypropylene is preferably 20 parts by mass or less based on the total content of 100 parts by mass of the polyethylene resin and the cellulose fiber.

Moreover, the composite material of the present invention may contain polyethylene terephthalate and/or nylon, for example. In this case, it is preferable that the composite material contains polyethylene terephthalate and/or nylon, and a total content of polyethylene terephthalate and/or nylon is 10 parts by mass or less based on the total content of 100 parts by mass of the polyethylene resin and the cellulose fiber. Here, "the total content of polyethylene terephthalate and/or nylon" means a content of one kind when the composite material contains either polyethylene terephthalate or nylon, or means a total content of polyethylene terephthalate and nylon when the composite material contains both polyethylene terephthalate and nylon.

If a kind of the resin that may be mixed into the composite material is known, an amount of the resin other than the polyethylene resin can be determined based on a soluble mass ratio to hot xylene for the composite material.

—Soluble Mass Ratio to Hot Xylene—

The soluble mass ratio to hot xylene is determined as described below in the present invention.

In accordance with measurement of a degree of cross-linking in JASO D 618 as the standard for automotive electrical cables, 0.1 to 1 g is cut out from a formed sheet of the composite material and taken as a sample, and this sample is wrapped with a 400-mesh stainless steel mesh, and immersed into 100 mL of xylene at a predetermined temperature for 24 hours. Next, the sample is pulled up therefrom and is dried in vacuum at 80° C. for 24 hours. From the mass of the sample before and after the test, the soluble mass ratio to hot xylene G (%) is calculated according to the following formula:

$$G=\{(W0-W)/W0\}\times 100$$

where,

W0 is mass of a composite material before being immersed into hot xylene, and

W is mass of a composite material after being immersed into hot xylene and then drying and removing xylene.

For example, "the content of polypropylene is 20 parts by mass or less based on the total content of 100 parts by mass of the polyethylene resin and the cellulose fiber" means that, when a soluble mass ratio to hot xylene of 138° C. for the composite material is taken as Ga (%), a soluble mass ratio to hot xylene of 105° C. for the composite material is taken as Gb (%), and an cellulose effective mass ratio is taken as Gc (%), a term: Ga−Gb corresponds to a mass ratio (%) of polypropylene and Gb corresponds to a mass ratio (%) of polyethylene. Accordingly, the composite material of the present invention also preferably satisfies the following formula:

$$\{(Ga-Gb)/(Gb+Gc)\}\times 100 \leq 20$$

where, $$Ga=\{(W0-Wa)/W0\}\times 100,$$

$$Gb=\{(W0-Wb)/W0\}\times 100,$$

where,

W0 is mass of a composite material before being immersed into hot xylene,

Wa is mass of a composite material after being immersed into hot xylene of 138° C. and then drying and removing xylene, and Wb is mass of a composite material after being immersed into hot xylene of 105° C. and then drying and removing xylene, $$Gc=\{Wc/W00\}\times 100,$$

where,

Wc is an amount of mass reduction of a dry composite material while a temperature is raised from 270° C. to 390° C. in a nitrogen atmosphere, and W00 is mass of a dry composite material before a temperature is raised (at 23° C.) as described above.

At least a part of the above-described polyethylene resin and/or the polypropylene forming the composite material of the present invention is preferably derived from a recycled material. Specific examples of this recycled material include the cellulose-aluminum-adhering polyethylene thin film piece; the polyethylene laminated paper having the paper, the polyethylene thin film layer and the aluminum thin film layer; the beverage/food pack each formed of the polyethylene laminated paper having the paper; the polyethylene thin film layer and the aluminum thin film layer; the polyethylene laminated paper having the paper and the polyethylene thin film layer; and the beverage/food pack formed of the polyethylene laminated paper having the paper and the polyethylene thin film layer as described above.

The composite material of the present invention is preferably obtained as derived from (a) the polyethylene laminated paper having the paper, the polyethylene thin film layer and the aluminum thin film layer; and/or (b) the beverage/food pack formed of the laminated paper having the paper, the polyethylene thin film layer and the aluminum thin film layer. More specifically, the composite material is preferably obtained by using, as the raw material, (c) the cellulose-aluminum-adhering polyethylene thin film piece obtained by stripping off and removing, by using a pulper, the paper portion by treating the laminated paper and/or the beverage/food pack as described above. Further specifically, the composite material is preferably a material obtained by providing the cellulose-aluminum-adhering polyethylene thin film piece, in the presence of water, for melt-kneading treatment to be mentioned later.

The composite material of the present invention may contain an inorganic material. Flexural modulus and flame retardancy may be improved by containing the inorganic material. From viewpoints of the flexural modulus and the impact characteristics, a preferable content of the inorganic material based on 100 parts by mass of the polyethylene resin is 1 to 100 parts by mass. When the flame retardancy is taken into consideration, and the impact characteristics are further taken into consideration, a preferable content of the inorganic material based on 100 parts by mass of the polyethylene resin is preferably 5 to 40 parts by mass.

Specific examples of the inorganic material include calcium carbonate, talc, clay, magnesium oxide, aluminum hydroxide, magnesium hydroxide and titanium oxide. Above all, calcium carbonate is preferable. As the inorganic material, when the composite material is obtained by adding, to the cellulose-aluminum-adhering polyethylene thin film piece to be mentioned later, paper sludge, waste paper, a laminated paper waste material, or the like, and kneading the resulting material in the presence of water, the inorganic material may be derived from a filler material originally contained in the paper sludge, the waste paper and the laminated paper waste material.

The composite material of the present invention may contain a flame retardant, an antioxidant, a stabilizer, a weathering agent, a compatibilizer, an impact improver, a modifier, or the like according to the purpose.

Specific examples of the flame retardant include a phosphorus type flame retardant, a halogen type flame retardant and metal hydroxide as mentioned above. In order to improve the flame retardancy, the composite material may contain a resin such as an ethylene-based copolymer including an ethylene-vinyl acetate copolymer and an ethyl acrylate copolymer.

Examples of the phosphorus type flame retardant include a compound containing a phosphorus atom in a molecule. Specific examples thereof include red phosphorus, phosphorous oxide such as phosphorus trioxide, phosphorus tetroxide and phosphorus pentoxide; a phosphoric acid compound such as phosphoric acid, phosphorous acid, hypophosphoric acid, metaphosphoric acid, pyrophosphoric acid and polyphosphoric acid; ammonium phosphate such as monoammonium phosphate, diammonium phosphate and ammonium polyphosphate; melamine phosphate such as melamine monophosphate, melamine diphosphate and melamine polyphosphate; metal phosphate including lithium phosphate, sodium phosphate, potassium phosphate, calcium phosphate and magnesium phosphate; aliphatic phosphoric acid esters such as trimethyl phosphate and triethyl phosphate; and aromatic phosphoric acid esters such as triphenyl phosphate and tricresyl phosphate.

Specific examples of the halogen type flame retardant include aliphatic hydrocarbon bromide such as hexabromocyclododecane; aromatic compound bromide such as hexabromobenzene, ethylenebispentabromodiphenyl and 2,3-dibromopropylpentabromo phenyl ether; brominated bisphenols such as tetrabromobisphenol A and a derivative thereof; a brominated bisphenols derivative oligomer; a bromide type aromatic compound; chlorinated paraffin; chlorinated naphthalene; perchloropentadecane; tetrachlorophthalic anhydride; a chlorinated aromatic compound; a chlorinated alicyclic compound; and a bromide type flame retardant such as hexabromophenyl ether and decabromodiphenyl ether.

Specific examples of the metal hydroxide include magnesium hydroxide and aluminum hydroxide. Moreover, a material obtained by applying surface treatment to the metal hydroxide described above can also be used.

Specific examples of the antioxidant, the stabilizer and the weathering agent include a hindered phenol antioxidant such as tetrakis[methylene-3-(3,5-di-t-butyl-4-hydroxyphenyl)propionate]methane, 1,3,5-trimethyl-2,4,6-tris(3,5-di-t-butyl-4-hydroxybenzyl)benzene and 4,4'-tiobis(3-methyl-6-t-butylphenol); and a hindered amine compound such as polymethylpropyl 3-oxy-[4(2,2,6,6-tetramethyl)piperidine] siloxane, polyester of 4-hydoxy-2,2,6,6-tetrannethyl-1-piperidine ethanol with succinic acid, poly[{6-(1,1,3,3-tetrannethylbutyl)amino-1,3,5-triazine-2,4-diyl}{(2,2,6,6-tetramethyl-4-piperidypimino}hexamethylene {(2,2,6,6-tetramethyl-4-piperidyl)imino}]. A content of the antioxidant, the stabilizer or the weathering agent is preferably 0.001 part by mass to 0.3 part by mass, each based on 100 parts by mass of the composite material, and is appropriately adjusted depending on a kind of the antioxidant, the stabilizer or the weathering agent and an application of the composite material.

Specific examples of the compatibilizer, the impact improver and the modifier include a styrene-based elastomer such as polystyrene-poly(ethylene-ethylene/propylene) block-polystyrene, polystyrene-poly(ethylene/butylene) block-polystyrene, polystyrene-poly(ethylene/propylene) block-polystyrene and an olefin crystalline ethylene-butylene-olefin crystalline block polymer; acid-modified polyolefin such as maleic acid-modified polyethylene and maleic acid-modified polypropylene. From a viewpoint of enhancing the tensile strength and the flexural strength, maleic acid-modified polyethylene can be preferably used.

The composite material of the present invention can contain an oil component or various additives for improving processability. Specific examples thereof include paraffin, modified polyethylene wax, stearate, hydroxy stearate, a vinylidene fluoride-based copolymer such as a vinylidene fluoride-hexafluoropropylene copolymer, and organic-modified siloxane.

The composite material of the present invention can also contain carbon black, various pigments and dyes. The composite material of the present invention can also contain a metallic luster colorant. In this case, aluminum contained in the composite material of the present invention may act thereon in a direction of further enhancing metallic luster by the metallic luster colorant.

The composite material of the present invention can also contain an electrical conductivity-imparting component such as electrically conductive carbon black other than aluminum. In this case, aluminum contained in the composite material of the present invention may act thereon in a direction of further enhancing electrical conductivity by the electrical conductivity-imparting component.

The composite material of the present invention can also contain a thermal conductivity-imparting component other than aluminum. In this case, aluminum contained in the composite material of the present invention may act thereon in a direction of further enhancing thermal conductivity by the thermal conductivity-imparting component.

The composite material of the present invention may be a foam. That is, the composite material of the present invention may be in a foamed state by action of a foaming agent. Examples of the foaming agent include an organic or inorganic chemical foaming agent, and specific examples include azodicarbonamide.

The composite material of the present invention may be crosslinked. Examples of the crosslinking agent include organic peroxide, and specific examples include dicumyl peroxide. The composite material of the present invention may be in a crosslinked form by a silane crosslinking method.

The formed body of the present invention can be obtained by using the composite material of the present invention. In the formed body of the present invention, the cellulose resin and the aluminum are dispersed in the polyethylene resin in a uniform state. Therefore the formed body is high in homogeneity, and excellent in shape stability, and also excellent in the flexural strength and the impact resistance, and can be used in for many purposes. The formed body of the present invention can also be used in a pellet form or as a forming material.

The composite material or the pellet of the present invention can be processed into the formed body by being mixed with a polyolefin resin such as high density polyethylene and polypropylene, and forming this mixture. This formed body can be obtained by melt-kneading the composite material or the pellet of the present invention and the polyolefin resin such as high density polyethylene and polypropylene, and then by a known forming method such as injection molding and extrusion molding, for example. The thus-obtained formed body may be in a form excellent in the mechanical characteristics such as the tensile strength, the flexural strength and the flexural modulus. Moreover, the formed body may be in a form excellent also in thermal characteristics in which the linear expansion coefficient is reduced, or high thermal conductivity is enhanced. Further, this formed body may be in a form excellent in water-proof characteristics in which the water absorbing properties are suppressed.

In other words, the composite material or the pellet of the present invention can be used as a modified masterbatch containing the cellulose fiber and aluminum for the polyolefin resin such as high density polyethylene and polypropylene. When the composite material or the pellet is used as this modified masterbatch, as a content of the cellulose fiber in the composite material or the pellet of the present invention, a proportion of the cellulose fiber is preferably 25 parts by mass or more, further preferably 35 parts by mass or more, and still further preferably 40 parts by mass or more, in the total content of 100 parts by mass of the polyethylene resin and the cellulose fiber.

Subsequently, with regard to the production method for the composite material of the present invention, a preferable embodiment will be described below, but the composite material of the present invention is not limited to the material obtained by the method described below. In addition, the preferable embodiment of the production method for the composite material of the present invention as described below is also referred to as "production method of the present invention".

[Production Method for the Composite Material]

According to the production method of the present invention, as a raw material, a cellulose-aluminum-adhering polyethylene thin film piece obtained from polyethylene laminated paper having paper, a polyethylene thin film layer and an aluminum thin film layer is used. This cellulose-aluminum-adhering polyethylene thin film piece is preferably obtained from a beverage/food pack formed of the polyethylene laminated paper having the paper, the polyethylene thin film layer and the aluminum thin film layer.

<Cellulose-Aluminum-Adhering Polyethylene Thin Film Piece>

In polyethylene laminated paper having paper, a polyethylene thin film layer and an aluminum thin film layer (preferably, a beverage/food pack formed of this polyethylene laminated paper), high quality pulp which is tough and has beautiful appearance as a material of a paper portion is generally used, and such pulp is mainly composed of a cellulose fiber. Then, a polyethylene thin film is attached on a surface of the paper portion by polyethylene extrusion lamination processing, and is configured so as to prevent penetration of beverage into the paper portion. Further, when the polyethylene laminated paper has the aluminum thin film layer, gas barrier properties are improved to contribute to long-term storage of the beverage or food or to flavor retention.

In order to recycle the polyethylene laminated paper such as the beverage/food pack, in general, the paper portion is stripped off and removed from the laminated paper by charging the polyethylene laminated paper into the pulper and agitating the paper in water to be separated into a polyethylene thin film portion (including a portion to which the aluminum thin film is adhered and a portion to which the aluminum thin film is not attached) and the paper portion. In that case, the polyethylene thin film portion contains a portion cut into nonuniform small pieces with a size of about 0.1 $cm^2$ to 500 $cm^2$ or a portion close to a size obtained by developing the beverage container, for example. On the surface of the polyethylene thin film portion on a side from which the paper portion is stripped off, the portion is in a state in which a large number of cellulose fibers which are unable to be completely removed are still nonuniformly adhered thereto. In the present invention, as mentioned above, this polyethylene thin film portion is referred to as "cellulose-aluminum-adhering polyethylene thin film piece". Moreover, in the cellulose-aluminum-adhering polyethylene thin film piece, the paper portion is removed by using the pulper to a certain extent, and an amount of the cellulose fiber is smaller than the amount of the beverage/food pack itself. That is, in the case of the thin film piece is an aggregate of the cellulose fiber-aluminum-adhering polyethylene thin film piece (thin film piece raw material as a whole), a proportion of the cellulose fiber in the total content of 100 parts by mass of the polyethylene resin and the cellulose fiber, in dry mass, is preferably 1 part by mass or more and 70 parts by mass or less, more preferably 5 parts by mass or more and 70 parts by mass or less, and further preferably 5 parts by mass or more and less than 50 parts by mass, and still further preferably 25 parts by mass or more and less than 50 parts by mass. Moreover, the cellulose-aluminum-adhering polyethylene thin film piece obtained by being treated by using the pulper is in a state in which the cellulose fiber absorbs a large amount of water. Herein, an expression simply referred to as "the cellulose-aluminum-adhering polyethylene thin film piece" in the present invention means a thin film piece in a state in which a moisture content is removed (state of absorbing no water).

In general treatment by using the pulper, the cellulose-aluminum-adhering polyethylene thin film piece obtained ordinarily has a smaller amount of the cellulose fiber than the amount of the polyethylene resin in the dry mass, in the case where the thin film piece is an aggregate of the thin film (thin film raw material as a whole).

In the "cellulose-aluminum-adhering polyethylene thin film piece", the cellulose fiber adhered thereto may be in a state in which the fibers are not brought into contact with each other and are dispersed or may be in a state in which the fibers are entangled with each other to retain a state of paper. The "cellulose-aluminum-adhering polyethylene thin film piece" may contain the polyethylene resin, the cellulose fiber, a filler (kaolin or talc, for example) generally contained in order to enhance whiteness of the paper, a is stripped off and the like. Here, the sizing agent is an additive to be added for the purpose of suppressing permeability of liquid such as ink into the paper, preventing set-off or blurring, and providing the paper with a certain degree of water proofness. The sizing agent has a hydrophobic group and a hydrophilic group, and the hydrophobic group thereof is directed outward to give the paper with hydrophobicity. The sizing agent has an internal addition system and a surface system, and has a natural product and a synthetic product for both. As a main agent, rosin soap, alkylketene dimer (ADK), alkenyl succinic anhydride (ASA), polyvinyl alcohol (PVA), or the like is used. As a surface sizing agent, oxidized starch, a styrene-acryl copolymer, a styrene-methacrylic acid copolymer or the like is used. In addition thereto, other components may be contained within the range in which advantageous effects of the present invention are not adversely affected. For example, the agent may contain various additives which are contained in the laminated paper as the raw material, an ink component, and the like. A content of other components described above each in the cellulose-aluminum-adhering polyethylene thin film piece (in the cellulose-aluminum-adhering polyethylene thin film piece from which moisture is removed) is ordinarily 0 to 10% by mass, and preferably 0 to 3% by mass.

<Action of Water in Melt-Kneading>

According to the production method of the present invention, the above-described cellulose-aluminum-adhering polyethylene thin film piece is melt kneaded in the presence of water. That is, a polyethylene resin composite material formed by dispersing a cellulose fiber and aluminum can be obtained by melt-kneading the thin film piece in the presence of water. Here, a term "melt-kneading" means kneading of the thin film piece at a temperature at which the polyethylene resin in the cellulose-aluminum-adhering polyethylene thin film piece is melted. The melt-kneading is preferably performed at a temperature at which the cellulose fiber is not deteriorated. An expression "the cellulose fiber is not deteriorated" means that the cellulose fiber does not cause significant discoloration, burning or carbonization.

A maximum arrival temperature in the above-described melt-kneading is preferably adjusted to 110 to 280° C., and further preferably 130 to 220° C.

The cellulose fiber is released from a fixed state or thermally fused state in which the cellulose fiber is embedded on the surface of the polyethylene resin by a load of shear force and action of hot water (including physical action and chemical action (hydrolytic action) of the hot water by performing the melt-kneading of the thin film piece in the presence of water, and further each cellulose fiber is released from a network-shaped entanglement of the cellulose fibers with each other, and a shape of the cellulose is changed from a paper shape to a fibrous form, and the cellulose fibers can be uniformly dispersed into the polyethylene resin. Moreover, the hot water also acts on aluminum to promote formation of hydrated oxide onto the surface of the aluminum or melting of the surface thereof. In particular, when a hydrogen ion concentration (pH) is shifted from the neutrality, dissolution action increases. It is considered that the shear force by the melt-kneading and a reaction of the hot water with aluminum act thereon in a multiple manner, aluminum is sufficiently micronized, and the cellulose-aluminum-dispersing polyethylene resin composite material having uniform physical properties can be obtained from the cellulose-aluminum-adhering polyester thin film piece in which the size and the shape are nonuniform, and a state of adhesion of the cellulose fiber is also nonuniform. Moreover, in micronization of aluminum and formation of hydrated oxide on the surface thereof to be promoted by the shear force and the hot water, accordingly as the aluminum is further micronized, the surface area increases, resulting in increasing an amount of the hydrated oxide on the surface of aluminum. It is considered that this phenomenon advantageously works also in improving the flame retardancy of the composite material.

If the cellulose-aluminum-adhering polyethylene thin film piece is used as the raw material of the composite material, pH of water (hot water) ordinarily shows a value on an alkaline side in a state of performing the melt-kneading as described above. The pH of water in the state of performing the melt-kneading is preferably in the range of 7.5 to 10, and also preferably in the range of 7.5 to 9. The water shows alkalinity. Thus, the aluminum and the water react with each other and the aluminum is easily dissolved thereinto, and uniform dispersibility in the polyethylene resin can be further enhanced.

Moreover, in the state of performing the melt-kneading as described above, the pH of the water may be adjusted to a value on an acid side (preferably pH to 4 to 6.5, and further preferably pH to 5 to 6.5). Also in this case, the aluminum and the water react with each other and the aluminum is easily dissolved thereinto, and the uniform dispersibility in the polyethylene resin can be further enhanced. However, when the pH is on the acid side, particularly a metal part of a melt-kneading device or each device used for production may be damaged. From this point, the pH showing the value on the alkaline side is preferable.

The hot water may be turned into water in the subcritical state. Here, "water in the subcritical state" means water which is in a high temperature and high pressure state, and does not reach a critical point of water (temperature: 374° C. and pressure: 22 MPa), and more specifically, is in a state in which the temperature is equal to or more than a boiling point (100° C.) of water, the temperature and the pressure each are equal to or less than the critical point of water, and the pressure is at least near a saturated water vapor pressure.

In the water in the subcritical state, an ionic product becomes larger than the ionic product of water under an atmospheric pressure at 0° C. or more and 100° C. or less, and it is assumed that the water in the subcritical state causes weakening of intermolecular bonding of the cellulose fibers, and defibration of the cellulose fibers is promoted. Moreover, it is considered that the water in the subcritical state has higher reactivity with the aluminum and can further enhance the micronization and the uniform dispersibility.

A method of performing the melt-kneading of the cellulose-aluminum-adhering polyethylene thin film piece in the presence of water is not particularly limited. For example, the cellulose-aluminum-adhering polyethylene thin film piece and water are charged into a closed space to intensively knead the thin film piece and water in such a closed space to raise the temperature in the space, in which the melt-kneading can be performed. In addition, a term "closed" in the present invention is used in the meaning of a space which is closed from outside, but is not in a completely closed state. That is, as described above, the closed space means the space provided with a mechanism according to which, if the thin film piece and water are intensively kneaded in the closed space, the temperature and the pressure rise, but the vapor is discharged to outside under such a high temperature and a pressure. Accordingly, while the melt-kneading in the presence of water is achieved by intensively kneading the thin film piece and water in the closed space, the moisture is continuously discharged to outside as the vapor. Therefore the moisture can be finally significantly reduced, or can be substantially completely removed. Moreover, the melt-kneading can be performed by setting the temperature to a level equal to or more than a melting temperature of the polyethylene resin by using a kneader. In a similar manner in this case also, the moisture can be vaporized while the melt-kneading is performed.

As mentioned above, the cellulose-aluminum-adhering polyethylene thin film piece contains a large amount of water upon separation treatment with the paper portion, and has been hard to be recycled also when consumed energy required for recycling or the like is taken into consideration. However, according to the production method of the present invention, water is necessary in order to melt knead the thin film piece in the presence of water. Accordingly, the large amount of absorbed water in the thin film piece does not matter at all, and rather there is an advantage of capability of reducing a labor hour of adding the water thereto. Furthermore, the moisture can be effectively discharged therefrom as high temperature vapor in the melt-kneading. Therefore the moisture content of the composite material obtained can be sufficiently reduced to a desired level.

A batch type closed kneading device having a rotary blade can be used for the melt-kneading in the above-mentioned closed space, for example. As this batch type closed kneading device, for example, a batch type high-speed agitating device manufactured by M&F Technology Co., Ltd., as described in WO 2004/076044 and a batch type high-speed agitating device having a structure similar thereto can be used. This batch type closed kneading device is provided with a cylindrical agitation chamber, and a plurality of agitation blades are projected on an outer periphery of a rotary shaft arranged by passing through the agitation chamber. Moreover, for example, these batch type high-speed agitating devices are provided with a mechanism according to which water vapor is released while the pressure in the agitation chamber is retained.

It is considered that the temperature and the pressure inside the agitation chamber rapidly rise by application of high shear force by the rotating agitation blade to the cellulose-aluminum-adhering polyethylene thin film piece and the water, and the water that becomes the high temperature physically and chemically (hydrolysis) acts on the cellulose, and in combination with intensive shear force by the high-speed agitation, to defibrate the cellulose fiber thermally fused and embedded on the surface of the polyethylene thin film piece during lamination processing, and further the reaction of the hot water with aluminum as mentioned above occurs, and the cellulose fiber and the aluminum can be uniformly dispersed into the polyethylene resin.

As described above, the above-described batch type closed kneading device is provided with the cylindrical agitation chamber, and the plurality of agitation blades (for example, 4 to 8 blades) are projected on the outer periphery of the rotary shaft arranged by passing through the agitation chamber. The rotary shaft on which the agitation blades are arranged is connected to a motor being a drive source. Here, the temperature and the pressure are measured by a thermometer and a pressure gauge attached inside the agitation chamber, a melted state of the material is judged by using the temperature and the pressure measured from the thermometer and the pressure gauge, and the melt-kneading can be judged. Moreover, the melted state can also be judged by measuring rotating torque applied to the motor, and a state of the material is not judged from the temperature and the pressure. For example, an end time point of the melt-kneading can also be judged by measuring a change in the rotating torque of the rotary shaft to be measured from a torque meter. In the melt-kneading, the agitation blades are rotated with a high speed. A peripheral speed (rotating speed) of the agitation blade is preferably 10 msec or more, and further preferably 20 to 50 m/sec as a peripheral speed at a leading edge of the agitation blade (leading edge portion farthest from the rotary shaft).

The end time point of the melt-kneading using the batch type closed kneading device can be appropriately adjusted by taking the physical properties of the composite material obtained into consideration. Preferably, it is preferable to stop rotation of the rotary shaft of the batch type closed kneading device within 30 seconds from a time point at which the rotating torque of the rotary shaft rises and reaches a maximum value and then falls, and a torque change rate reaches 5% or less per one second. Thus, the melt flow rate (MFR: temperature=230° C.; load=5 kgf) of the composite material obtained is easily adjusted to 0.05 to 50.0 g/10 min, and the physical properties can be further improved. In the composite material having the melt flow rate within the above-described range, the cellulose fibers are uniformly dispersed in the resin, the composite material is preferable for extrusion molding or injection molding, and a formed body having high shape stability, high strength, and high impact resistance can be prepared.

The reason why the melt flow rate of the composite material can be adjusted by controlling the end time point of the melt-kneading is estimated, as a contributory factor, that a part of the molecules of the polyethylene resin and the cellulose fiber is decomposed into low-molecular weight components by action of the hot water and the water in the subcritical state produced during the melt-kneading.

In the present description, a term "torque change rate reaches 5% per one second" means that torque T1 at a predetermined time and torque T2 after one second from the predetermined time satisfies the following formula (T):

$$100 \times (T1-T2)/T1 \leq 5.$$

When the raw material containing the cellulose-aluminum-adhering polyethylene thin film piece and water are charged into the batch type closed kneading device or the kneader, the cellulose-aluminum-adhering polyethylene thin film piece may be pulverized or subjected to volume reduction treatment according to necessity and treated into the size and bulk density facilitating to perform self-weight fall charge or the like and handling. Here, "the volume reduction treatment" means treatment according to which the thin film piece is compressed to reduce a bulk volume, in which the moisture adhered to the thin film piece beyond necessity is also squeezed out by the compression on this occasion. The moisture adhered to the thin film piece beyond necessity can be squeezed out, and energy efficiency until the composite material is obtained can be further improved by applying the volume reduction treatment thereto.

As mentioned above, for example, the laminated paper is agitated in water (water or hot water) for a long time in the device called the pulper. Thus, the paper portion is stripped off from the laminated paper and the cellulose-aluminum-adhering polyethylene thin film piece is obtained. In this cellulose-aluminum-adhering polyethylene thin film piece, the moisture content ordinarily reaches around 50% by mass, and the thin film piece is in a state in which a large amount of water is absorbed. In such a cellulose-aluminum-adhering polyethylene thin film piece, the moisture is squeezed by the volume reduction treatment, and the moisture content reaches around 20% by mass, for example. Moreover, an apparent volume is preferably adjusted to ½ to ⅕ by this volume reduction treatment. The device used in the volume reduction treatment is not particularly limited, but an extrusion system volume reduction machine having two screws is preferable. The thin film piece can be continuously treated, and simultaneously a volume-reduced material which is easily handled in a subsequent step, and is properly small in individual sizes can be obtained by using the extrusion system volume reduction machine having two screws. For example, DUAL PRETISER (model: DP-3N, manufactured by Oguma Iron Works Co., Inc.) or the like can be used.

Moreover, the cellulose-aluminum-adhering polyethylene thin film piece in the state of absorbing water is pulverized, and this pulverized material can also be melt kneaded. Pulverizing treatment can be performed by using a pulverizer having a rotary blade, a pulverizer having a rotary blade and a fixed blade, and a pulverizer having a sliding blade, for example.

As the water to be used upon the melt-kneading, as described above, cellulose fiber-impregnated water adhered to the cellulose-aluminum-adhering polyethylene thin film piece, or water adhered to the surface of the thin film piece, or the like can be directly used. Therefore the water only needs to be added when necessary.

In addition, the amount of water necessary upon the melt-kneading is ordinarily 5 parts by mass or more and less than 150 parts by mass based on 100 parts by mass (dry mass) of the cellulose-aluminum-adhering polyethylene thin film piece. The composite material in which the cellulose fibers are uniformly dispersed in the resin, the moisture content is less than 1% by mass, and has excellent formability is easily produced by adjusting the water to this range of the amount of water. The amount of water upon the melt-kneading is further preferably 5 to 120 parts by mass, still further preferably 5 to 100 parts by mass, still further preferably 5 to 80 parts by mass, and still further preferably adjusted to 10 to 25 parts by mass, based on 100 parts by mass of the cellulose-aluminum-adhering polyethylene thin film piece.

According to the production method of the present invention, in performing the melt-kneading of the cellulose-aluminum-adhering polyethylene thin film piece in the presence of water, a cellulose material can be further mixed therein.

In this case, a blending amount of the cellulose material is preferably adjusted in such a manner that a proportion of the cellulose fiber becomes 1 part by mass or more and 70 parts by mass or less, further preferably 5 parts by mass or more and 70 parts by mass or less, still further preferably 5 parts by mass or more and less than 50 parts by mass, and particularly preferably 25 parts by mass or more and less than 50 parts by mass, in the total content of 100 parts by mass of the polyethylene resin and the cellulose fiber in the composite material obtained.

Examples of the cellulose material include a material mainly containing cellulose or a material containing cellulose, and more specifically, specific examples thereof include paper, waste paper, paper powder, regenerated pulp, paper sludge and broken paper of laminated paper. Above all, in view of cost and effective use of resources, waste paper and/or paper sludge is preferably used, and paper sludge is further preferably used. This paper sludge may contain an inorganic material in addition to the cellulose fiber. From a viewpoint of enhancing elastic modulus of the composite material, paper sludge containing an inorganic material is preferable. Moreover, when impact strength of the composite material is emphasized, as the paper sludge, a material without containing an inorganic material, or a material having a small content, even if the material contains the inorganic material, is preferable. When the paper such as the waste paper is mixed therein, the paper is preferably wetted with the water in advance before the melt-kneading. The composite material in which the cellulose fibers are uniformly dispersed in the resin is easily obtained by using the paper wetted with the water.

According to the production method of the present invention, the cellulose-aluminum-adhering polyethylene thin film piece obtained from the beverage/food pack formed of the polyethylene laminated paper having the paper, the polyethylene thin film layer and the aluminum thin film layer is melt kneaded in the presence of water. In this beverage pack or food pack, there is also a material using a resin layer other than the polyethylene resin in addition to the material using the polyethylene resin as the resin layer. Moreover, as for the beverage/food pack to be used as the raw material, a used material or an unused material can be used. When the used beverage pack or food pack is recovered and used, a resin component other than the polyethylene resin is mixed in the recovered material in several cases. In particular, mixing of polypropylene, polyethylene terephthalate, nylon, and the like may be exemplified. The composite material obtained by the production method of the present invention can contain such a resin other than the polyethylene resin. The composite material obtained by the production method of the present invention can contain polypropylene in an amount of 20 parts by mass or less based on the total content of 100 parts by mass of the polyethylene resin and the cellulose fiber, for example. Moreover, the composite material can contain polyethylene terephthalate and/or nylon in a total amount of 10 parts by mass or less based on the total content of 100 parts by mass of the polyethylene resin and the cellulose fiber, for example.

The beverage/food pack formed of the polyethylene laminated paper having the paper, the polyethylene thin film layer and the aluminum thin film layer, or the cellulose-aluminum-adhering polyethylene thin film piece obtained by providing these packs for treatment by using the pulper can be recycled, by performing the production method of the present invention, with a smaller amount of energy consumption and only by passing through a simple treatment step. That is, the beverage/food pack or the cellulose-aluminum-adhering polyethylene thin film piece as described above can be converted into the cellulose-aluminum-dispersing polyethylene resin composite material and can be recycled as the resin material of the resin product.

EXAMPLES

The present invention will be described in more detail based on examples given below, but the invention is not meant to be limited by these.

First, a measuring method and an evaluation method for each indicator in the present invention will be described.

[Melt Flow Rate (MFR)]

A melt flow rate was measured under conditions: temperature=230° C., and load=5 kgf in accordance with JIS K 7210. A unit of MFR is g/10 min.

[Shape of Rresulting Material (Cellulose-Aluminum-Dispersing Polyethylene Resin Composite Material)]

An appearance of a cellulose-aluminum-dispersing polyethylene composite material after kneading was evaluated through visual inspection. A material in a state of bulk was deemed as a conformance product (○); and a material in a powder shape having a particle size of 2 mm or less, or a material which was significantly ignited after kneading was deemed as a nonconformance product (×). The material in the powder shape causes bridging or adhesion to a vessel wall surface for the reason of easily absorbing moisture in air due to small bulk density, and is difficult in charging into a forming machine by self-weight fall upon subsequent forming In the present Example, all composite materials obtained by the production method of the present invention fall under the above-described conformance product.

[Moisture Content]

A moisture content is a weight loss (% by mass) upon performing a thermogravimetric analysis (TGA) from 23° C. to 120° C. at a heating rate of +10° C./min under a nitrogen atmosphere within 6 hours after production.

[Power Consumption]

When a cellulose-aluminum-dispersing polyethylene resin composite material was continuously prepared from a cellulose-aluminum-adhering polyethylene thin film piece which absorbed water, a total of electric energy consumed by each device (a dryer, a volume reduction machine or a kneader) until 1 kg of the composite material was produced was determined.

[Impact Resistance]

A test piece (thickness: 4 mm, width: 10 mm, and length: 80 mm) was prepared by injection molding, and Izod impact strength was measured using a notched test piece in accordance with JIS K 7110. A unit of the impact resistance is kJ/m$^2$.

[Flexural Strength]

A test piece (thickness: 4 mm, width: 10 mm, and length: 80 mm) was prepared by injection molding, a load was applied to the test piece with a span of 64 mm, a curvature radius of 5 mm at a supporting point and an action point, and a test speed of 2 mm/min, and flexural strength was calculated in accordance with JIS K 7171. A unit of the flexural strength is MPa.

[Cellulose Effective Mass Ratio]

A sample (10 mg) formed in a dry state by drying the sample at 80° C. for 1 hour in advance in an ambient atmosphere was used, and based on the results obtained by performing a thermogravimetric analysis (TGA) from 23° C. to 400° C. at a heating rate of +10° C./min under a nitrogen atmosphere, a cellulose effective mass ratio was determined according to the following formula [Formula B]. Measurement was performed 5 times and an average value thereof was determined, and the average value was taken as the cellulose effective mass ratio.

(Cellulose effective mass ratio [%])=(weight loss [mg] from 270° C. to 390° C.)×100/(sample weight [mg])   [Formula B]

[Water Absorption Ratio]

A composite material which was dried by a hot air dryer at 80° C. in advance until a moisture content was reduced to 0.5% by mass or less was shaped into a sheet form having a dimension of 100 mm×100 mm×1 mm by a press to obtain a formed body, and this formed body was immersed into water of 23° C. for 20 days, and based on measured values before and after the immersion, water absorption ratio was determined according to the following [Formula A] (in which, upon measuring mass after the immersion, water drops adhered on the surface was wiped off with dry cloth or filter paper.). With regard to conformance or nonconformance, a case where calculated water absorption ratio satisfies the following evaluation formula [Formula BC] was deemed as conformance (○), and a case where the calculated water absorption ratio does not satisfy the formula was deemed as nonconformance (x).

(Water absorption ratio [%])=(mass after immersion [g]−mass before immersion [g])×100/(mass before immersion [g])  [Formula A]:

(water absorption ratio [%])<(cellulose effective mass ratio [%])$^2$×0.01.  [Formula C]:

[Impact Resistance Retention After Water Absorption]

A test piece (thickness: 4 mm, width: 10 mm, and length: 80 mm, notched) was prepared by injection molding, and this test piece was immersed into water of 23° C. for 20 days, and based on measured values of impact resistance before and after immersion as measured in accordance with JIS K 7110, impact resistance retention after water absorption was calculated according to the following formula (in which, upon measuring the impact resistance after immersion, measurement was performed without drying the test piece intentionally, within 6 hours after removing the test piece from water.).

(Impact resistance retention [%] after water absorption)=(Impact resistance [kJ/m$^2$] after water absorption)×100/(Impact resistance [kJ/m$^2$] before water absorption)

[Cellulose Fiber Dispersibility]

A composite material which was dried by a hot air dryer at 80° C. in advance until a moisture content was reduced to 0.5% by mass or less was shaped into a sheet form having a dimension of 100 mm×100 mm×1 mm by a press to obtain a formed body. This formed body was immersed into water at 80° C. for 20 days, and then a square having a size of 40 mm×40 mm was drawn in an arbitrary place on a surface of the formed body, removed from warm water, and further 9 line segments having a length of 40 mm were drawn inside the square at an interval of 40 mm. Roughness on an intermediate line between adjacent two line segments was measured under conditions of cut-off value λc=8.0 mm and λs=25.0 μm by using a surface roughness measuring instrument to obtain 10 lines of roughness curves (specified by JIS B 0601; evaluation length: 40 mm). When the number of mountains having a peak top of 30 μm or more and being convex upward (from the surface toward an outside) is counted in all of 10 lines of the roughness curves, a case where the number of mountains is 20 or more in total was deemed as a nonconformance product (x), and a case where the number of mountains is less than 20 was deemed as a conformance product (○).

When the cellulose fibers are unevenly distributed in the sample, water absorption is locally caused, and the surface in the portion swells. Therefore cellulose fiber dispersibility can be evaluated by this method.

[Molecular Weight Pattern]

To 16 mg of composite material, 5 mL of a solvent (1,2,4-trichlorobenzene) for GPC measurement was added, and the resulting mixture was stirred at 160° C. to 170° C. for 30 minutes. An insoluble matter was removed by filtration with a metal filter having a pore of 0.5 μm, and GPC was measured on the thus obtained sample (soluble matter) after filtration by using a GPC system (PL220, manufactured by Polymer Laboratories, Inc., model: HT-GPC-2), using, as columns, Shodex HT-G (one) and HT-806M (two), setting a column temperature to 145° C., using 1,2,4-trichlorobenzene as an eluant, at a flow rate of 1.0 mL/min, and injecting 0.2 mL of the sample thereinto. Thus, a molecular weight pattern was obtained by using monodisperse polystyrene (manufactured by Tosoh Corporation), and dibenzyl (manufactured by Tokyo Chemical Industry Co., Ltd.) as standard samples to prepare a calibration curve, and performing data processing by a GPC data processing system (manufactured by TRC). In the molecular weight pattern, a pattern satisfying the following (A) was deemed as a conformance pattern (○), and a pattern not satisfying the following (A) was deemed as a nonconformance pattern (x).

1.7>half-width(Log($MH/ML$))>1.0  (A)

Here, the half-width of the molecular weight pattern shows spread of a spectrum (degree of a molecular weight distribution) around a peak top (maximum frequency) of a maximum peak of the molecular weight patterns in GPC. That is, a width of a GPC spectral line in a place (a molecular weight on a high molecular weight side and a molecular weight on a low-molecular weight side are referred to as MH and ML, respectively) in which intensity in the spectrum becomes a half of the peak top (maximum frequency) is taken as the half-width (see FIG. 1).

In addition, in the present Example, in all of the polyethylene resins forming the composite material of the present invention, the molecular weight at which the maximum peak value is exhibited is in the range of 10,000 to 1,000,000, and the weight average molecular weight Mw is in the range of 100,000 to 300,000.

[Test of Burning Behavior by Oxygen Index (OI Value)]

Measurement was performed with regard to a test of burning behavior by an oxygen index (OI value) in accordance with JIS K 7201-2. In addition, the oxygen index means a minimum oxygen concentration (% by volume) which is necessary for the material to continue burning.

[Particle Size Distribution of Aluminum (Judgment of Aluminum Length)]

A composite material was pressed to obtain a 1 mm-thick sheet-form formed body. A proportion (%) of the number of aluminum having an X-Y maximum length of 1 mm or more in the number of aluminum having an X-Y maximum length of 0.005 mm or more was determined by photographing an enlarged photograph of a surface of this formed body by using a microscope, and determining, on aluminum existing in the range of 5.1 mm×4.2 mm, a distribution of X-Y maximum length thereof by using image analysis software. A case where the proportion of aluminum having the X-Y maximum length of 1 mm or more therein is less than 1% is deemed as (○), and a case other than (○) is deemed as (Δ). Among the cases of (Δ), a case where aluminum having an X-Y maximum length of 5 mm or more is deemed as (x). As the image analysis software, "Simple image dimension measuring software Pixs2000_Pro" (manufactured by INNOTECH CORPORATION) was used. In addition, an average of the X-Y maximum length was within the range of 0.02 mm to 0.2 mm for all with regard to the materials in which judgment of the aluminum length was deemed as (○).

[Thermal Conductivity]

Thermal conductivity was measured on a 3 mm-thick processed sheet of a composite material by using a thermal conductivity meter ("QTM-500", manufactured by Kyoto Electronics Manufacturing Co., Ltd.).

[Tensile Strength]

A test piece was prepared by injection molding, and tensile strength was measured on a No. 2 test piece in accordance with JIS K 7113. A unit is MPa.

[Cellulose Fiber Length]

Then, 0.1 to 1 g was cut from a formed sheet of the composite material and taken as a sample, and this sample was wrapped with a 400-mesh stainless steel mesh, and immersed into 100 mL of xylene at 138° C. for 24 hours. Next, the sample was pulled up therefrom, and then the sample was dried in vacuum at 80° C. for 24 hours. Then, 0.1 g of the dry sample was well dispersed into 50 mL of ethanol, was added dropwise to a petri dish, and a part in the range of 15 mm×12 mm was observed with a microscope. A material in which a cellulose fiber having a fiber length of 1 mm or more was observed was deemed as (○), and a material other than (○) was deemed as (x).

[Flexural Mdulus]

Flexural modulus was measured on a 4 mm-thick sample at a flexural rate of 2 mm/min in accordance with JIS K 7171. More specifically, a test piece (thickness: 4 mm, width: 10 mm, and length: 80 mm) was prepared by injection molding, a load was applied to the test piece with a span of 64 mm, a curvature radius of 5 mm at a supporting point and an action point, and a test speed of 2 mm/min, and a flexural test was conducted in accordance with JIS K 7171, and flexural modulus was determined.

Here, the flexural modulus Et can be determined by determining flexural stress $\sigma f1$ measured at a deflection amount in strain 0.0005 ($\varepsilon f1$) and flexural stress $\sigma f2$ measured at a deflection amount in strain 0.0025 ($\varepsilon f2$), and dividing a difference therebetween by a difference between respective amounts of strain corresponding thereto, namely, according to the following formula: $Ef=(\sigma f2-\sigma f1)/(\varepsilon f2-\varepsilon f1)$.

In this case, the deflection amount S for determining the flexural stress can be determined according to the following formula: $S=(\varepsilon \times L^2)/(6 \times h)$, where, S is deflection,
E is flexural strain,
L is span, and
H is thickness.

[Linear Expansion Coefficient]

A linear expansion coefficient was determined in accordance with JIS K 7197.

A formed body having a thickness of 4 mm, a width of 10 mm and a length of 80 mm was obtained by injection molding. An injection direction of the resin at this time was a longitudinal direction. From this formed body, a quadratic prism-shaped test piece having a depth of 4 mm, a width of 4 mm and a height of 10 mm was cut out in such a manner that the longitudinal direction corresponds to a height direction.

TMA measurement was performed by using the test piece obtained, by using TMA 8310 manufactured by Rigaku Corporation, in the temperature range of −50 to 100° C., at a load of 5 g (49 mN); and in a nitrogen atmosphere. A heating rate at this time was 5° C./min. In addition, a temperature of the test piece was once raised to 100° C. being an upper limit temperature of the test range this time before obtaining data to relax strain caused by forming. From a TMA curve obtained, average linear expansion coefficients in the temperature ranges of 20 to 30° C. and −40 to 100° C. were determined.

Test Example 1

A cellulose-aluminum-adhering polyethylene thin film piece was obtained by stripping off and removing, by using a pulper, a paper portion from a beverage container formed of polyethylene laminated paper having paper, a polyethylene thin film layer and an aluminum thin film layer. This thin film piece was cut into small pieces having various shapes and sizes of about several cm$^2$ to 100 cm$^2$, and was in a wet state (state in which a large amount of water was absorbed) by being immersed into water in a step of stripping off the paper portion. Moreover, a mass ratio (after drying) of a polyethylene resin forming this thin film piece, a cellulose fiber adhered thereto, and aluminum was: [polyethylene resin]:[cellulose fiber]:[aluminum]=90:10:9. Moreover, a proportion of low density polyethylene in the polyethylene resin was 99.5% by weight.

This cellulose-aluminum-adhering polyethylene thin film piece was dried by a dryer set at 80° C. for 48 hours to reduce a moisture content to 1% by mass or less, and then water was intentionally added thereto to prepare four kinds of sample materials so as satisfy parts by mass of water as described in each column of Examples 1 to 3 and Comparative Example 1 shown in Table 1.

In addition, pH of water to be blended thereto in Examples as a whole in the present description was neutral (pH: 7) for all. Moreover, in a state in which water was mixed with the dried cellulose-aluminum-adhering polyethylene thin film piece, water exhibited alkalinity (pH: 7.5 to 8.5).

Next, these four kinds of sample materials were separately charged into a batch type closed kneading device (manufactured by M&F Technology Co., Ltd., MF type mixing and melting device, model: MF5008 R), and agitated with a high speed by adjusting a peripheral speed at a leading edge of an agitation blade of the mixing and melting device to 40 m/sec to turn water into a subcritical state, and simultaneously were kneaded to prepare four kinds of cellulose-aluminum-dispersing polyethylene resin composite materials.

In addition, unless otherwise specified, with regard to a kneading end time point by using the batch type closed kneading device in each Test Example, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the Table below) was adjusted to 5 seconds. Moreover, the peripheral speed at the leading edge of the agitation blade of the mixing and melting device was adjusted to 40 m/sec in a manner similar to the above description.

The results of evaluation of each composite material are as shown in Table 1.

TABLE 1

| | Ex 1 | Ex 2 | Ex 3 | CEx 1 |
|---|---|---|---|---|
| Cellulose fiber (parts by mass) | 10 | 10 | 10 | 10 |
| Polyethylene (parts by mass) | 90 | 90 | 90 | 90 |
| Aluminum (parts by mass) | 9 | 9 | 9 | 9 |
| Water (parts by mass) | 8 | 20 | 100 | 0 |

TABLE 1-continued

|  | Ex 1 | Ex 2 | Ex 3 | CEx 1 |
| --- | --- | --- | --- | --- |
| Time A (second) | 5 | 5 | 5 | 5 |
| MFR (g/10 min) | 33.4 | 32.9 | 32.8 | — |
| Shape of resulting material | ○ | ○ | ○ | x |
| Moisture content (%) | 0.1 | 0.2 | 0.2 | — |
| Power consumption (kWh/kg) | 0.2 | 0.4 | 1.0 | — |
| Impact resistance (kJ/m$^2$) | 10.9 | 10.6 | 11.1 | — |
| Flexural strength (MPa) | 13.4 | 13.8 | 13.3 | — |
| Water absorption ratio (%) | 0.3 | 0.3 | 0.3 | — |
| Judgement of aluminum length | ○ | ○ | ○ | — |
| Conformance or nonconformance of water absorption | ○ | ○ | ○ | — |
| Impact resistance retention (%) after water absorption | 105 | 105 | 105 | — |
| Cellulose fiber dispersibility | ○ | ○ | ○ | — |
| Molecular weight pattern | ○ | ○ | ○ | — |

Note:
"Ex" means Example, and "C Ex" means Comparative Example.

Comparative Example 1 in Table 1 shows that, when the melt-kneading of the cellulose-aluminum-adhering polyethylene thin film piece is performed under a water-free environment, the composite material (or the bulk) in which cellulose and aluminum are uniformly dispersed into the polyethylene resin is unable to be obtained.

On the other hand, Example 1 shows that, even when a mass ratio of water/cellulose-aluminum-adhering polyethylene thin film piece is adjusted to 8/109 to reduce an amount of blending water, as long as water coexists during the melt-kneading, the cellulose-aluminum-dispersing polyethylene resin composite material having suppressed water absorption ratio and also excellent mechanical strength can be obtained. Moreover, Example 3 shows that, even if a mass ratio of water/cellulose-aluminum-adhering polyethylene thin film piece is adjusted to 100/109 to increase an amount of blending water, a moisture content of the cellulose-aluminum-dispersing polyethylene resin composite material can be sufficiently reduced, and the cellulose-aluminum-dispersing polyethylene resin composite material having low water absorbing properties and excellent mechanical strength in addition thereto can be obtained. Accordingly, the production method of the present invention in which the melt-kneading is performed in the presence of water shows that presence of water during the melt-kneading is important, and the amount of water may be large or small. In addition, if energy efficiency is taken into consideration, the amount of water is recommended to be not excessively large.

Test Example 2

A test was conducted on an influence of a time during which a cellulose-aluminum-adhering polyethylene thin film piece is kneaded by using a batch type closed kneading device.

A cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. Moreover, a mass ratio (after drying) of a polyethylene resin forming this thin film piece, a cellulose fiber adhered thereto and aluminum was: [polyethylene resin]:[cellulose fiber]:[aluminum]=90:10:9. In this thin film piece in the wet state, an amount of water adhered thereto based on a total of 100 parts by mass of the polyethylene resin, the cellulose fiber and aluminum was 21.8 parts by mass. That is, the amount of water adhered thereto based on the total of 100 parts by mass of the polyethylene resin and the cellulose fiber was 20 parts by mass.

Next, this cellulose-aluminum-adhering polyethylene thin film piece was charged into the batch type closed kneading device same with the device in the Test Example 1 with keeping the wet state, and agitated with a high speed to turn water into a subcritical state, and simultaneously melt kneaded to prepare four kinds of cellulose-aluminum-dispersing polyethylene resin composite materials in which kneading time periods were changed.

Specifically, the composite material was prepared in such a manner that, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and as an elapsed time from this starting point until the device is stopped (corresponding to "Time A" in Table 2), "Time A" shown in Table 2 is satisfied.

The results of evaluation of each sample are as shown in Table 2.

TABLE 2

|  | Ex 4 | Ex 5 | Ex 6 | Ex 7 |
| --- | --- | --- | --- | --- |
| Cellulose fiber (parts by mass) | 10 | 10 | 10 | 10 |
| Polyethylene (parts by mass) | 90 | 90 | 90 | 90 |
| Aluminum (parts by mass) | 9 | 9 | 9 | 9 |
| Water (parts by mass) | 20 | 20 | 20 | 20 |
| Time A (second) | 0 | 7 | 30 | 70 |
| MFR (g/10 min) | 31.5 | 34.0 | 36.7 | 52.4 |
| Shape of resulting material | ○ | ○ | ○ | ○ |
| Moisture content (%) | 0.4 | 0.2 | 0.1 | 0.1 |
| Power consumption (kWh/kg) | 0.4 | 0.4 | 0.4 | 0.4 |
| Impact resistance (kJ/m$^2$) | 10.4 | 11.5 | 11.0 | 7.7 |
| Flexural strength (MPa) | 13.8 | 13.3 | 11.9 | 10.3 |
| Judgement of aluminum length | ○ | ○ | ○ | ○ |
| Water absorption ratio (%) | 0.3 | 0.3 | 0.3 | 0.2 |
| Conformance or nonconformance of water absorption | ○ | ○ | ○ | ○ |
| Impact resistance retention (%) after water absorption | 105 | 105 | 105 | 104 |
| Cellulose fiber dispersibility | ○ | ○ | ○ | ○ |
| Molecular weight pattern | ○ | ○ | ○ | ○ |

Note:
"Ex" means Example.

Table 2 shows that MFR of the composite material to be obtained can be changed by adjusting "Time A" and the composite material having different physical properties can be obtained. However, in Example 7, MFR was particularly high and over 40 because "Time A" was long, and the composite material resulted in somewhat poor impact resistance strength, but still had sufficient impact resistance.

FIG. 1 shows a half-width of a molecular weight pattern in Example 5. In FIG. 1, a horizontal axis represents a logarithm value (log M) of a molecular weight, and a vertical axis represents a weight fraction per unit log M: (dW/d log M) (in which M is a molecular weight, and W is weight. From the results in FIG. 1, in the molecular weight pattern in Example 5, the half-width is 1.48, which satisfies the provision of the present invention. Thus, it is considered that compatibility between the polyethylene resin and the cellulose fiber is improved, causing reduction of fine voids in an interface between the polyethylene resin and the cellulose fiber to improve vulnerability of the interface, and to suppress reduction of impact resistance and an increase of water absorption ratio.

Test Example 3

A test was conducted on an influence when a mass ratio of aluminum in a cellulose-aluminum-adhering polyethylene thin film was changed.

Four kinds of cellulose-aluminum-adhering polyethylene thin film pieces were obtained in which a mass ratio of aluminum was changed as shown in Table 3. This thin film piece was cut into small pieces of about several $cm^2$ to 100 $cm^2$, and was in a wet state in the same way as in the Test Example 1. Moreover, a mass ratio (after drying) of a polyethylene resin forming this thin film piece to a cellulose fiber adhered thereto was as shown in Table 3. In this thin film piece in the wet state, an amount of water adhered thereto based on a total of 100 parts by mass of the polyethylene resin, the cellulose fiber and aluminum was 21.8 parts by mass. That is, an amount of water adhered thereto based on the total of 100 parts by mass of the polyethylene resin and the cellulose fiber was 20 parts by mass.

Next, this cellulose-aluminum-adhering polyethylene thin film piece was charged into the batch type closed kneading device same with the device in the Test Example 1 with keeping the wet state, and agitated with a high speed to turn water into a subcritical state, and simultaneously melt kneaded to prepare four kinds of cellulose-aluminum-dispersing polyethylene resin composite materials in which kneading time periods were changed.

In addition, in each example, with regard to a kneading end time point using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following table) was adjusted to 7 seconds.

The results of evaluation of each sample are as shown in Table 3.

TABLE 3

| | Ex 8 | Ex 9 | Ex 10 | Ex 11 |
|---|---|---|---|---|
| Cellulose fiber (parts by mass) | 10 | 10 | 10 | 25 |
| Polyethylene (parts by mass) | 90 | 90 | 90 | 75 |
| Aluminum (parts by mass) | 5 | 9 | 25 | 12 |
| Water (parts by mass) | 20 | 20 | 20 | 20 |
| Time A (second) | 7 | 7 | 7 | 7 |
| MFR (g/10 min) | 38.2 | 34.0 | 29.8 | 5.1 |
| Shape of resulting material | ○ | ○ | ○ | ○ |
| Moisture content (%) | 0.2 | 0.2 | 0.2 | 0.2 |
| Power consumption (kWh/kg) | 0.4 | 0.4 | 0.4 | 0.4 |
| Impact resistance (kJ/$m^2$) | 11.9 | 11.5 | 9.2 | 6.1 |
| Flexural strength (MPa) | 12.4 | 13.3 | 14.1 | 19.2 |
| Thermal conductivity (W/m · K) | 0.22 | 0.34 | 0.73 | 0.39 |
| Judgement of aluminum length | ○ | ○ | ○ | ○ |
| Water absorption ratio (%) | 0.3 | 0.3 | 0.3 | 2.3 |
| Conformance or nonconformance of water absorption | ○ | ○ | ○ | ○ |
| Impact resistance retention (%) after water absorption | 105 | 105 | 105 | 105 |
| Cellulose fiber dispersibility | ○ | ○ | ○ | ○ |
| Molecular weight pattern | ○ | ○ | ○ | ○ |

Note:
"Ex" means Example.

Table 3 shows that, even if an amount of aluminum changes, the cellulose-aluminum-dispersing polyethylene resin composite material having desired physical properties can be obtained. Moreover, Example 8 shows that, even if a content of aluminum is 5 parts by mass based on a total of 100 parts by mass of the polyethylene resin and the cellulose, the sample has high thermal conductivity of 0.2 W/m·K or more.

Example 4

A test was conducted on an influence when a mass ratio of a cellulose fiber adhered to a cellulose-aluminum-adhering polyethylene thin film piece to a polyethylene resin in the thin film piece was changed.

Five kinds of cellulose-aluminum-adhering polyethylene thin film pieces were obtained in which a mass ratio of a cellulose fiber to a polyethylene resin was changed as shown in Table 4. These thin film pieces were cut into small pieces of about several $cm^2$ to 100 $cm^2$ and in a wet state for all in the same manner as in the Test Example 1. This cellulose-aluminum-adhering polyethylene thin film piece was dried by a dryer set at 80° C. for 48 hours to reduce a moisture content to 1% by mass or less, and then water was intentionally added thereto. Water was adjusted to be 22 parts by mass based on a total of 100 parts by mass of the cellulose fiber and the polyethylene for Examples 12 to 14, and water was adjusted to be 44 parts by mass based on a total of 100 parts by mass of the cellulose fiber and the polyethylene resin for Example 15 and Comparative Example 2.

Next, this cellulose-aluminum-adhering polyethylene thin film piece was charged into the batch type closed kneading device same with the device in the Test Example 1 with keeping the wet state, and agitated with a high speed to turn water into a subcritical state, and simultaneously melt kneaded to try to prepare five kinds of cellulose-aluminum-dispersing polyethylene resin composite materials.

The results of evaluation of each composite material are as shown in Table 4. In addition, in each example, with regard to a kneading end time point by using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following table) was adjusted to 5 seconds.

TABLE 4

| | Ex 12 | Ex 13 | Ex 14 | Ex 15 | CEx 2 |
|---|---|---|---|---|---|
| Cellulose fiber (parts by mass) | 5 | 13 | 20 | 40 | 80 |
| Polyethylene (parts by mass) | 95 | 87 | 80 | 60 | 20 |
| Aluminum (parts by mass) | 9 | 9 | 9 | 9 | 9 |

TABLE 4-continued

|  | Ex 12 | Ex 13 | Ex 14 | Ex 15 | CEx 2 |
|---|---|---|---|---|---|
| Water (parts by mass) | 22 | 22 | 22 | 44 | 44 |
| Time A (second) | 5 | 5 | 5 | 5 | 5 |
| MFR | 35.0 | 20.4 | 5.6 | 1.8 | — |
| Shape of resulting material | ○ | ○ | ○ | ○ | x |
| Moisture content (%) | 0.2 | 0.2 | 0.3 | 0.2 | — |
| Power consumption (kWh/kg) | 0.4 | 0.4 | 0.4 | 0.4 | — |
| Impact resistance (kJ/m$^2$) | 13.6 | 12.2 | 7.0 | 4.7 | — |
| Flexural strength (MPa) | 10.9 | 16.1 | 18.9 | 27.8 | — |
| Judgement of aluminum length | ○ | ○ | ○ | ○ | — |
| Water absorption ratio (%) | 0.1 | 0.3 | 2.0 | 4.5 | — |
| Conformance or nonconformance of water absorption | ○ | ○ | ○ | ○ | — |
| Impact resistance retention (%) after water absorption | 103 | 105 | 107 | 109 | — |
| Cellulose fiber dispersibility | ○ | ○ | ○ | ○ | — |
| Molecular weight pattern | ○ | ○ | ○ | ○ | — |

Note:
"Ex" means Example, and
"C Ex" means Comparative Example.

From Comparative Example 2 in Table 4, if an amount of the cellulose fiber based on a total amount of the cellulose fiber and the polyethylene resin was excessively high, formability is deteriorated and the composite material having an objective shape was unable to be obtained. (In addition, in Comparative Example 2, a material obtained by cutting polyethylene laminated paper from which a paper portion was not removed at all to allow water to absorb therein was used as a sample material.).

Test Example 5

A composite material was prepared by kneading a cellulose-aluminum-adhering polyethylene thin film piece, and a relationship between physical properties of the composite material obtained and a molecular weight of a polyethylene resin was examined.

A cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. Moreover, a mass ratio (after drying) of a polyethylene resin forming this thin film piece to a cellulose fiber adhered thereto was as described in Table 5. In this thin film piece in the wet state, an amount of water adhered thereto based on a total of 100 parts by mass of the polyethylene resin and the cellulose fiber was 100 parts by mass.

Next, this cellulose-aluminum-adhering polyethylene thin film piece was charged into the batch type closed kneading device same with the device in the Test Example 1 with keeping the wet state, and agitated with a high speed to turn water into a subcritical state, and simultaneously melt kneaded to prepare four kinds of cellulose-aluminum-dispersing polyethylene resin composite materials.

In addition, in each example, with regard to a kneading end time point using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following Table 5) was adjusted to a time after 7 seconds for Examples 16 and 17, to a time after 15 seconds for Example 18, and to a time after 60 seconds for Experiment Example 1. The results of evaluation of each sample are as shown in Table 5.

TABLE 5

|  | Ex 16 | Ex 17 | Ex 18 | Ex 1 |
|---|---|---|---|---|
| Cellulose fiber (parts by mass) | 15 | 31 | 35 | 47 |
| Polyethylene (parts by mass) | 85 | 69 | 65 | 53 |
| Aluminum (parts by mass) | 4 | 5 | 5 | 11 |
| Water (parts by mass) | 100 | 100 | 100 | 100 |
| Time A (second) | 7 | 7 | 15 | 60 |
| MFR | 3.2 | 5.5 | 9.0 | 20.9 |
| Shape of resulting material | ○ | ○ | ○ | ○ |
| Moisture content (%) | 0.1 | 0.2 | 0.2 | 0.2 |
| Power consumption (kWh/kg) | 1.0 | 1.0 | 1.0 | 1.0 |
| Impact resistance (kJ/m$^2$) | 9.1 | 5.2 | 5.0 | 2.6 |
| Flexural strength (MPa) | 19.0 | 21.9 | 31.3 | 26.4 |
| Tensile strength (MPa) | 20.1 | 27.1 | 25.2 | 19.2 |
| Judgement of aluminum length | ○ | ○ | ○ | ○ |
| Conformance or nonconformance of water absorption | ○ | ○ | ○ | ○ |
| Impact resistance retention (%) after water absorption | 106 | 108 | 109 | 100 |
| Cellulose fiber dispersibility | ○ | ○ | ○ | ○ |
| Molecular weight pattern | ○ | ○ | ○ | x |
| Half-width of molecular weight pattern | 1.2 | 1.4 | 1.4 | 2.0 |
| Average molecular weight | 240,000 | 210,000 | 190,000 | 56,000 |
| Peak position of molecular weight pattern | 79,000 | 73,000 | 56,000 | 13,000 |

Note:
"Ex" means Example.

The composite materials having excellent water absorbing properties were able to be obtained in all Examples.

In addition, in the molecular weight pattern in Experiment Example 1, the half-width is as slightly large as 2.0. A material in Experiment Example 1 resulted in low impact characteristics. It is considered that a broad half-width of the molecular weight pattern and a large amount of low-molecular weight components lead to reduction of the impact characteristics.

Test Example 6

A test was conducted on an influence of a method (device) for kneading a cellulose-aluminum-adhering polyethylene thin film piece.

A cellulose-aluminum-adhering polyethylene thin film piece was obtained in the same manner as in the Test Example 1. This thin film piece was cut into small pieces of about several cm² to 100 cm², and was in a wet state in the same way as in the Test Example 1. Moreover, a mass ratio (after drying) of a polyethylene resin forming this thin film piece to a cellulose fiber adhered thereto was as described in Tables 6 to 7. In this thin film piece in the wet state, an amount of water adhered thereto based on a total of 100 parts by mass of the polyethylene resin and the cellulose fiber was 100 parts by mass.

The evaluations shown in the Table were performed by using a material when this cellulose-aluminum-adhering polyethylene thin film piece in the wet state was melt kneaded in the presence of water in the subcritical state by using the batch type closed kneading device (Example 19), a material when the cellulose-aluminum-adhering polyethylene thin film piece in the wet state was dried, and then kneaded using the kneader (Comparative Example 3), and a material obtained by directly mold-molding the above-described thin film piece in the wet state (Comparative Example 4).

In addition, with regard to a kneading end time point using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following table) was adjusted to 7 seconds.

The results of evaluation of each composite material are as shown in Table 6.

Example 19 in Table 6 shows that the cellulose-aluminum-dispersing polyethylene resin composite material obtained by melt-kneading the thin film piece in the presence of water in the subcritical state is excellent in a moisture content, impact resistance, water absorption ratio and cellulose fiber dispersibility as in Example 1. Moreover, in Example 19, the molecular weight pattern of the polyethylene resin resulted in (○); and it is considered that this molecular weight pattern also contributes to improvement in compatibility between the polyethylene resin and the cellulose fiber, causing reduction of fine voids in an interface between the polyethylene resin and the cellulose fiber to improve vulnerability of the interface, and to suppress reduction of the impact resistance and an increase of water absorption ratio.

On the other hand, when the thin film piece subjected to drying treatment is kneaded using the kneader (Comparative Example 3), the drying treatment is required. Therefore total electricity consumption is large for obtaining the composite material. Moreover, the water absorption ratio of the composite material obtained was high and the cellulose fiber dispersibility also was poor.

In a material obtained by directly mold-molding the thin film piece in the wet state (Comparative Example 4), the moisture content was unable to be sufficiently removed. Moreover, the composite material obtained was high in water absorption ratio and was poor also in the cellulose fiber dispersibility.

Further, a commercially available recycled resin (PE-rich product, manufactured by Green Loop, Inc., Comparative Example 5) which was recovered and recycled in accordance with the Containers and Packaging Recycling Law was used, and as shown in Table 6, the recycled resin was formed using a twin screw extruder, and the resulting material was evaluated. It is found that the cellulose-aluminum-dispersing polyethylene resin composite material produced by the production method of the present invention has improved impact resistance after water absorption in comparison with the commercial available recycled resin.

TABLE 6

|  | Ex 19 | CEx 3 | CEx 4 | CEx 5 |
|---|---|---|---|---|
| Cellulose fiber (parts by mass) | 35 | 35 | 35 | 0 |
| Polyethylene (parts by mass) | 65 | 65 | 65 | 100 |
| Aluminum (parts by mass) | 5 | 5 | 5 | 5 |
| Volume reduction treatment | Nothing | Nothing | Nothing | Nothing |
| Drying treatment | Nothing | Conducted | Nothing | Conducted |
| Kneading method | Batch type closed high-speed kneading device | Kneader (no water) | Mold-molding | Twin screw extruder |
| MFR | 9.0 | 3.2 | 2.8 | 8.8 |
| Shape of resulting material | ○ | ○ | ○ | ○ |
| Moisture content (%) | 0.2 | 0.2 | 2 | 0.2 |
| Power consumption (kWh/kg) | 1.0 | 2.5< | 0.3 | — |
| Impact resistance (kJ/m²) | 5.0 | 3.5 | 4.1 | 8.7 |
| Flexural strength (MPa) | 31.3 | 30.9 | 30.3 | 17.2 |
| Water absorption ratio (%) | 3.5 | 12.1 | 12.8 | 1.1 |
| Judgement of aluminum length | ○ | Δ | Δ | — |
| Conformance or nonconformance of water absorption | ○ | x | x | x |
| Impact resistance retention (%) after water absorption | 109 | 110 | 105 | 101 |
| Cellulose fiber dispersibility | ○ | x | x | x |
| Molecular weight pattern | ○ | ○ | ○ | — |

Note:
"Ex" means Example, and
"C Ex" means Comparative Example.

[Test Sample 7]

A test was conducted on an influence of performing volume reduction and solidification before kneading a cellulose-aluminum-adhering polyethylene thin film piece.

A cellulose-aluminum-adhering polyethylene thin film piece was obtained in the same manner as in the Test Example 1 described above. This thin film piece was cut into small pieces of about several cm² to 100 cm², and was in a wet state in the same way as in the Test Example 1. Moreover, a mass ratio (after drying) of a polyethylene resin forming this thin film piece, a cellulose fiber adhered to a polyethylene resin and aluminum was: [polyethylene resin]:[cellulose fiber]:[aluminum]=65:35:5. In this thin film piece in the wet state, an amount of water adhered thereto based on a total of 100 parts by mass of the polyethylene resin and the cellulose fiber was 50 parts by mass.

Next, as shown in Table 7, this thin film piece was melt kneaded in the presence of water in a subcritical state by using the batch type closed kneading device to prepare a cellulose-aluminum-dispersing polyethylene resin composite material (Example 20).

Moreover, separately therefrom, the cellulose-aluminum-adhering thin film piece was volume-reduced and solidified using a volume-reduction and solidifying device (manufactured by Oguma Iron Works Co., Inc., DUAL PRETISER, model: DP-3N) before charging the cellulose-aluminum-adhering thin film piece into the batch type closed kneading device, and then charging the thin film piece into the batch type closed kneading device to prepare a cellulose-aluminum-dispersing polyethylene resin composite material (Example 21).

Moreover, separately therefrom, the cellulose-aluminum-adhering polyethylene thin film piece was dried by a dryer set at 80° C. for 48 hours to reduce a moisture content to be less than 1% by mass before charging the thin film piece into a twin screw extruder, and then was charged into the twin screw extruder (manufactured by Japan Steel Works, Ltd., use of TEX30,) to prepare a cellulose-aluminum-dispersing polyethylene resin composite material (Comparative Example 6).

The results of evaluation of each sample are as shown in Table 7.

TABLE 7

|  | Ex 20 | Ex 21 | CEx 6 |
|---|---|---|---|
| Cellulose fiber (parts by mass) | 35 | 35 | 35 |
| Polyethylene (parts by mass) | 65 | 65 | 65 |
| Aluminum (parts by mass) | 5 | 5 | 5 |
| Volume reduction treatment | Nothing | Conducted | Nothing |
| Drying treatment | Nothing | Nothing | Conducted |
| Kneading method | Batch type closed high-speed kneading device | Batch type closed high-speed kneading device | Twin screw extruder |
| MFR | 9.0 | 8.6 | 5.3 |
| Shape of resulting material | ○ | ○ | ○ |
| Moisture content (%) | 0.2 | 0.2 | 0.0 |
| Power consumption (kWh/kg) | 1.0 | 0.6 | 2.6 |
| Impact resistance (kJ/m²) | 5.0 | 4.8 | 4.3 |
| Flexural strength (MPa) | 31.3 | 30.8 | 26.1 |
| Water absorption ratio (%) | 3.5 | 3.3 | 11.8 |
| Conformance or nonconformance of water absorption | ○ | ○ | x |
| Impact resistance retention (%) after water absorption | 109 | 107 | 110 |
| Cellulose fiber dispersibility | ○ | ○ | x |
| Molecular weight pattern | ○ | ○ | x |

Note:
"Ex" means Example, and
"C Ex" means Comparative Example.

From Example 20 in Table 7, in the cellulose-aluminum-dispersing polyethylene resin composite material obtained by performing the melt-kneading of the thin film piece in the presence of water in the subcritical state by using the batch type closed kneading device, even though the moisture content was 0.2, power consumption necessary for the preparation is low and the composite material was excellent in energy efficiency. Moreover, it is found that the composite material was excellent in cellulose dispersibility, and low in water absorbing properties. Moreover, it is found that, in the composite material in Example 21 in which the volume reduction treatment was applied thereto before the melt-kneading, the power consumption can be further significantly reduced.

Further, in Examples 20 and 21, the molecular weight pattern of the polyethylene resin resulted in "○".

On the other hand, when the thin film piece was kneaded by the twin screw extruder, the moisture content of the composite material obtained was high, and the composite material was poor in cellulose dispersibility, and also high in water absorbing properties. When a kneading method by the twin screw extruder is employed, the moisture content of the composite material obtained can be reduced to a level near 0% by mass by providing the cellulose-aluminum-adhering polyethylene thin film piece for drying treatment before kneading the thin film piece. In this case, however, the power consumption significantly increased to several times, and resulted in poor energy efficiency (Comparative Example 6).

Test Example 8

A test was conducted on an influence of a method (device) of kneading a cellulose-aluminum-adhering polyethylene thin film piece.

The cellulose-aluminum-adhering polyethylene thin film piece was obtained in the same manner as in the Test Example 1 described above. This thin film piece was cut into small pieces of about several $cm^2$ to 100 $cm^2$, and was in a wet state in the same way as in the Test Example 1. Moreover, a mass ratio (after drying) of a polyethylene resin forming this thin film piece, a cellulose fiber adhered thereto was as shown in the table. In this thin film piece in the wet state, an amount of water adhered thereto based on a total of 100 parts by mass of the polyethylene resin and the cellulose fiber was 19 parts by mass.

The evaluations described in Table 8 were performed on a case where the cellulose-aluminum-adhering polyethylene thin film piece in this wet state were melt kneaded in the presence of water in the subcritical state by using the batch type closed kneading device (Example 22), and a case where the cellulose-aluminum-adhering polyethylene thin film piece in the wet state was dried and then kneaded by using the kneader (Comparative Example).

In addition, with regard to a kneading end time point using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following table) was adjusted to 7 seconds.

The results of evaluation of each sample are as shown in Table 8.

TABLE 8

|  | Ex 22 | CEx 7 |
|---|---|---|
| Cellulose fiber (parts by mass) | 10 | 10 |
| Polyethylene (parts by mass) | 90 | 90 |
| Aluminum (parts by mass) | 9 | 9 |
| Drying treatment | Nothing | Conducted |
| Kneading method (primary) | Batch type closed high-speed kneading device | Kneader (no water) |
| MFR (g/10 min) | 34.0 | 17.7 |
| Shape of resulting material | ○ | ○ |
| Moisture content (%) | 0.2 | 0.2 |
| Power consumption (kWh/kg) | 0.4 | 1.5 |
| Impact resistance (kJ/$m^2$) | 11.5 | 11.1 |
| Flexural strength (MPa) | 13.3 | 13.4 |
| Judgement of aluminum length | ○ | Δ |
| Water absorption ratio (%) | 0.3 | 1.1 |
| Conformance or nonconformance of water absorption | ○ | x |
| Impact resistance retention (%) after water absorption | 105 | 104 |
| Cellulose fiber dispersibility | ○ | x |
| Molecular weight pattern | ○ | ○ |

Note:
"Ex" means Example, and "C Ex" means Comparative Example.

Example 22 in Table 8 shows that the cellulose-aluminum-dispersing polyethylene resin composite material obtained by melt-kneading the thin film piece in the presence of water in the same manner as in the Test Example 1 is excellent in a moisture content, impact resistance, water absorption ratio and cellulose fiber dispersibility. Moreover, in Example 22, the molecular weight pattern of the polyethylene resin resulted in (○). Thus, it is considered that compatibility between the polyethylene resin and the cellulose fiber is improved, causing reduction of fine voids in an interface between the polyethylene resin and the cellulose fiber to improve vulnerability of the interface, and to suppress reduction of impact resistance and an increase of water absorption ratio.

On the other hand, when the thin film piece subjected to drying treatment was kneaded using a kneader (Comparative Example), the drying treatment is required. Therefore total electricity consumption for obtaining the composite material is high. Moreover, water absorption ratio of the composite material obtained was also high, and the composite material was poor also in cellulose fiber dispersibility.

Test Example 9

A composite material was produced experimentally using a recovered material of a used beverage container having a different origin as a raw material.

A cellulose-aluminum-adhering polyethylene thin film piece was obtained in the same manner as in the Test Example 1 described above except that the recovered material having the different origin as the used beverage container made of paper was used. This thin film piece was cut into small pieces of about several $cm^2$ to 100 $cm^2$, and was in a wet state in the same way as in the Test Example 1. Moreover, a proportion (after drying) of components of an aggregate of this thin film piece is as shown in Table 9. In this thin film piece in the wet state, an amount of water adhered thereto based on a total amount of 100 parts by mass of the polyethylene resin and the cellulose fiber was 100 parts by mass.

Next, this aggregate of the cellulose-aluminum-adhering polyethylene thin film piece was charged into the batch type closed kneading device same with the device in the Test Example 1 with keeping the wet state, and agitated with a high speed to turn water into a subcritical state, and simultaneously melt kneaded to prepare a sample of a cellulose-aluminum-dispersing polyethylene resin composite material.

In addition, with regard to a kneading end time point using the batch type closed kneading device, rotating torque of a rotary shaft of the batch type closed kneading device rises and reaches a maximum value and then falls, and then a torque change is reduced. Therefore a time point at which a torque change rate reaches 5% or less per second is taken as a starting point is defined as a moment at which the torque reached a minimum value, and an elapsed time from this starting point (corresponding to "Time A" in the following table) was adjusted to 7 seconds.

The results of evaluation of each composite material are as shown in Table 9.

TABLE 9

|  | Ex 23 | Ex 24 |
|---|---|---|
| Cellulose fiber (parts by mass) | 10 | 10 |
| Polyethylene (parts by mass) | 90 | 90 |
| Polypropylene [Rp] (parts by mass) | 18 | 13 |
| Total of polyethylene terephthalate and nylon (parts by mass) | — | 3 |
| Aluminum (parts by mass) | 9 | 9 |
| MFR (g/10 min) | 33.7 | 31.6 |
| Shape of resulting material | ○ | ○ |
| Moisture content (%) | 0.2 | 0.2 |
| Power consumption (kWh/kg) | 0.4 | 0.4 |
| Impact resistance (kJ/$m^2$) | 9.2 | 9.5 |
| Flexural strength (MPa) | 15.1 | 14.8 |
| Judgement of aluminum length | ○ | ○ |
| Water absorption ratio (%) | 0.3 | 0.3 |

TABLE 9-continued

|  | Ex 23 | Ex 24 |
|---|---|---|
| Conformance or nonconformance of water absorption | ○ | ○ |
| Impact resistance retention (%) after water absorption | 105 | 105 |
| Cellulose fiber dispersibility | ○ | ○ |

Note:
"Ex" means Example.

$$Rp=(Ga-Gb)/(Gb+Gc)\times 100 \leq 20$$

Table 9 shows that the cellulose-aluminum-dispersing polyethylene resin composite material obtained by performing the melt-kneading of the thin film piece in the presence of water in the same way as in the Test Example 1 is excellent in a moisture content, impact resistance, water absorption ratio and cellulose fiber dispersibility.

Test Example 10

A test was conducted on an influence by adding recycled high density polyethylene (recycled HDPE) thereto in kneading a cellulose-aluminum-adhering polyethylene thin film piece.

A cellulose-aluminum-adhering polyethylene thin film piece was obtained in the same manner as in the Test Example 1 described above. This thin film piece was cut into small pieces of about several cm² to 100 cm², and was in a wet state in the same way as in the Test Example 1. Moreover, a mass ratio (after drying) of a polyethylene resin forming this thin film piece and a cellulose fiber adhered thereto and aluminum was 65:35:5. In this thin film piece in the wet state, an amount of water adhered thereto based on a total amount of 100 parts by mass of the polyethylene resin and the cellulose fiber was 50 parts by mass.

Next, a predetermined amount of recycled HDPE as shown in Table 7 was added to this thin film piece, and the resulting material was melt kneaded in the presence of water in a subcritical state by using the batch type closed kneading device same with the device in the Test Example 1 to obtain three kinds of composite materials in Examples 25 to 27.

The results of evaluation of each composite material are as shown in Table 10.

TABLE 10

|  | Ex 25 | Ex 26 | Ex 27 |
|---|---|---|---|
| Cellulose fiber (parts by mass) | 35 | 35 | 35 |
| Polyethylene (parts by mass) | 65 | 65 | 65 |
| Aluminum (parts by mass) | 5 | 5 | 5 |
| Recycled HDPE (parts by mass) | 33 | 100 | 300 |
| MFR | 1.8 | 9.0 | 9.0 |
| Shape of resulting material | ○ | ○ | ○ |
| Moisture content (%) | 0.2 | 0.2 | 0.2 |
| Power consumption (kWh/kg) | 1.0 | 1.0 | 1.0 |
| Impact resistance (kJ/m²) | 5.2 | 5.5 | 5.9 |
| Flexural strength (MPa) | 29.8 | 27.3 | 24.6 |
| Judgement of aluminum length | ○ | ○ | ○ |
| Water absorption ratio (%) | 3.3 | 2.1 | 0.8 |
| Conformance or nonconformance of water absorption | ○ | ○ | ○ |
| Impact resistance retention (%) after water absorption | 108 | 106 | 105 |
| Cellulose fiber dispersibility | ○ | ○ | ○ |
| Molecular weight pattern | — | — | — |

Note:
"Ex" means Example.

Table 10 shows that, even if the recycled HDPE was added thereto upon kneading the cellulose-aluminum-adhering polyethylene thin film piece, no problem occurs in terms of physical properties.

Test Example 11

A test was conducted on an influence of an amount of cellulose fiber when a cellulose-aluminum-adhering polyethylene thin film piece was kneaded in the presence of water by using a batch type kneading device.

A cellulose-aluminum-adhering polyethylene thin film piece was obtained in the same manner as in the Test Example 1 described above. This thin film piece was cut into small pieces in various shapes and sizes having about several cm² to 100 cm², and was in a wet state (state of absorbing a large amount of water) by being immersed into water in a step of stripping off a paper portion. Moreover, a mass ratio (after drying) of a polyethylene resin forming this thin film piece, a cellulose fiber adhered thereto and aluminum was as shown in Table 11.

The cellulose-aluminum-adhering polyethylene thin film piece was dried by a dryer set at 80° C. for 48 hours to reduce a moisture content to 1% by mass or less, and then water was intentionally added thereto to prepare four kinds of sample materials so as to satisfy parts by mass of water as described in each column of Examples 28 to 31 as shown in Table 11.

Next, these four kinds of sample materials were separately charged into a kneader being a batch type kneading device, and melt kneaded to prepare four kinds of polyethylene resin composite materials in which the cellulose fiber and aluminum were dispersed.

The results of evaluation of each composite material are as shown in Table 11.

TABLE 11

|  | Ex 28 | Ex 29 | Ex 30 | Ex 31 |
|---|---|---|---|---|
| Cellulose fiber (parts by mass) | 9 | 27 | 34 | 44 |
| Polyethylene (parts by mass) | 91 | 73 | 66 | 56 |
| Aluminum (parts by mass) | 12 | 12 | 15 | 20 |
| Water (parts by mass) | 100 | 100 | 67 | 100 |
| MFR (g/10 min) | 11.1 | 3.1 | 2.3 | 0.84 |
| Shape of resulting material | ○ | ○ | ○ | ○ |
| Impact resistance (kJ/m²) | 12.8 | 6.9 | 5.9 | 3.9 |
| Flexural strength (MPa) | 13.8 | 26.3 | 32.4 | 32.9 |
| Tensile strength (MPa) | 14.1 | 25.0 | 26.8 | 30.0 |
| Judgement of aluminum length | Δ | Δ | Δ | Δ |
| Conformance or nonconformance of water absorption | ○ | ○ | ○ | ○ |
| Impact resistance retention (%) after water absorption | 105 | 107 | 109 | 110 |
| Cellulose fiber dispersibility | ○ | ○ | ○ | ○ |
| Molecular weight pattern | ○ | ○ | ○ | ○ |

Note:
"Ex" means Example.

Table 11 shows that the composite material obtained by melt-kneading the thin film piece in the presence of water by using the kneader is low in water absorption ratio (conformance or nonconformance of water absorption ratio: "o"). Moreover, accordingly as the amount of cellulose fiber increased, tensile strength tended to be enhanced.

Test Example 12

A test was conducted on an influence of an amount of cellulose fiber when a cellulose-aluminum-adhering polyethylene thin film piece was kneaded without adding water by using a batch type kneading device.

A cellulose-aluminum-adhering polyethylene thin film piece was obtained in the same manner as in the Test Example 1 described above. Such a thin film piece was cut into small pieces in various shapes and sizes having about several cm² to 100 cm², and was in a wet state (state of absorbing a large amount of water) by being immersed into water in a step of stripping off a paper portion. Moreover, a mass ratio (after drying) of a polyethylene resin forming such a thin film piece, a cellulose fiber adhered thereto and aluminum was as shown in Table 11.

This cellulose-aluminum-adhering polyethylene thin film piece was dried by a dryer set at 80° C. for 48 hours to reduce a moisture content to 1% by mass or less.

Next, these three sample materials were separately charged into the batch type kneading device same with the device used in the Test Example 11, and was melt kneaded to prepare three kinds of polyethylene resin composite materials in which the cellulose fiber and aluminum were dispersed.

The results of evaluation of each composite material are as shown in Table 12.

TABLE 12

|  | CEx 8 | CEx 9 | CEx 10 |
|---|---|---|---|
| Cellulose fiber (parts by mass) | 13 | 27 | 38 |
| Polyethylene (parts by mass) | 87 | 73 | 62 |
| Aluminum (parts by mass) | 11 | 13 | 15 |
| Water (parts by mass) | 0 | 0 | 0 |
| MFR (g/10 min) | 10.9 | 1.41 | 0.19 |
| Shape of resulting material | ○ | ○ | ○ |
| Moisture content (%) | 0.3 | 0.3 | 0.3 |
| Impact resistance (kJ/m²) | 12.3 | 6.2 | 5.7 |
| Flexural strength (MPa) | 14.9 | 25.9 | 28.9 |
| Tensile strength (MPa) | 15.1 | 22.6 | 21.6 |
| Judgement of aluminum length | Δ | Δ | Δ |
| Conformance or nonconformance of water absorption | x | x | x |
| Cellulose fiber dispersibility | x | x | x |
| Molecular weight pattern | ○ | ○ | ○ |

Note:
"C Ex" means Comparative Example.

As is apparent in comparison of the results in Table 12 with the results in Table 11, the composite material obtained by melt-kneading without adding water thereto by using the kneader resulted in poor cellulose fiber dispersibility, and also high water absorption ratio (conformance or nonconformance of water absorption ratio: "x"). Moreover, as is apparent in comparison with the results in Table 11, tensile strength was lower for an amount of the cellulose fiber.

Test Example 13

A test was conducted on an influence of an amount of aluminum when a cellulose-aluminum-adhering polyethylene thin film piece was kneaded by a kneader.

A cellulose-aluminum-adhering polyethylene thin film piece was obtained in the same manner as in the Test Example 1 described above. This thin film piece was cut into small pieces having about several cm² to 100 cm², and was in a wet state. Moreover, a mass ratio (after drying) of a polyethylene resin forming this thin film piece to a cellulose fiber adhered thereto was as shown in Table 12.

Next, this cellulose-aluminum-adhering polyethylene thin film piece was charged into the kneader same with the kneader in the Test Example 11 with keeping the wet state, and melt kneaded to prepare four kinds of samples of cellulose-aluminum-dispersing polyethylene resin composite materials.

TABLE 13

|  | Ex 32 | Ex 33 | Ex 34 | Ex 35 |
|---|---|---|---|---|
| Cellulose fiber (parts by mass) | 5 | 5 | 5 | 5 |
| Polyethylene (parts by mass) | 95 | 95 | 95 | 95 |
| Aluminum (parts by mass) | 2 | 5 | 17 | 37 |
| Water (parts by mass) | 15 | 15 | 15 | 15 |
| MFR (g/10 min) | 38.3 | 36.8 | 28.7 | — |
| Shape of resulting material | ○ | ○ | ○ | ○ |
| Impact resistance (kJ/m²) | 45 | 42 | 33.2 | 18.7 |
| Flexural strength (MPa) | 8.1 | 8.6 | 9.2 | 12.7 |
| Tensile strength (MPa) | 14.4 | 14.5 | 14.8 | 13.4 |
| Oxygen index (—) | 20.8 | 21.0 | 21.7 | 22.1 |
| Thermal conductivity (W/m · K) | 0.12 | 0.21 | 0.52 | 1.03 |
| Judgement of aluminum length | Δ | Δ | Δ | — |
| Conformance or nonconformance of water absorption | ○ | ○ | ○ | ○ |
| Cellulose fiber dispersibility | ○ | ○ | ○ | ○ |
| Molecular weight pattern | ○ | ○ | ○ | ○ |

Note:
"Ex" means Example.

Table 13 shows that, even if the amount of aluminum is changed, the cellulose-aluminum-dispersing polyethylene resin composite material having excellent characteristics can be obtained. Moreover, the results in Example 33 show that, if the proportion of aluminum is 5 parts by mass based on a total of 100 parts by mass of the polyethylene and the cellulose, the composite material has flame retardancy of 21 or more in an oxygen index, and thermal conductivity of 0.2 W/m·K or more.

Test Example 14

A test was conducted on an influence of a form of a raw material to be charged into a batch type kneading device.

A cellulose-aluminum-adhering polyethylene thin film piece was obtained in the same manner as in the Test Example 1 described above. This thin film piece was cut into small pieces of about several cm² to 100 cm², and was in a wet state in the same way as in the Test Example 1. Moreover, a mass ratio (after drying) of a polyethylene resin forming this thin film piece and a cellulose fiber adhered thereto and aluminum was: [polyethylene resin]:[cellulose fiber]:[aluminum]=75:25:12. In this thin film piece in the wet state, an amount of water adhered thereto based on a total of 100 parts by mass of the polyethylene resin and the cellulose fiber and the aluminum was 20 parts by mass. This cellulose-aluminum-adhering polyethylene thin film piece was dried by a dryer set at 80° C. for 48 hours to reduce a moisture content to 1% by mass or less to prepare a sample material (Example 36).

A cellulose-aluminum-adhering polyethylene thin film piece was obtained in the same manner as in the Test Example 1 described above. This thin film piece was cut into small pieces in various shapes and sizes having about several cm² to 100 cm². A material to which the cellulose fiber was apparently adhered from visual observation was removed from the thin film piece obtained. A mass ratio (after drying) of a polyethylene resin forming the remaining thin film piece to aluminum adhered thereto was: [polyethylene resin]:[aluminum]=75:12.

This thin film piece was dried by a dryer set at 80° C. for 48 hours to reduce a moisture content to 1% by mass or less.

Then, cellulose powder (KC FLOCK, manufactured by Nippon Paper Industries Co., Ltd.) was blended thereto to prepare a sample material containing 25 parts by mass of cellulose (Example 37).

A cellulose adhesion polyethylene thin film piece was obtained by stripping off and removing, by using a pulper, a paper portion from a beverage container formed of used polyethylene laminated paper (without having an aluminum thin film layer). This thin film piece was cut into small pieces having various shapes and sizes of about several $cm^2$ to 100 $cm^2$, and was in a wet state (state in which a large amount of water was absorbed) by being immersed into water in a step of stripping off the paper portion. Moreover, a mass ratio (after drying) of a polyethylene resin forming this thin film piece to a cellulose fiber adhered thereto was: [polyethylene resin]:[cellulose fiber]=75:25. In this cellulose adhesion polyethylene thin film piece was dried by a dryer set at 80° C. for 48 hours to reduce a moisture content to 1% by mass or less. Then, a finely cut material of aluminum foil was added thereto so as to be 25 parts by mass in a proportion of aluminum based on a total of 100 parts by mass of the polyethylene resin and the cellulose fiber to prepare a sample material (Comparative Example 11).

Water was added to each sample material to be 15 parts by mass of water based on the total of 100 parts by mass of the polyethylene resin and the cellulose fiber. This sample material to which water was mixed was charged into the batch type closed kneading device same with the device used in Test Example 1, and melt kneaded to try to prepare a cellulose-aluminum-dispersing polyethylene resin composite material.

36, the cellulose fiber having a fiber length of 1 mm or more was observed by observation of a cross section of the composite material by a microscope, the cellulose fiber having a fiber length of 1 mm or more was unable to be confirmed in Example.

Test Example 15

A test was further conducted on an amount of water when a cellulose-aluminum-adhering polyethylene thin film piece was kneaded by a kneader.

A cellulose-aluminum-adhering polyethylene thin film piece was obtained in the same manner as in the Test Example 1 described above. This thin film piece was cut into small pieces of about several $cm^2$ to 100 $cm^2$, and was in a wet state in the same way as in the Test Example 1. Moreover, a ratio (after drying) of a polyethylene resin forming this thin film piece to a cellulose fiber adhered thereto was as shown in Table 14. This cellulose-aluminum-adhering polyethylene thin film piece was dried by a dryer set at 80° C. for 48 hours to reduce a moisture content to 1% by mass or less, and then water was added thereto so as to satisfy parts by mass of water as described in each column of Examples 38 to 40 as shown in Table 14 to prepare four kinds of sample materials.

Next, these four kinds of sample materials were separately charged into a kneader, and melt kneaded to prepare four kinds of polyethylene resin composite materials in which the cellulose fiber and the aluminum were dispersed.

TABLE 14

|  | Ex 36 | Ex 37 | CEx 11 |
|---|---|---|---|
| Cellulose fiber (parts by mass) | 25 | 25 | 25 |
| Polyethylene (parts by mass) | 75 | 75 | 75 |
| Aluminum (parts by mass) | 12 | 12 | 12 |
| Water (parts by mass) | 15 | 15 | 15 |
| Form of raw material | Cellulose-aluminum-adhering PE thin film piece | Aluminum-adhering PE thin film piece + cellulose powder | Finely cut material of aluminum foil + Cellulose-adhering PE thin film piece |
| MFR (g/10 min) | 15.7 | 19.6 | — |
| Shape of resulting material | ○ | ○ | x |
| Impact resistance (kJ/m$^2$) | 7.9 | 7.8 | — |
| Flexural strength (MPa) | 24.0 | 17.1 | — |
| Tensile strength (MPa) | 22.1 | 15.6 | — |
| Thermal conductivity (W/m · K) | 0.58 | 0.55 | — |
| Judgement of aluminum length | Δ | Δ | x |
| Conformance or nonconformance of water absorption | ○ | ○ | — |
| Impact resistance retention (%) after water absorption | 107 | 107 | — |
| Cellulose fiber dispersibility | ○ | ○ | — |
| Cellulose fiber length | ○ | x | — |
| Molecular weight pattern | ○ | ○ | — |

Note:
"Ex" means Example, and "C Ex" means Comparative Example.

In Comparative Example 11 to which the finely cut material of aluminum foil was added, even if the thin film piece was melt kneaded, a large lump of aluminum foil remained and lacked in integrity, and the sample material was not provided for the test. In Example 37 to which the cellulose powder was added, the sample material was poorer in tensile strength and flexural strength than the sample material in Example 36 in which the cellulose-aluminum-adhering polyethylene thin film piece only was used. While, with regard to the composite material obtained in Example The results of evaluation of each composite material are as shown in Table 15.

TABLE 15

|  | Ex 38 | Ex 39 | Ex 40 |
|---|---|---|---|
| Cellulose fiber (parts by mass) | 27 | 28 | 34 |
| Polyethylene (parts by mass) | 73 | 72 | 66 |
| Aluminum (parts by mass) | 12 | 14 | 17 |

TABLE 15-continued

|  | Ex 38 | Ex 39 | Ex 40 |
|---|---|---|---|
| Water (parts by mass) | 11 | 25 | 43 |
| MFR (g/10 min) | 2.1 | 3.1 | 2.2 |
| Shape of resulting material | ○ | ○ | ○ |
| Impact resistance (kJ/m$^2$) | 6.0 | 4.5 | 5.7 |
| Flexural strength (MPa) | 27.2 | 26.1 | 32.0 |
| Tensile strength (MPa) | 24.0 | 23.6 | 27.0 |
| Judgement of aluminum length | Δ | Δ | Δ |
| Conformance or nonconformance of water absorption | ○ | ○ | ○ |
| Impact resistance retention (%) after water absorption | 107 | 107 | 109 |
| Cellulose fiber dispersibility | ○ | ○ | ○ |
| Molecular weight pattern | ○ | ○ | ○ |

Note:
"Ex" means Example.

The results in Example 38 show that, even if an amount of blending water is reduced, if water coexists during melt-kneading, the cellulose-aluminum-dispersing polyethylene composite material having suppressed water absorption ratio and also excellent mechanical strength in addition thereto can be obtained. A comparison with Examples 29, 38, and 39 or a comparison with Examples 30 and 40 shows that an amount of water may be large or small. In addition, if energy efficiency is taken into consideration, the amount of water is recommended to be not excessively large.

Test Example 16

A cellulose-aluminum-dispersing polyethylene resin composite material A was obtained in the same manner as in Example 2. An amount of water during melt-kneading was adjusted to 20 parts by mass based on a total of 100 parts by mass of the cellulose fiber and the polyethylene resin. The cellulose-aluminum-dispersing polyethylene resin composite material A obtained and calcium carbonate powder (manufactured by Bihoku Funka Kogyo Co., Ltd., SOFTON 1500) were dry-blended at a blend ratio shown in Table 16, and then the resulting material was charged into a twin screw extruder (manufactured by Japan Steel Works, Ltd., TEX 30), and was kneaded to prepare a cellulose-aluminum-dispersing polyethylene resin composite material in which calcium carbonate was dispersed. The results of evaluation of the obtained cellulose-aluminum-dispersing polyethylene resin composite material in which calcium carbonate was dispersed are shown in Table 16.

A cellulose-aluminum-dispersing polyethylene resin composite material A was obtained in the same manner as in Example 1. An amount of water during melt-kneading was adjusted to 20 parts by mass based on a total of 100 parts by mass of the cellulose fiber and the polyethylene resin. The cellulose-aluminum-dispersing polyethylene resin composite material A obtained and magnesium hydroxide powder (manufactured by Shinko Kokyo Co., Ltd., Maglux) and/or calcium carbonate powder (manufactured by Bihoku Funka Kogyo Co., Ltd., SOFTON 1500) were dry-blended at a blend ratio as shown in Tables 17, 18 and 19, and then the resulting material was charged into a twin screw extruder (manufactured by Japan Steel Works, Ltd., TEX 30), and was kneaded to prepare a cellulose-aluminum-dispersing polyethylene resin composite material in which magnesium hydroxide and calcium carbonate were dispersed. The results of evaluation of the obtained cellulose-aluminum-dispersing polyethylene resin composite material formed by dispersing magnesium hydroxide and calcium carbonate are as shown in Tables 17, 18 and 19.

TABLE 16

|  | Ex 41 | Ex 42 | Ex 43 | Ex 44 | Ex 45 |
|---|---|---|---|---|---|
| Composite material A (parts by mass) | 90 | 80 | 70 | 60 | 50 |
| Calcium carbonate (parts by mass) | 10 | 20 | 30 | 40 | 50 |
| Calcium carbonate (parts by mass to 100 parts by mass of polyethylene resin) | 13.5 | 30.3 | 51.9 | 80.7 | 121.1 |
| Shape of resulting material | ○ | ○ | ○ | ○ | ○ |
| Impact resistance (kJ/m$^2$) | 9.3 | 7.8 | 6.3 | 5.4 | 4.1 |
| Flexural strength (MPa) | 13.1 | 13.8 | 30.3 | 16.3 | 18.3 |
| Flexural modulus (MPa) | 479 | 544 | 612 | 777 | 939 |
| Judgement of aluminum length | Δ | Δ | Δ | Δ | Δ |
| Conformance or nonconformance of water absorption | ○ | ○ | ○ | ○ | ○ |
| Impact resistance retention (%) after water absorption | 105 | 105 | 105 | 105 | 105 |
| Cellulose fiber dispersibility | ○ | ○ | ○ | ○ | ○ |
| Molecular weight pattern | ○ | ○ | ○ | ○ | ○ |

Note:
"Ex" means Example.

TABLE 17

|  | Ex 46 | Ex 47 | Ex 48 | Ex 49 | Ex 50 |
|---|---|---|---|---|---|
| Composite material A (parts by mass) | 95 | 85 | 75 | 65 | 55 |
| Calcium carbonate (parts by mass) | 0 | 10 | 20 | 30 | 40 |
| Magnesium hydroxide (parts by mass) | 5 | 5 | 5 | 5 | 5 |
| Total amount of calcium carbonate and magnesium hydroxide (parts by mass to 100 parts by mass of polyethylene resin) | 6.4 | 21.4 | 40.4 | 65.2 | 99.1 |
| Shape of resulting material | ○ | ○ | ○ | ○ | ○ |
| Impact resistance (kJ/m$^2$) | 9.7 | 7.7 | 5.9 | 4.7 | 3.7 |
| Flexural strength (MPa) | 13.2 | 14.1 | 14.9 | 16.4 | 18.0 |
| Flexural modulus (MPa) | 458 | 548 | 596 | 692 | 885 |
| Judgement of aluminum length | ○ | ○ | ○ | ○ | ○ |
| Conformance or nonconformance of water absorption | ○ | ○ | ○ | ○ | ○ |
| Impact resistance retention (%) after water absorption | 105 | 105 | 105 | 105 | 105 |
| Cellulose fiber dispersibility | ○ | ○ | ○ | ○ | ○ |
| Molecular weight pattern | ○ | ○ | ○ | ○ | ○ |

Note:
"Ex" means Example.

TABLE 18

|  | Ex 51 | Ex 52 | Ex 53 | Ex 54 |
|---|---|---|---|---|
| Composite material A (parts by mass) | 90 | 80 | 70 | 60 |
| Calcium carbonate (parts by mass) | 0 | 10 | 20 | 30 |
| Magnesium hydroxide (parts by mass) | 10 | 10 | 10 | 10 |
| Total amount of calcium carbonate and magnesium hydroxide (parts by mass to 100 parts by mass of polyethylene resin) | 13.5 | 30.3 | 51.9 | 80.7 |
| Shape of resulting material | ○ | ○ | ○ | ○ |
| Impact resistance (kJ/m$^2$) | 9.3 | 7.0 | 5.5 | 4.4 |
| Flexural strength (MPa) | 13.8 | 14.6 | 15.8 | 17.3 |
| Flexural modulus (MPa) | 501 | 576 | 693 | 819 |
| Water absorption ratio (%) | 0.3 | 0.4 | 0.5 | 0.5 |
| Judgement of aluminum length | ○ | ○ | ○ | ○ |
| Conformance or nonconformance of water absorption | ○ | ○ | ○ | ○ |
| Impact resistance retention (%) after water absorption | 105 | 105 | 105 | 105 |
| Cellulose fiber dispersibility | ○ | ○ | ○ | ○ |
| Molecular weight pattern | ○ | ○ | ○ | ○ |

Note:
"Ex" means Example.

TABLE 19

|  | Ex 55 | Ex 56 | Ex 57 | Ex 58 |
|---|---|---|---|---|
| Composite material A (parts by mass) | 85 | 75 | 65 | 55 |
| Calcium carbonate (parts by mass) | 0 | 10 | 20 | 30 |
| Magnesium hydroxide (parts by mass) | 15 | 15 | 15 | 15 |
| Total amount of calcium carbonate and magnesium hydroxide (parts by mass to 100 parts by mass of polyethylene) | 21.4 | 40.4 | 65.2 | 99.1 |
| Shape of resulting material | ○ | ○ | ○ | ○ |
| Impact resistance (kJ/m$^2$) | 7.9 | 6.5 | 5.4 | 4.1 |
| Flexural strength (MPa) | 14.4 | 15.17 | 16.2 | 17.3 |
| Flexural modulus (MPa) | 544 | 627 | 735 | 960 |
| Judgement of aluminum length | ○ | ○ | ○ | ○ |
| Conformance or nonconformance of water absorption | ○ | ○ | ○ | ○ |
| Impact resistance retention (%) after water absorption | 105 | 105 | 105 | 105 |
| Cellulose fiber dispersibility | ○ | ○ | ○ | ○ |
| Molecular weight pattern | ○ | ○ | ○ | ○ |

Note:
"Ex" means Example.

Tables 16, 17, 18 and 19 show that, when the total amount of calcium carbonate and calcium hydroxide, each being an inorganic material, is adjusted to 20 parts by mass or more based on 100 parts by mass of the polyethylene resin, the composite material having a flexural modulus of 500 MPa or more can be obtained.

Moreover, it is found that, when the total amount of calcium carbonate and calcium hydroxide, each being the inorganic material, is adjusted to 100 parts by mass or less based on 100 parts by mass of the polyethylene resin, the composite material having impact resistance of 4 kJ/m$^2$ can be obtained, and that the composite material having impact resistance of 5 kJ/m$^2$ may also be obtained by adjusting the total amount to 70 parts by mass or less.

Test Example 17

A test was conducted thereon in a case where a cellulose-aluminum-adhering polyethylene thin film piece was kneaded by a different batch type closed kneading device (batch type high-speed agitating device) from the device in the Test Example 1.

A cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. In addition, a mass ratio (after drying) of polyethylene forming this thin film piece to a cellulose fiber adhered thereto was as shown in Table 20. A material in which this thin film was used with keeping the wet state (Example), and as a comparison, a material in which the thin film piece was dried by a dryer set at 80° C. for 48 hours to reduce a moisture content to 1% by mass or less (Comparative Example) were arranged. In this thin film piece in the wet state, an amount of water adhered thereto based on a total of 100 parts by mass of the cellulose fiber, the polyethylene and the aluminum was as shown in Table 20.

Next, this cellulose-aluminum-adhering polyethylene thin film piece (with keeping the wet state in Example) was charged into the different batch type closed kneading device (batch type high-speed agitating device) from the device used in the Test Example 1, kneading of the sample material was started in the presence of water by performing agitation with a high speed by adjusting a rotating speed of an agitation blade of the mixing melting device to 40 m/sec in a peripheral speed at a leading edge of the rotary blade to prepare a cellulose-aluminum-dispersing polyethylene resin composite material.

In addition, with regard to an end of kneading, a time point at which a temperature of the material in a device chamber to be measured by a thermometer installed in the batch type closed kneading device (batch type high-speed agitating device) reached 180° C. was taken as the end.

The results are shown in Table 20 below.

TABLE 20

|  | Ex 59 | Ex 60 | CEx 12 |
|---|---|---|---|
| Cellulose fiber (parts by mass) | 34 | 25 | 34 |
| Polyethylene (parts by mass) | 64 | 75 | 64 |
| Aluminum (parts by mass) | 19 | 15 | 19 |
| Water (parts by mass) | 35 | 25 | 0 |
| MFR (g/10 min) | 18.1 | — | — |
| Shape of resulting material | ○ | ○ | x |
| Impact resistance (kJ/m$^2$) | 5.8 | 7.0 | — |
| Flexural strength (MPa) | 29.8 | 22.8 | — |
| Tensile strength (MPa) | 29.2 | 21.0 | — |
| Judgement of aluminum length | ○ | ○ | — |
| Conformance or nonconformance of water absorption | ○ | ○ | — |
| Cellulose fiber dispersibility | ○ | ○ | — |
| Molecular weight pattern | ○ | ○ | — |

Note:
"Ex" means Example, and "C Ex" means Comparative Example.

The results in Comparative Example 12 show that, when melt-kneading of the cellulose-aluminum-adhering polyethylene thin film piece is performed in a water-free environment, the composite material in which the cellulose and the aluminum are uniformly dispersed is unable to be obtained.

On the other hand, the results in Examples 59 and 60 show that, when water is allowed to coexist during the melt-kneading of the cellulose-aluminum-adhering polyethylene thin film piece, the cellulose-aluminum-dispersing polyethylene resin composite material having suppressed water absorption ratio (conformance or nonconformance of water absorption ratio: "○"), and also having excellent mechanical strength can be obtained. Moreover, a trend of enhanced tensile strength was also recognized according to an amount of cellulose fiber.

Test Example 18

A composite material was prepared by adding paper as a cellulose material, as described below, in kneading a cellulose-aluminum-adhering polyethylene thin film piece.

The cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. This cellulose-aluminum-adhering polyethylene thin film piece was dried by a drier set at 80° C. for 48 hours to reduce a moisture content to 1% by mass or less. Paper and water as shown in Table 21 were blended to this cellulose-aluminum-adhering polyethylene thin film piece to prepare ten kinds of sample materials. In addition, as the paper to be added thereto, a material shredded by a shredder for newspaper and office waste paper, and a material pulverized by a rotary cutter mill (manufactured by Horai Co., Ltd.) for corrugated cardboard were used.

Next, the thin film piece was melt kneaded in the presence of water by using the kneader same with the kneader in the Test Example 11 to obtain ten kinds of composite materials in Example 61 to 70. A mass ratio of the polyethylene, the cellulose fiber and the aluminum of the composite material obtained was as shown in Table 21.

The results are shown in Table 21.

TABLE 21

|  | Ex 61 | Ex 62 | Ex 63 | Ex 64 | Ex 65 | Ex 66 | Ex 67 | Ex 68 | Ex 69 | Ex 70 |
|---|---|---|---|---|---|---|---|---|---|---|
| Cellulose-aluminum-adhering polyethylene thin film piece (parts by mass) | 100 | 85 | 70 | 60 | 85 | 70 | 60 | 85 | 70 | 60 |
| Newspaper (parts by mass) | — | 15 | 30 | 40 | — | — | — | — | — | — |
| Office waste paper (parts by mass) | — | — | — | — | 15 | 30 | 40 | — | — | — |
| Corrugated cardboard (parts by mass) | — | — | — | — | — | — | — | 15 | 30 | 40 |
| Water (parts by mass) | 100 | 100 | 100 | 100 | 100 | 100 | 100 | 100 | 100 | 100 |
| Cellulose fiber (parts by mass) | 3 | 19 | 28 | 34 | 16 | 25 | 35 | 14 | 23 | 33 |
| Polyethylene (parts by mass) | 97 | 81 | 72 | 66 | 84 | 75 | 65 | 86 | 77 | 67 |
| Ash containing aluminum (parts by mass) | 19 | 23 | 23 | 24 | 18 | 24 | 25 | 19 | 23 | 25 |
| Shape of resulting material | ○ | ○ | ○ | ○ | ○ | ○ | ○ | ○ | ○ | ○ |
| Moisture content (%) | 0.2 | 0.2 | 0.2 | 0.2 | 0.2 | 0.2 | 0.2 | 0.2 | 0.2 | 0.2 |
| Power consumption (kWh/kg) | 1.0 | 1.0 | 1.0 | 1.0 | 1.0 | 1.0 | 1.0 | 1.0 | 1.0 | 1.0 |
| Impact resistance (kJ/m$^2$) | 12.7 | 7.7 | 6.3 | 5.8 | 8.8 | 7.3 | 6.7 | 8.8 | 6.2 | 5.6 |
| Flexural strength (MPa) | 12.2 | 18.4 | 25.6 | 29.0 | 18.4 | 26.6 | 31.3 | 17.4 | 23.6 | 26.8 |
| Judgement of aluminum length | Δ | Δ | Δ | Δ | Δ | Δ | Δ | Δ | Δ | Δ |
| Conformance or nonconformance of water absorption | ○ | ○ | ○ | ○ | ○ | ○ | ○ | ○ | ○ | ○ |
| Cellulose fiber dispersibility | ○ | ○ | ○ | ○ | ○ | ○ | ○ | ○ | ○ | ○ |
| Molecular weight pattern | ○ | ○ | ○ | ○ | ○ | ○ | ○ | ○ | ○ | ○ |

Note:
"Ex" means Example.

It is found that the cellulose-aluminum-dispersing polyethylene resin composite material obtained by blending the cellulose-aluminum-adhering polyethylene thin film piece, the paper and water is low in water absorbing properties, and also excellent in mechanical strength.

Test Example 19

A composite material was prepared by adding paper sludge, recycled pulp, and broken paper (trimmings loss) of laminated paper as shown in Table 22, as a cellulose material, in kneading a cellulose-aluminum-adhering polyethylene thin film piece. The preparation will be described in more detail.

The cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. This cellulose-aluminum-adhering polyethylene thin film piece was dried by a drier set at 80° C. for 48 hours to reduce a moisture content to 1% by mass or less. The cellulose material and water as shown in Table 22 were blended to this cellulose-aluminum-adhering polyethylene thin film piece to prepare ten kinds of sample materials. In addition, with regard to the broken paper to be added thereto, a material pulverized by a rotary cutter mill (manufactured by Horai Co., Ltd.) was used.

Next, the thin film piece was melt kneaded in the presence of water by using the kneader same with the kneader in the Test Example 11 to obtain ten kinds of composite materials in Example 71 to 80. A mass ratio of the polyethylene, the cellulose fiber and the aluminum in the composite material obtained was as shown in Table 22.

The results are shown in Table 22.

TABLE 22

|  | Ex 71 | Ex 72 | Ex 73 | Ex 74 | Ex 75 | Ex 76 | Ex 77 | Ex 78 | Ex 79 | Ex 80 |
|---|---|---|---|---|---|---|---|---|---|---|
| Cellulose-aluminum-adhering polyethylene thin film piece (parts by mass) | 70 | 50 | 40 | 30 | 50 | 35.4 | 63.6 | 50 | 35.4 | 50 |
| Paper sludge 1 (parts by mass) | 30 | 50 | 60 | 70 | — | — | — | — | — | — |
| Paper sludge 2 (parts by mass) | — | — | — | — | 50 | 64.6 | — | — | — | — |
| Recycled pulp (parts by mass) | — | — | — | — | — | — | 36.4 | — | — | 50 |
| Broken paper (parts by mass) | — | — | — | — | — | — | — | 50 | 64.6 | — |
| Water (parts by mass) | 30 | 50 | 60 | 70 | 100 | 100 | 100 | 100 | 100 | 100 |
| Cellulose fiber (parts by mass) | — | — | — | — | 28 | 38 | 40 | 31 | 40 | 44 |
| Polyethylene (parts by mass) | — | — | — | — | 72 | 62 | 60 | 69 | 60 | 56 |
| Aluminum (parts by mass) | — | — | — | — | 8 | 6 | 7 | 6 | 5 | 6 |
| Ash excluding aluminum [inorganic material] (parts by mass) | — | — | — | — | 46 | 60 | 11 | 13 | 14 | 10 |
| MFR | 10.5 | 1.6 | 0.5 | 0.0 |  |  |  |  |  |  |
| Shape of resulting material | ○ | ○ | ○ | ○ | ○ | ○ | ○ | ○ | ○ | ○ |
| Moisture content (%) | 0.2 | 0.2 | 0.2 | 0.2 | 0.2 | 0.2 | 0.2 | 0.2 | 0.2 | 0.3 |
| Power consumption (kWh/kg) | 1.0 | 1.0 | 1.0 | 1.0 | 1.0 | 1.0 | 1.0 | 1.0 | 1.0 | 1.0 |
| Impact resistance (kJ/m$^2$) | 5.6 | 3.6 | 3.1 | 2.7 | 3.5 | 2.7 | 6.0 | 6.2 | 5.3 | 5.1 |
| Flexural strength (MPa) | 19.2 | 26.0 | 27.9 | 31.6 | 24.8 | 26.2 | 30.2 | 28.0 | 30.6 | 32.1 |
| Flexural modulus (MPa) | 910 | 1648 | 2449 | 3407 | 1707 | 2472 | 2027 | 1532 | 2080 | 2410 |
| Tensile strength (MPa) | 18.8 | 22.8 | 24.2 | 26.1 | 19.8 | 22.4 | 29.0 | 28.2 | 31.6 | 31.2 |
| Judgement of aluminum length | Δ | Δ | Δ | Δ | Δ | Δ | Δ | Δ | Δ | Δ |
| Conformance or nonconformance of water absorption | ○ | ○ | ○ | ○ | ○ | ○ | ○ | ○ | ○ | ○ |

TABLE 22-continued

|  | Ex 71 | Ex 72 | Ex 73 | Ex 74 | Ex 75 | Ex 76 | Ex 77 | Ex 78 | Ex 79 | Ex 80 |
|---|---|---|---|---|---|---|---|---|---|---|
| Impact resistance retention (%) after water absorption | 107 | 106 | 105 | 107 | 106 | 105 | 107 | 106 | 105 | 105 |
| Cellulose fiber dispersibility | ○ | ○ | ○ | ○ | ○ | ○ | ○ | ○ | ○ | ○ |
| Molecular weight pattern | ○ | ○ | ○ | ○ | ○ | ○ | ○ | ○ | ○ | ○ |

Note:
"Ex" means Example.

It is found that the cellulose-aluminum-dispersing polyethylene resin composite material obtained by blending the cellulose-aluminum-adhering polyethylene thin film piece, the cellulose material and water has low in water absorbing properties and also excellent in mechanical strength.

Test Example 20

A composite material was prepared by adding a pulverized material of laminated paper of a paper pack, as described below, in kneading a cellulose-aluminum-adhering polyethylene thin film piece.

The cellulose-aluminum-adhering polyethylene thin film piece was obtained in the same manner as in the Test Example 1 described above. This thin film piece was cut into small pieces of about several cm$^2$ to 100 cm$^2$, and was in a wet state in the same way as in the Test Example 1. This cellulose-aluminum-adhering polyethylene thin film piece was dried by a drier set at 80° C. for 48 hours to reduce a moisture content to 1% by mass or less. The cellulose material shown in Table 23 was blended to the cellulose-aluminum-adhering polyethylene thin film piece to prepare a total of six kinds of sample materials including a material to which water was blended, and a material to which water was not blended. As the laminated paper of the paper pack to be added thereto, a material pulverized by a rotary cutter mill (manufactured by Horai Co., Ltd.) was used.

Next, composite materials in Examples 81 to 84, and Comparative Examples 13 and 14 were obtained by using the kneader same with the kneader in the Test Example 11. A mass ratio of the polyethylene, the cellulose fiber and the aluminum in the composite material obtained was as shown in Table 23.

The results are shown in Table 23.

TABLE 23

|  | Ex 81 | Ex 82 | Ex 83 | Ex 84 | CEx 13 | CEx 14 |
|---|---|---|---|---|---|---|
| Cellulose-aluminum-adhering polyethylene thin film piece (parts by mass) | 100 | 84.5 | 66.5 | 50 | 66.5 | 50 |
| Paper pack (parts by mass) | 0 | 15.5 | 33.5 | 50 | 33.5 | 50 |
| Water (parts by mass) | 100 | 100 | 100 | 100 | 0 | 0 |
| Cellulose fiber (parts by mass) | 4.9 | 13.3 | 23.5 | 37.0 | 34.4 | 36.2 |
| Polyethylene (parts by mass) | 95.1 | 86.7 | 76.5 | 63.0 | 65.6 | 63.8 |
| Ash containing aluminum (parts by mass) | 15.9 | 21.9 | 22.0 | 22.7 | 27.9 | 25.2 |
| Shape of resulting material | ○ | ○ | ○ | ○ | ○ | ○ |
| Moisture content (%) | 0.2 | 0.2 | 0.2 | 0.2 | 0.2 | 0.2 |
| Power consumption (kWh/kg) | 1.0 | 1.0 | 1.0 | 1.0 | 1.0 | 1.0 |
| Impact resistance (kJ/m$^2$) | 13.2 | 9.4 | 7.2 | 6.7 | 6.6 | 6.3 |
| Flexural strength (MPa) | 12.3 | 18.5 | 26.7 | 34.4 | 25.8 | 29.4 |
| Tensile strength (MPa) | 15.3 | 18.7 | 26.0 | 32.7 | 23.6 | 25.5 |
| Linear expansion coefficient (20-30° C.) | $1.5 \times 10^{-4}$ | $8.9 \times 10^{-5}$ | $7.4 \times 10^{-5}$ | $4.6 \times 10^{-5}$ | $9.6 \times 10^{-5}$ | $4.8 \times 10^{-5}$ |
| Linear expansion coefficient (−40-100° C.) | $1.7 \times 10^{-4}$ | $9.7 \times 10^{-5}$ | $8.2 \times 10^{-5}$ | $6.2 \times 10^{-5}$ | $1.2 \times 10^{-4}$ | $5.8 \times 10^{-5}$ |
| Judgement of aluminum length | Δ | Δ | Δ | Δ | Δ | Δ |
| Conformance or nonconformance of water absorption | ○ | ○ | ○ | ○ | x | x |
| Impact resistance retention (%) after water absorption | 107 | 106 | 105 | 107 | 106 | 105 |
| Cellulose fiber dispersibility | ○ | ○ | ○ | ○ | x | x |
| Molecular weight pattern | ○ | ○ | ○ | ○ | ○ | ○ |

Note:
"Ex" means Example, and
"C Ex" means Comparative Example.

The results in Examples 81 to 84 show that the cellulose-aluminum-dispersing polyethylene resin composite material obtained by blending the pulverized material of the laminated paper of the paper pack to the cellulose-aluminum-adhering polyethylene thin film piece and by performing the melt-kneading of the thin film piece in the presence of water is excellent in a moisture content, mechanical characteristics, water absorption ratio and cellulose fiber dispersibility. On the other hand, the cellulose-aluminum-dispersing polyethylene resin composite materials (Comparative Examples 13 and 14) obtained by performing the melt-kneading without adding water resulted in poor cellulose fiber dispersibility, and also high water absorption ratio. Moreover, tensile strength was lower for an amount of the cellulose fiber.

Moreover, it is found that, when the composite material contains 10 parts by mass of cellulose fiber based on a total amount of 100 parts by mass of the polyethylene resin and the cellulose fiber, a linear expansion coefficient is further suppressed.

Test Example 21

A composite material was prepared by adding broken paper (trimmings loss) of laminated paper, as described below, as a cellulose material, in kneading a cellulose-aluminum-adhering polyethylene thin film piece by using a batch type closed kneading device (batch type high-speed agitating device).

The cellulose-aluminum-adhering polyethylene thin film piece was obtained in the same manner as in the Test Example 1 described above. This thin film piece was cut into small pieces of about several cm² to 100 cm², and was in a wet state in the same way as in the Test Example 1. This cellulose-aluminum-adhering polyethylene thin film piece was dried by a drier set at 80° C. for 48 hours to reduce a moisture content to 1% by mass or less. The cellulose material and water as shown in Table 24 were blended to this cellulose-aluminum-adhering polyethylene thin film piece to prepare a sample material. As the broken paper to be added thereto, a material pulverized by a rotary cutter mill (manufactured by Horai Co., Ltd.) was used.

Next, the thin film piece was melt kneaded in the presence of water by using the batch type closed kneading device (batch type high-speed agitating device) same with the device in the Test Example 17 to obtain composite materials in Example 85 and 86. In addition, with regard to an end of kneading, a time point at which a temperature of the material in a device chamber to be measured by a thermometer installed in the batch type closed kneading device (batch type high-speed agitating device) reached 180° C. was taken as the end. A mass ratio of the polyethylene, the cellulose fiber and the aluminum in the composite material obtained was as shown in Table 24.

The results are shown in Table 24.

TABLE 24

|  | Ex 85 | Ex 86 |
|---|---|---|
| Cellulose-aluminum-adhering polyethylene thin film piece (parts by mass) | 67 | 34 |
| Broken paper (parts by mass) | 33 | 66 |
| Water (parts by mass) | 100 | 100 |
| Cellulose fiber (parts by mass) | 35 | 44 |
| Polyethylene (parts by mass) | 65 | 56 |
| Ash containing aluminum (parts by mass) | 17 | 20 |
| Shape of resulting material | ○ | ○ |
| Moisture content (%) | 0.2 | 0.2 |

TABLE 24-continued

|  | Ex 85 | Ex 86 |
|---|---|---|
| Power consumption (kWh/kg) | 1.0 | 1.0 |
| Impact resistance (kJ/m²) | 6.5 | 6.8 |
| Flexural strength (MPa) | 30.2 | 35.6 |
| Tensile strength (MPa) | 25.5 | 28.5 |
| Judgement of aluminum length | ○ | ○ |
| Conformance or nonconformance of water absorption | ○ | ○ |
| Impact resistance retention (%) after water absorption | 107 | 106 |
| Cellulose fiber dispersibility | ○ | ○ |
| Molecular weight pattern | ○ | ○ |

Note:
"Ex" means Example.

It is found that the cellulose-aluminum-dispersing polyethylene resin composite material obtained by blending the cellulose-aluminum-adhering polyethylene thin film piece, the broken paper and water is low in water absorbing properties and also excellent in mechanical strength.

Test Example 22

The cellulose-aluminum-dispersing polyethylene resin composite materials in Example 80 and 86 (referred to as MB1 and MB2, respectively) and high density polyethylene 1 (manufactured by Prime Polymer Co., Ltd., HI-ZEX 2200J, MFR: 5.2 g/10 min) were dry-blended at a blend ratio shown in Table 25. Next, the resulting material was charged into a twin screw extruder (manufactured by Japan Steel Works, Ltd., TEX30), and was kneaded to prepare a formed body containing a large amount of high density polyethylene as polyethylene. The results of evaluation of the formed body prepared are shown in Table 25.

TABLE 25

|  | Ex 87 | Ex 88 | Ex 89 | Ex 2 |
|---|---|---|---|---|
| Cellulose-aluminum-dispersing composite material MB1 (parts by mass) | 50 | — | — | — |
| Cellulose-aluminum-dispersing composite material MB2 (parts by mass) | — | 25 | 50 | — |
| HDPE1 (parts by mass) | 50 | 75 | 50 | 100 |
| Cellulose fiber (parts by mass) | 19 | 11 | 21 | 0 |
| Polyethylene (parts by mass) | 81 | 89 | 79 | 100 |
| LDPE (parts by mass) | 27 | 12 | 32 | 0 |
| HDPE (parts by mass) | 54 | 88 | 68 | 100 |
| Ash containing aluminum (parts by mass) | 8 | 6 | 8 | 0 |
| MFR | 1.7 |  |  |  |
| Shape of resulting material | ○ | ○ | ○ | ○ |
| Moisture content (%) | 0.2 | 0.2 | 0.2 | 0.2 |
| Power consumption (kWh/kg) | 1.0 | 1.0 | 1.0 | 1.0 |
| Impact resistance (kJ/m²) | — | 3.7 | 3.0 | — |
| Flexural strength (MPa) | — | 28.2 | 34.3 | — |
| Tensile strength (MPa) | 39.4 | 35.2 | 34.0 | 29.4 |
| Judgement of aluminum length | ○ | ○ | ○ | ○ |
| Conformance or nonconformance of water absorption | ○ | ○ | ○ | ○ |
| Impact resistance retention (%) after water absorption | 107 | 106 | 105 | 107 |
| Cellulose fiber dispersibility | ○ | ○ | ○ | — |

Note:
"Ex" means Example.

Table 25 shows that the formed body obtained by blending the high density polyethylene to the composite material and kneading the resulting material and forming the resulting material has low water absorption ratio and can be adjusted to desired physical properties.

With regard to the cellulose-aluminum-adhering polyethylene thin film piece in the state in which, after the polyethylene laminated paper such as the used beverage container was provided for treatment by using the pulper or the like to strip off and remove the paper portion, the paper portion which was unable to be completely removed was nonuniformly adhered to the polyethylene resin, and in the state in which shapes and sizes are all various, and a large amount of water was absorbed, there has so far been no technology having high practicability in a cost aspect and a quality aspect for effectively recycling the cellulose-aluminum-adhering polyethylene thin film piece as the resin composition, and the thin film piece is generally landfilled or disposed of just like sort of garbage, or used merely as a fuel. As shown in the above-described Examples, the present invention relates to a technology on providing the cellulose-aluminum-adhering polyethylene thin film piece for simple treatment in an intact state (without needing moisture control or the like) to revive the thin film piece as the resin material.

The present invention relates to a technology according to which the cellulose-aluminum-dispersing polyethylene resin composite material having uniform physical properties can be produced from the cellulose-aluminum-adhering polyethylene thin film piece as a nonuniform mixture of the cellulose fiber, the aluminum and the polyethylene resin, in which the size, the shape and the state of adhesion of the cellulose fiber are nonuniform.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2016-236284 filed in Japan on Dec. 5, 2016, which is entirely herein incorporated by reference.

The invention claimed is:

1. A cellulose-aluminum-dispersing polyethylene resin composite material, in which a cellulose fiber and aluminum are dispersed into a polyethylene resin,
   wherein a proportion of the cellulose fiber is 1 part by mass or more and 70 parts by mass or less in a total content of 100 parts by mass of the polyethylene resin and the cellulose fiber, and a content of the aluminum is 1 part by mass or more and 40 parts by mass or less based on the total content of 100 parts by mass of the polyethylene resin and the cellulose fiber,
   wherein the relationship of the water absorption ratio [%] of the composite material obtained by [Formula A] with the cellulose effective mass ratio obtained by [Formula B] satisfies the following formula [Formula C]:

(water absorption ratio [%])<(cellulose effective mass ratio [%])$^2$×0.01, and  [Formula C]:

under the condition that the composite material which is dried and is shaped into a sheet form specimen, is immersed into water at 23° C. for 20 days, and water absorption ratio is determined by the measured values before and after the immersion according to the following [Formula A];

(Water absorption ratio [%])=(mass after immersion [g]−mass before immersion [g])×100/(mass before immersion [g]), and  [Formula A]:

the cellulose effective mass ratio of the composite material obtained by the thermogravimetric analysis (TGA) using mass loss from 270° C. to 390° C. and the mass of the composite material before testing are applied by the following [Formula B];

(Cellulose effective mass ratio [%])=(mass loss [mg] from 270° C. to 390° C.)×100/(mass [mg] of a resin composite material sample [mg]).  [Formula B]:

2. The cellulose-aluminum-dispersing polyethylene resin composite material according to claim 1, wherein a proportion of the cellulose fiber is 5 parts by mass or more and less than 50 parts by mass in the total content of 100 parts by mass of the polyethylene resin and the cellulose fiber.

3. The cellulose-aluminum-dispersing polyethylene resin composite material according to claim 1,
   wherein a proportion of the cellulose fiber is 25 parts by mass or more and less than 50 parts by mass in the total content of 100 parts by mass of the polyethylene resin and the cellulose fiber, and
   wherein tensile strength of a formed body obtained by forming the composite material is 20 MPa or more.

4. The cellulose-aluminum-dispersing polyethylene resin composite material according to claim 1,
   wherein a proportion of the cellulose fiber is 1 part by mass or more and less than 15 parts by mass in the total content of 100 parts by mass of the polyethylene resin and the cellulose fiber, and
   wherein flexural strength of a formed body obtained by forming the composite material is 8 to 20 MPa.

5. The cellulose-aluminum-dispersing polyethylene resin composite material according to claim 1,
   wherein a proportion of the cellulose fiber is 15 parts by mass or more and less than 50 parts by mass in the total content of 100 parts by mass of the polyethylene resin and the cellulose fiber, and
   wherein flexural strength of a formed body obtained by forming the composite material is 15 to 40 MPa.

6. The cellulose-aluminum-dispersing polyethylene resin composite material according to claim 1, wherein a content of the aluminum is 5 parts by mass or more and 30 mass part or less based on the total content of 100 parts by mass of the polyethylene resin and the cellulose fiber.

7. The cellulose-aluminum-dispersing polyethylene resin composite material according to claim 1, wherein the polyethylene resin satisfies a relationship:

$1.7 > \text{half-width}(\text{Log}(MH/ML)) > 1.0$ in a molecular weight pattern obtained by gel permeation chromatography (GPC) measurement.

8. The cellulose-aluminum-dispersing polyethylene resin composite material according to claim 1, comprising a cellulose fiber having a fiber length of 1 mm or more.

9. The cellulose-aluminum-dispersing polyethylene resin composite material according to claim 1, wherein a proportion of the number of aluminum having an X-Y maximum length of 1 mm or more in the number of aluminum having an X-Y maximum length of 0.005 mm or more is less than 1%.

10. The cellulose-aluminum-dispersing polyethylene resin composite material according to claim 1, wherein 50% by mass or more of the polyethylene resin is low density polyethylene.

11. The cellulose-aluminum-dispersing polyethylene resin composite material according to claim 1, comprising polypropylene;
   wherein a content of the polypropylene is 20 parts by mass or less based on the total content of 100 parts by mass of the polyethylene resin and the cellulose fiber.

12. The cellulose-aluminum-dispersing polyethylene resin composite material according to claim 1, which satisfies the following formula, when a soluble mass ratio to hot xylene of 138° C. for the composite material is taken as Ga (%), a soluble mass ratio to hot xylene of 105° C. for the composite material is taken as Gb (%), and a cellulose effective mass ratio is taken as Gc (%), $$\{(Ga-Gb)/(Gb+Gc)\} \times 100 \leq 20,$$

where, $$Ga = \{(W0-Wa)/W0\} \times 100,$$

$$Gb = \{(W0-Wb)/W0\} \times 100,$$

where,
W0 is mass of a composite material before being immersed into hot xylene,
Wa is mass of a composite material after being immersed into hot xylene of 138° C. and then drying and removing xylene, and
Wb is mass of a composite material after being immersed into hot xylene of 105° C. and then drying and removing xylene, $$Gc = \{We/W00\} \times 100,$$

where,
We is an amount of mass reduction of a dry composite material while a temperature is raised from 270° C. to 390° C. in a nitrogen atmosphere, and
W00 is mass of a dry composite material before a temperature is raised (at 23° C.).

13. The cellulose-aluminum-dispersing polyethylene resin composite material according to claim 1, comprising polyethylene terephthalate and/or nylon;
wherein the total content of the polyethylene terephthalate and/or the nylon is 10 parts by mass or less based on a total content of 100 parts by mass of the polyethylene resin and the cellulose fiber.

14. The cellulose-aluminum-dispersing polyethylene resin composite material according to claim 11, wherein at least a part of the polyethylene resin and/or the polypropylene is derived from a recycled material.

15. The cellulose-aluminum-dispersing polyethylene resin composite material according to claim 1, comprising an inorganic material;
wherein a content of the inorganic material is 1 part by mass or more and 100 parts by mass or less based on 100 parts by mass of the polyethylene resin.

16. The cellulose-aluminum-dispersing polyethylene resin composite material according to claim 1, which has a melt flow rate (MFR) of 0.05 to 50.0 g/10 min at a temperature of 230° C. and a load of 5 kgf.

17. The cellulose-aluminum-dispersing polyethylene resin composite material according to claim 1,
wherein, in the composite material, water absorption ratio after the composite material is immersed into water of 23° C. for 20 days is 0.1 to 10%; and
wherein, in the composite material, impact resistance after the composite material is immersed into water of 23° C. for 20 days is higher than impact resistance before the composite material is immersed thereinto.

18. The cellulose-aluminum-dispersing polyethylene resin composite material according to claim 1, which has a linear expansion coefficient of $1 \times 10^{-4}$ or less.

19. The cellulose-aluminum-dispersing polyethylene resin composite material according to claim 1, which has a moisture content of less than 1% by mass.

20. A pellet, comprising the cellulose-aluminum-dispersing polyethylene resin composite material according to claim 1.

21. A formed body, which is formed by using the cellulose-aluminum-dispersing polyethylene resin composite material according to claim 1.

22. A method of producing a cellulose-aluminum-dispersing polyethylene resin composite material, comprising at least obtaining a cellulose-aluminum-dispersing composite material formed by dispersing a cellulose fiber and aluminum into a polyethylene resin by melt-kneading, in the presence of water, a cellulose-aluminum-adhering polyethylene thin film piece,
wherein the cellulose-aluminum-adhering polyethylene thin film piece is obtained from:
(a) polyethylene laminated paper having paper, a polyethylene thin film layer and an aluminum thin film layer; and/or
(b) a beverage/food pack formed of the polyethylene laminated paper.

23. A method of producing a cellulose-aluminum-dispersing polyethylene resin composite material, comprising the steps of:
agitating, in water,
(a) polyethylene laminated paper having paper, a polyethylene thin film layer and an aluminum thin film layer, and/or
(b) a beverage/food pack formed of the polyethylene laminated paper, to obtain a cellulose-aluminum-adhering polyethylene thin film piece, in which a part of the paper is removed; and
melt-kneading at least the cellulose-aluminum-adhering polyethylene thin film piece and water at a temperature at which polyethylene is melted and a cellulose fiber is not deteriorated, to obtain a cellulose-aluminum-dispersing polyethylene resin composite material formed by dispersing a cellulose fiber and aluminum into a polyethylene resin.

24. The method of producing a cellulose-aluminum-dispersing polyethylene resin composite material according to claim 22,
wherein
the melt-kneading is performed by using a batch type kneading device, the cellulose-aluminum-dispersing polyethylene thin film piece and water are charged into the batch type kneading device and agitated by rotating an agitation blade projected on a rotary shaft of the device, and
a temperature in the device is increased by this agitation to perform the melt-kneading.

25. The method of producing a cellulose-aluminum-dispersing polyethylene resin composite material according to claim 22,
wherein, in the composite material, a proportion of the cellulose fiber in the total content of 100 parts by mass of the polyethylene resin and the cellulose fiber is 1 part by mass or more and 70 parts by mass or less, and
wherein, in the composite material, a content of the aluminum is 1 part by mass or more and 40 parts by mass or less based on the total content of 100 parts by mass of the polyethylene resin and the cellulose fiber.

26. The method of producing a cellulose-aluminum-dispersing polyethylene resin composite material according to claim 22, wherein a cellulose-aluminum-dispersing composite material formed by dispersing a cellulose fiber and aluminum into a polyethylene resin is obtained by pulverizing the thin film piece in a state of containing water, and performing the melt-kneading of the resulting pulverized material.

27. The method of producing a cellulose-aluminum-dispersing polyethylene resin composite material according to claim 22, wherein the melt-kneading is performed by mixing a cellulose material.

28. The method of producing a cellulose-aluminum-dispersing polyethylene resin composite material according to claim 27, wherein paper sludge is used as the cellulose material.

29. The method of producing a cellulose-aluminum-dispersing polyethylene resin composite material according to claim 22, wherein the melt-kneading is performed by mixing low density polyethylene and/or high density polyethylene.

30. The method of producing a cellulose-aluminum-dispersing polyethylene resin composite material according to claim 22, wherein, in the composite material, a content of polypropylene based on the total content of 100 parts by mass of the polyethylene resin and the cellulose fiber is 20 parts by mass or less.

31. The method of producing a cellulose-aluminum-dispersing polyethylene resin composite material according to claim 22, wherein, in the composite material, a total content of polyethylene terephthalate and/or nylon based on the total content of 100 parts by mass of the polyethylene resin and the cellulose fiber is 10 parts by mass or less.

32. The method of producing a cellulose-aluminum-dispersing polyethylene resin composite material according to claim 22, wherein, in the composite material, the number of aluminum having an X-Y maximum length of 1 mm or more in the number of aluminum having an X-Y maximum length of 0.005 mm or more is less than 1%.

33. A method of recycling a beverage/food pack formed of polyethylene laminated paper having paper, a polyethylene thin layer and an aluminum thin layer, comprising performing the method of producing a cellulose-aluminum-dispersing polyethylene resin composite material according to claim 22.

34. A method of producing a formed body, comprising the steps of:
obtaining a formed body by mixing the cellulose-aluminum-dispersing polyethylene resin composite material according to claim 1, and high density polyethylene and/or polypropylene; and
forming the mixture.

35. A method of producing a formed body, comprising the steps of:
obtaining a formed body by mixing the pellet according to claim 20, and high density polyethylene and/or polypropylene; and forming the mixture.

36. The cellulose-aluminum-dispersing polyethylene resin composite material according to claim 1, wherein the cellulose-aluminum-dispersing polyethylene resin composite material is obtained at least by using as a raw material:
(a) polyethylene laminated paper having paper, a polyethylene thin film layer and an aluminum thin film layer; and/or
(b) a beverage/food pack formed of the polyethylene laminated paper: and/or
(c) a cellulose-aluminum-adhering polyethylene thin film piece.

37. The method of producing a cellulose-aluminum-dispersing polyethylene resin composite material according to claim 22, wherein the relationship of the water absorption ratio [%] of the composite material obtained by [Formula A] with the cellulose effective mass ratio obtained by [Formula B] satisfies the following formula [Formula C]; and
under the condition that the composite material which is dried and is shaped into a sheet form specimen, is immersed into water at 23° C. for 20 days, and water absorption ratio [%] is determined by the measured values before and after the immersion according to the following [Formula A];

(Water absorption ratio [%])=(mass after immersion [g]−mass before immersion [g])×100/(mass before immersion [g]), and  [Formula A]:

the cellulose effective mass ratio of the composite material obtained by the thermogravimetric analysis (TGA) using mass loss from 270° C. to 390° C., and the mass of the composite material before testing are applied by the following [Formula B];

(Cellulose effective mass ratio [%])=(mass loss [mg] from 270° C. to 390° C.)×100/(mass [mg] of a resin composite material sample [mg]),  [Formula B]:

(water absorption ratio [%])<(cellulose effective mass ratio [%])$^2$×0.01.  [Formula C]:

* * * * *